(12) United States Patent
Estefan Bellan et al.

(10) Patent No.: US 11,602,997 B2
(45) Date of Patent: Mar. 14, 2023

(54) ECOLOGICAL SYSTEM EXPLOITING KINETIC ENERGY IN VEHICLES

(71) Applicant: ECO EOLIC TOP SYSTEM S.L., Madrid (ES)

(72) Inventors: Abdon Miguel Estefan Bellan, Madrid (ES); Carlos Mauricio Vargas Machado, Bogota (CO); Pedro Antonio Fino Puerto, Bogota (CO)

(73) Assignee: Eco Eolic Top System S.L., Madrid (ES)

( * ) Notice: Subject to any disclaimer, the term of this patent is extended or adjusted under 35 U.S.C. 154(b) by 218 days.

(21) Appl. No.: 16/641,044

(22) PCT Filed: Dec. 23, 2019

(86) PCT No.: PCT/EP2019/086957
§ 371 (c)(1),
(2) Date: Feb. 21, 2020

(87) PCT Pub. No.: WO2020/136176
PCT Pub. Date: Jul. 2, 2020

(65) Prior Publication Data
US 2021/0138910 A1    May 13, 2021

(30) Foreign Application Priority Data

Dec. 26, 2018  (ES) ............................... ES201831284

(51) Int. Cl.
| | |
|---|---|
| *B60L 8/00* | (2006.01) |
| *B60W 20/20* | (2016.01) |
| *B60W 20/30* | (2016.01) |
| *B60W 20/40* | (2016.01) |
| *B60K 16/00* | (2020.01) |

(52) U.S. Cl.
CPC ............. *B60L 8/006* (2013.01); *B60W 20/20* (2013.01); *B60W 20/30* (2013.01); *B60W 20/40* (2013.01)

(58) Field of Classification Search
CPC ....... B60L 8/006; B60W 20/20; B60W 20/30; B60W 20/40; B62D 25/16; B60K 16/00
See application file for complete search history.

(56) References Cited

U.S. PATENT DOCUMENTS

| | | | |
|---|---|---|---|
| 5,280,827 A | 1/1994 | Taylor et al. | |
| 7,808,121 B1 * | 10/2010 | Glynn | B60K 16/00 290/55 |
| 8,205,932 B1 | 6/2012 | Houk | |

(Continued)

FOREIGN PATENT DOCUMENTS

| | | |
|---|---|---|
| GB | 2475032 A | 5/2011 |
| WO | 01/36255 A1 | 5/2001 |
| WO | 2011/011856 A1 | 2/2011 |

OTHER PUBLICATIONS

International Search Report for PCT/EP2019/086957, dated Apr. 14, 2020.

*Primary Examiner* — Tinh Dang
(74) *Attorney, Agent, or Firm* — Merchant & Gould P.C.

(57) ABSTRACT

An ecological system for use in land or marine vehicles is provided, which uses wasted airmass making it to pass through two subsystems which allow lighten the load of the moving vehicle and generates electrical energy. Therefore, showing an economy in fuel, tires, and general maintenance savings, as well as a decrease of contaminants thrown to the environment.

28 Claims, 58 Drawing Sheets

(56) References Cited

U.S. PATENT DOCUMENTS

| | | | |
|---|---|---|---|
| 2008/0093886 A1* | 4/2008 | Nusbaum | B62D 35/001 |
| | | | 296/180.1 |
| 2008/0116715 A1* | 5/2008 | Steel | B62D 35/001 |
| | | | 296/180.1 |
| 2011/0181072 A1 | 7/2011 | Kempster | |
| 2017/0342963 A1 | 11/2017 | Dietzel | |

* cited by examiner

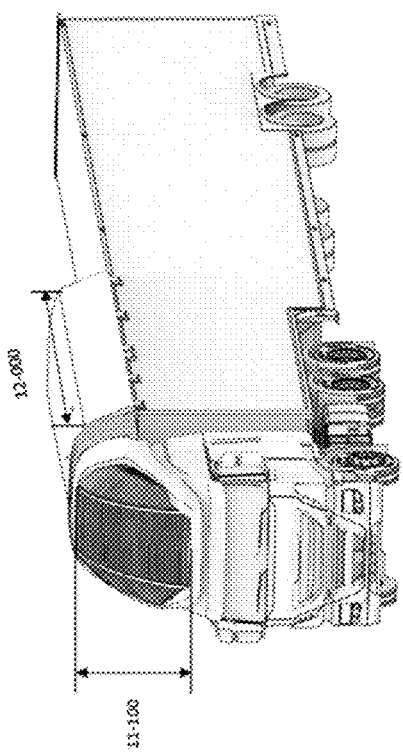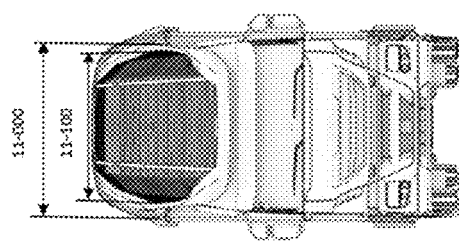
FIG. 58

ECOLOGICAL SYSTEM EXPLOITING KINETIC ENERGY IN VEHICLES

This application is a National Stage Application of PCT/EP2019/086957, filed Dec. 23, 2019, which claims the benefit of Spanish Patent Application No. P201831284, filed Dec. 26, 2018, and which applications are incorporated herein by reference. To the extent appropriate, a claim of priority is made to each of the above disclosed applications.

FIELD OF THE INVENTION

The present invention relates to the field of alternative energy generation applied to land and nautical vehicles. In particular, it relates to an ecological system which uses kinetic air Flow of a moving vehicle for reducing its weight through simultaneously or alternatively the aerodynamic lift of a vehicle and/or producing electric energy.

BACKGROUND OF THE INVENTION

Every land or nautical vehicle moving on the ground or sea Surface and displacing by its movement an airmass constituting our atmosphere is a potential energy source which today is underutilized. The use of this source may lead to a Benefit for our planet, offering solutions related to reducing fuel and transport supplies consumption, usually derived from non-renewable resources, reduction of residues linked to the use of such supplies, and thus lowering transport costs, increasing efficiency. The Benefit obtained out of these solutions will surely be tangible to present and future generations, which duty is to attempt a lower consumption of non-renewable resources, without affecting productivity. On the other hand, there is the need for finding alternative energy sources which are friendly with environment and minimizing the use and impact of energy generation from non-renewable natural resources, which in turn are less costly and easier to obtain.

In effect, every vehicle in movement, be it a truck, a car, a boat, a train, etc., displaces and compresses an airmass which appropriately leaded and compressed can be used as a new energy source which today is being wasted.

Therefore, the inventors of the present invention made possible to use and address a great portion of wind energy generated by those moving vehicles which penetrate the surrounding airmass and thus producing the reduction of payload through aerodynamic lift on the vehicle and, simultaneously or alternatively, incorporate a subsystem capable of electric energy generation.

Document US 2011/0181072 discloses an aerodynamic wing mounted on the upper part of a vehicle such as a car, a load wagon of a truck, or the load wagon of a tractor. This apparatus allows an improvement of the aerodynamic movement of the vehicle through the air.

U.S. Pat. No. 8,205,932 describes a lift wing structure for a semitrailer of a tractor-trailer rig, for producing various aerodynamic effects, such as turbulence reduction, lift creation and downward force creation. The lift wing apparatus is mounted in a trailer chassis and extends upward to a height that is approximately the portion of the tractor cabin. The lift wing apparatus comprises a stationary pedestal structure having a pair of joined vertical hydraulic cylinders connected to the wing portion. Said hydraulic cylinders allow the operator to make height adjustments of the wing when during transit through a remote control within the cabin area.

Documents US 2011/0181072 and U.S. Pat. No. 8,205,932 describe systems or wing structures for producing aerodynamic effects in vehicles. But, such systems do not show devices or apparatuses that generate a real compression, which efficiently allows reduction of weight through aerodynamic lift in the vehicle, without significantly affecting vehicle size. Furthermore, such systems do not offer solutions that commercially sustain a favorable equation for significantly reducing fuel or supply consumption or which improves vehicle efficiency.

U.S. Pat. No. 5,280,827 describes a standard vehicle driven by an electric motor, an improved battery charging system comprising an wind turbine mounted in the back of the vehicle, a Venturi tube extending along the upper part of the vehicle and a pair of lower Venturi effect tubes extending along lower sides of the bodywork of the vehicle, which guide the air flow to improve the force directed to the turbine. It also describes floor effect systems for stabilizing the vehicle, along with solar cells.

Publication No. WO2011011856 provides an energy recovery system for a vehicle comprising an electric generator provided with a housing, said housing is oriented with respect to the vehicle around a housing axis. Said system also comprises a wind turbine containing a set of Blades oriented with respect to a Blade axis. The wind turbine is supported on a housing and can rotate around its axle. Said electric generator is coupled to the wind turbine and converts rotation movement energy of the set of Blades into electric energy.

U.S. Pat. No. 7,808,121 provides a land vehicle having electric energy generation including an energy storage battery, additional electric energy generation includes a housing, a set of rotating Blades or paddles in the housing, a moving axle connected to said set of rotating Blades, an electric connection to the storage battery to provide electric power. The housing has at least one frontal air inlet aperture and an air outlet open area downstream of the blades and the frontal aperture has at least one gate. The gate only opens when the vehicle is deaccelerating or stops and closes when the vehicle is moving.

Documents U.S. Pat. No. 5,280,827, WO2011011856 and U.S. Pat. No. 7,808,121 disclose vehicles having electric energy generation apparatuses which use wind turbines and solar panels, but the proposed solutions provided by said apparatuses and/or vehicles substantially affect their sizes and utility, affecting commercial feasibility of their use or incorporation within the current market. Besides, they do not have a real compression system which allows feedback of the vehicle without significantly affecting the vehicle dimensions.

Therefore, there is the need of a commercially feasible ecological system which complies with current regulations of land transport vehicle dimensions, which efficiently use the air flow in a moving vehicle that provides a real compression of the airmass for reducing the weight of the vehicle without significantly affecting vehicle dimensions and/or generating a significant amount of useful electric energy.

BRIEF SUMMARY OF THE INVENTION

The inventors of the present invention recognize the importance of environment care and obtaining important money and resource economies in the transport industry, and thus provide a system that uses air flow of moving vehicles wherein said system directs said flow towards one or more subsystems to reduce the weight through aerodynamic lift provided to the vehicle and/or electric energy generation.

Having the ecological system of the present invention the weight of the moving vehicle decreases and thus fuel costs, tire costs and general maintenance costs are also decreased and therefore particles that contaminate environment are also diminished. Furthermore, bearing impact of the vehicles on road networks is reduced, thus contributing to maintenance cost reduction.

The ecological system of the present invention is preferably addressed to vehicles that can regularly reach speeds between around 80 to around 120 km/h, even though the aerodynamic effect is present with speeds exceeding around 40 km/h.

One of the objectives of the present invention is lightening the payload of the vehicle through aerodynamic lift generated by the system.

For increasing the lift of a moving vehicle is provided as a part of the ecological system a device directing the today's wasted airmass, compresses it and accelerates it such that the output speed of the air reaches around four (4) times the input speed. Consequently, the impact speed of the airmass against the aerodynamic profile which is also a part of the ecological system of the invention, generates a truly useful lift effect on each type of vehicle in the market.

Another objective of the present invention is to generate electric energy and decrease contaminant emissions released to the atmosphere.

An additional purpose of the invention is to use and optimize vehicle's aerodynamics using its original morphology, thus obtaining proposed aerodynamic or energetic results.

Another objective of the invention is to provide an ecological system that is adaptable to the original morphology of a vehicle or that is an integral part of the vehicle.

A further purpose of the invention is to provide means for reducing environmental impact produced by noise made by some of the system components.

Additional objectives and advantages of the present invention will become apparent in the description of the figures, the detailed description of the invention and the proposed claims.

LIST OF ELEMENTS OF THE SYSTEM OF THE INVENTION

100 Ecological system
400 Vehicle
11-000 Device
11-100 Grilles
11-200 Lateral walls wherein the device enters
11-300 Upper compression wall
11-400 Lower compression wall
11-500 Ducts
11-600 Means of articulation
11-610 Coupling means
11-620 Air conduction flexible elements
11-700 Laminar Flow ejector
11-730 Male rail
11-731 Female rail
11-740 System support
11-741 Support Column
11-742 Upper beam
11-742a Dies
11-742b hubs
11-743 Anchor beam
11-744 Fastening Elements
11-745 Air guide
12-000 First subsystem
12-100 Aerodynamic profile
12-110 lightened Structure
12-111 Ribs
12-112 Beams
12-114 Skin
12-115 Coupling Elements
12-120 External Structure
12-121 Wing tip devices
12-122 Lateral beams
12-122a Dies
12-122b Hubs
12-130 Vortex generator devices
12-140 Flow Guides
12-150 Hyper lift devices
12-151 Flap axle
12-152 Couplings
13-000 Second subsystem
13-100 Housing
13-200 Turbines
13-210 Blades
13-220 Turbine axle
13-310 Energy storage batteries
13-400 Transmission systems
13-700 Noise cancelling elements
13-800 Sealing Elements
13-900 Exhaust Elements
14-000 Head integrated into the vehicle
14-100 Lateral devices
14-200 Flexible elements or bellows

Definitions

To easily understand the invention, certain terms will be defined below and some other terms will be exposed along the detailed description.

Attack Angle is the angle formed by the aerodynamic cord of wing profile with the direction of striking air.

Attack Edge is the initial impact point of air in an aerodynamic profile.

Leak Edge is the end point of air outlet from the aerodynamic profile.

Cord is the straight line distance between the attack Edge and the leak edge.

Wind Energy is the kinetic energy generated by the effect caused by air streams impacting against the Blades of a turbine which transform this movement in electricity.

The electric generator is a device capable of maintaining an electric potential difference between two points (called poles or terminals) transforming mechanical energy in electric energy.

Vortex generators: Is a fin-shaped aerodynamic device, usually mounted on the back of a lifting Surface, so that when impacting with an air stream a small turbulence is generated which allows the delay of detachment of the limit layer thus increasing the angle of an aerodynamic profile.

The aerodynamic profile is the shape of transverse area of an element which when moving through the air can generate a pressure distribution which generates lift.

Lift is a pressure or force produced in an aerodynamic Surface contrary to the wing weight.

Lift coefficient ($C_l$), where l is used for its term in English lift, corresponds to an aerodynamic coefficient, which is dimensionless and is measured with the Reynolds number, varying air density.

Vehicle is a device or apparatus including or not an engine or motor, that can move on land, water or air and which is useful for transporting objects, animals or people.

Articulated truck: is a heavy load vehicle having a load capacity between around 10 to around 40 tons.

BRIEF DESCRIPTION OF THE FIGURES

FIG. 37 shows the coupling system hub 12-122b-die 12-122a;

FIG. 58 shows the perspective and front view of an articulated truck with the device 11-000 and the first subsystem 12-000.

DETAILED DESCRIPTION OF THE INVENTION

The present invention provides an ecological system (100) which uses kinetic energy for a moving vehicle (400). In this invention, the vehicle (400) is a device or apparatus which may have or not a motor or engine, that can move on earth, water or air and that is useful for transporting objects, animals or people. Said vehicle (400) is selected from cars, buses, pickup trucks, boxcars, trains, boats, articulated and non-articulated trucks.

Preferably, the ecological system of the present invention comprises one or more devices (11-000) which guide, compress, accelerate and projects an airmass caught by the one or more devices (11-000) in the vehicle (400) when in movement, a first subsystem (12-000) which receives air flow projected from the one or more devices (11-000) towards one or more aerodynamic profiles (12-100) that generate lift to the vehicle, and a second subsystem (13-000) which receives the air flow projected from the one or more devices (11-000) towards one or more electric generator turbines, wherein the first subsystem and the second subsystem are able to jointly or separately work.

The one or more devices (11-000) of the ecological system (100) is located at the front part of the system and attacks with an air input an air flow that enters and is compressed, accelerated and guided towards an output area, wherein the input area of the one or more devices (11-000) is bigger than the output area, such that the velocity of the air flow is substantially greater in the output area than in the input area. The input area of the one or more devices (11-000) is approximately the area of the front part of the vehicle and varies as a function of the width and height of the vehicle in which the system operates.

In particular, the height of the input area of device (11-000) is higher or equal to around 10 cm. Preferably, is found within the range from around 10 cm to around 2.5 m.

The one or more devices (11-000) further comprises one or more intake ports, a compression throat and one or more exhaust ports.

The one or more devices (11-000) comprises one or more air intake control systems, such as a grille or diaphragm type (11-100) and further comprises side walls from one or more intake ports to one or more exhaust ports.

In one embodiment of the invention, the one or more air intake control systems may comprise one or more grilles (11-100).

In another embodiment of the invention, the one or more air intake control systems does not comprise grilles (11-100).

Figure 38:
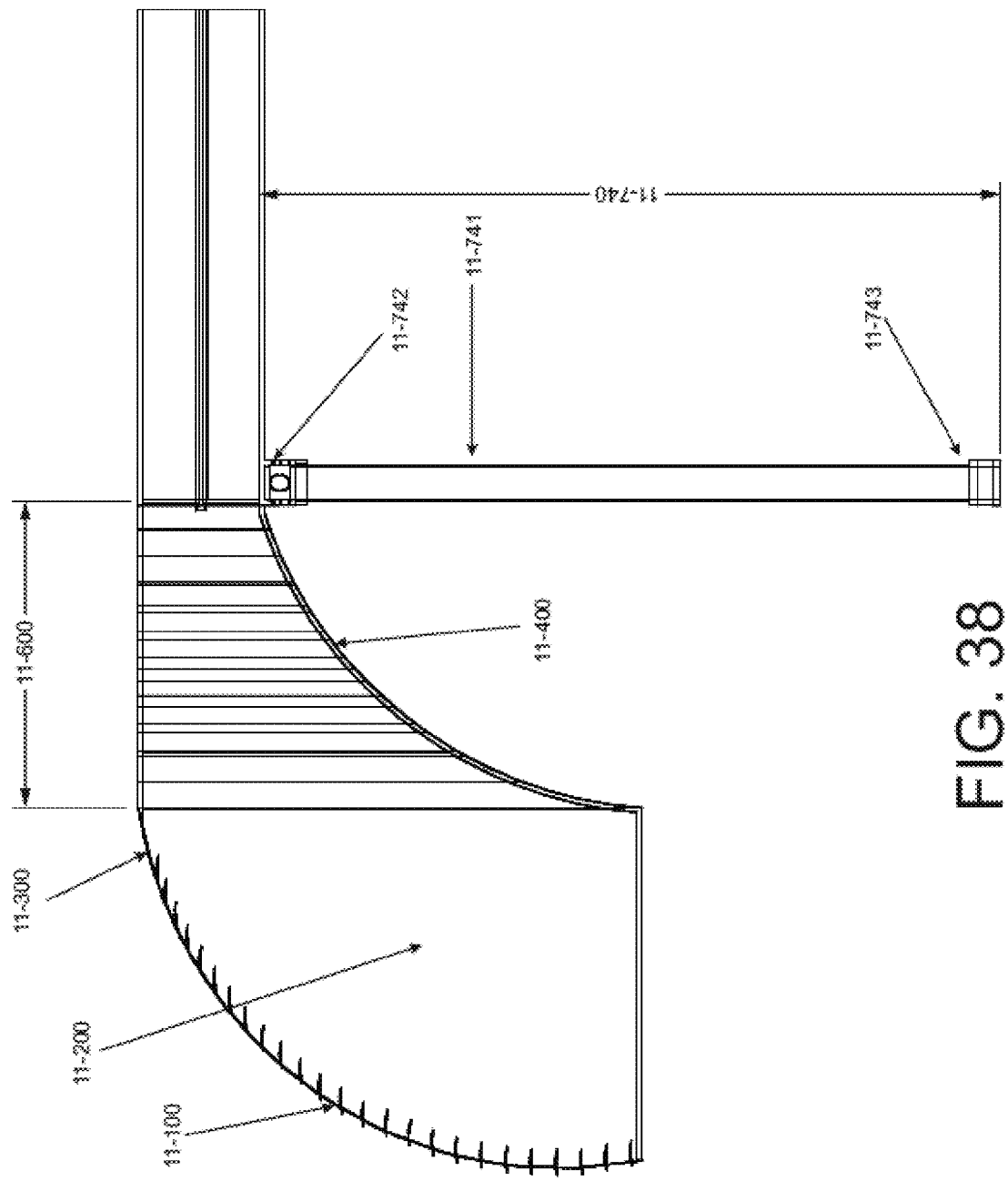
FIG. 38 shows cross section of device 11-000 of an ecological system 100 according to an example of an embodiment.

FIG. 38 shows device (11-000) as one of the preferred embodiments, wherein grilles (11-100) are shown, the intake side walls (11-200) of device (11-000), it also shows upper (11-300) and lower (11-400) compression walls from the intake port to the exhaust port, varying its angle and length. Said figure also shows articulation means (11-600), air guiding ducts (11-500), the support beam (11-741) and the anchor beam (11-743).

Figure 39:
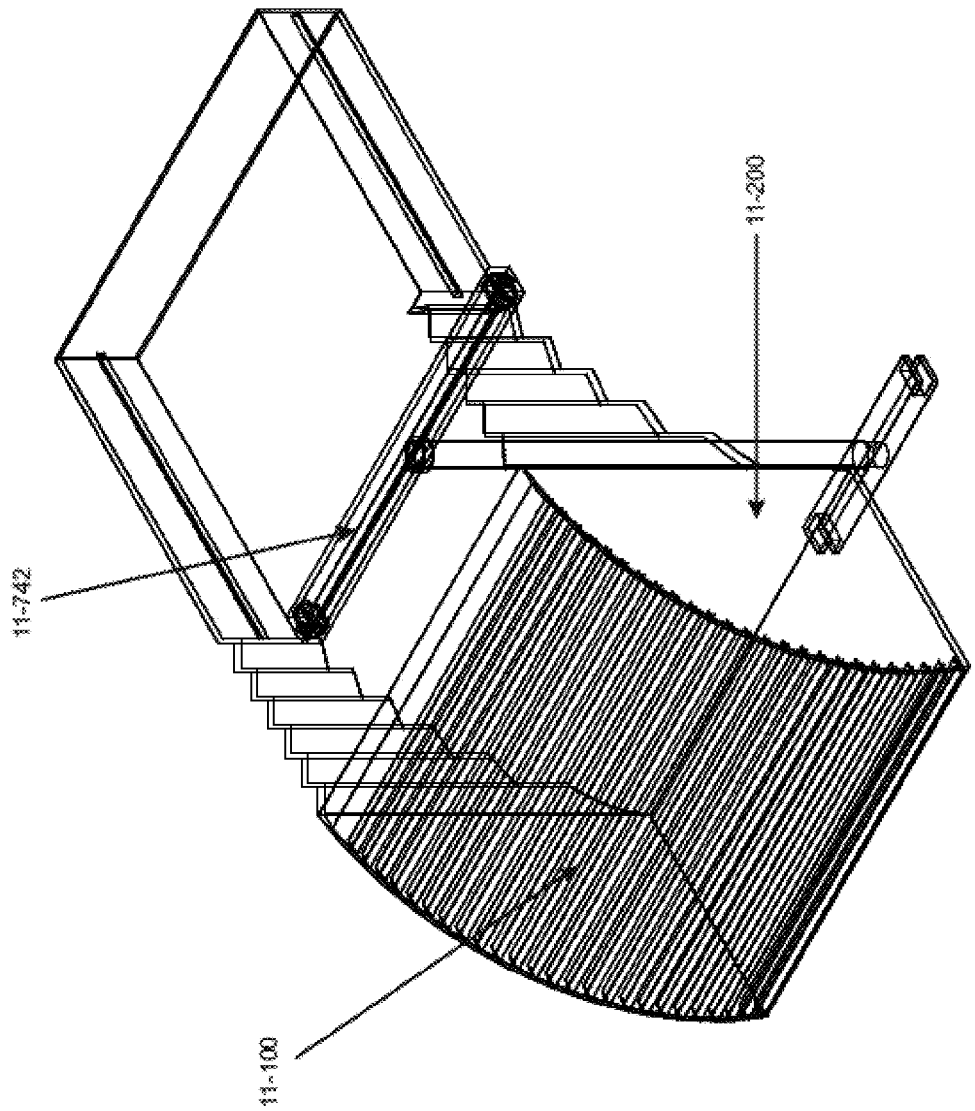
FIG. 39 shows a perspective view of device 11-000 of an ecological system 100 according to an example of an embodiment.

In one embodiment of the present invention, the compression wall (11-400) of device (11-000) is optionally the vehicle bodywork, being this compression wall the lower wall. FIG. 39 shows the upper beam (11-742), the grilles (11-100) and the side walls of the device (11-200).

This embodiment of the present invention uses the vehicles morphology as part of the device (11-000), and the shape of the vehicle contributes to air compression.

Figure 43:
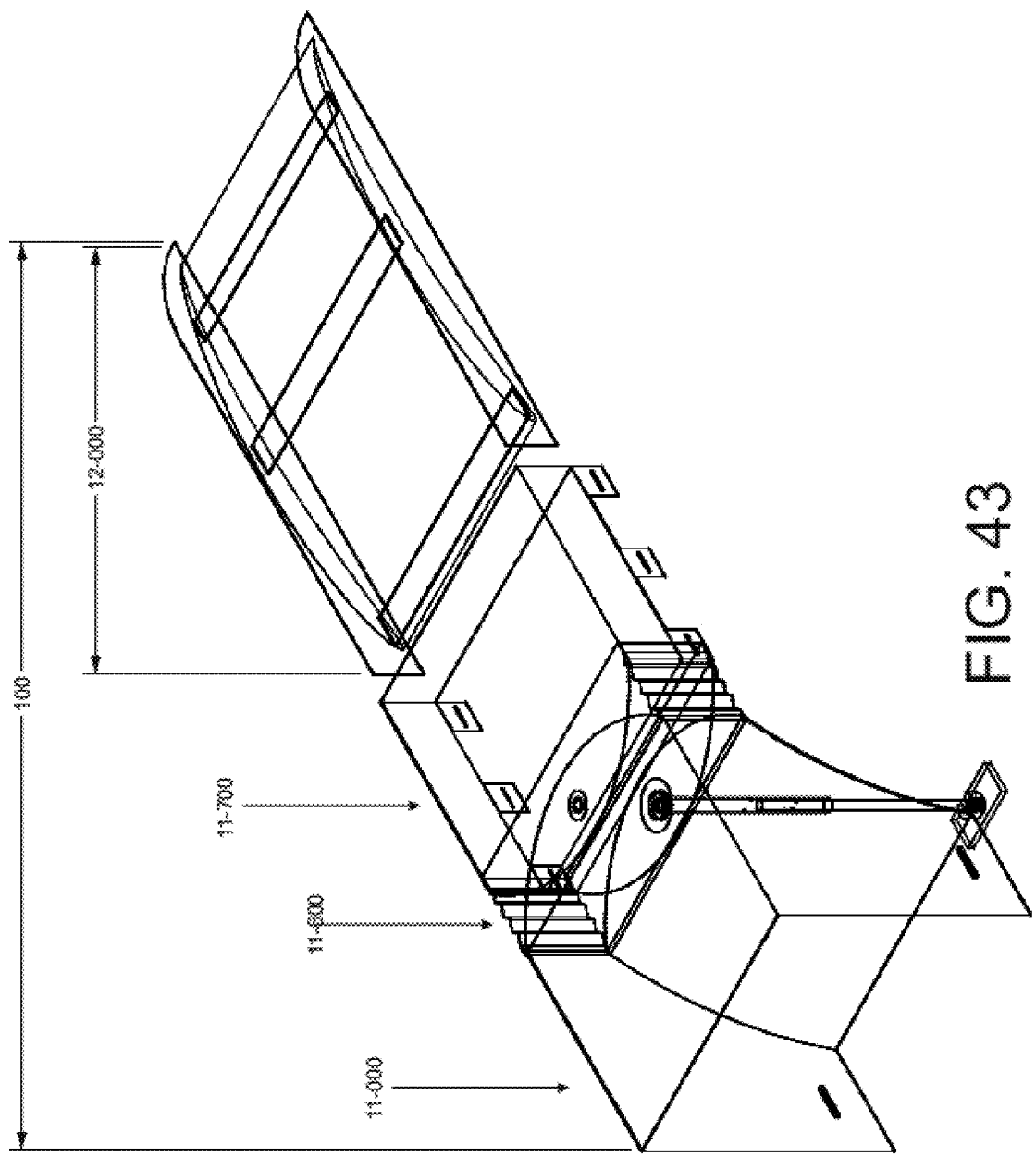
FIG. 43 shows a perspective view of the coupling of the device 11-000 with the first subsystem 12-000, folded.

Other embodiment of the present invention, such as is shown in FIG. 43, shows device (11-000) further comprising articulation means (11-600) which guides incoming air from the front part of the system to the output of the device (11-000). Said figure also shows that device (11-000) further comprises a laminar flow ejector (11-700) of fixed or variable areas. The ejector is a tubular body consisting in a rectangular parallelepiped and comprising side and vertical walls.

Said articulation means (11-600) comprise one or more air guiding flexible elements (11-620). The laminar flow ejector (11-700) of device (11-000) comprises an accelerated-air guide to deliver laminar flow towards the Edge of the aerodynamic profile or subsystem (12-000). Among flexible elements there are, among others, bellows, composite or textile materials, or diaphragm type of elements.

Figure 40:
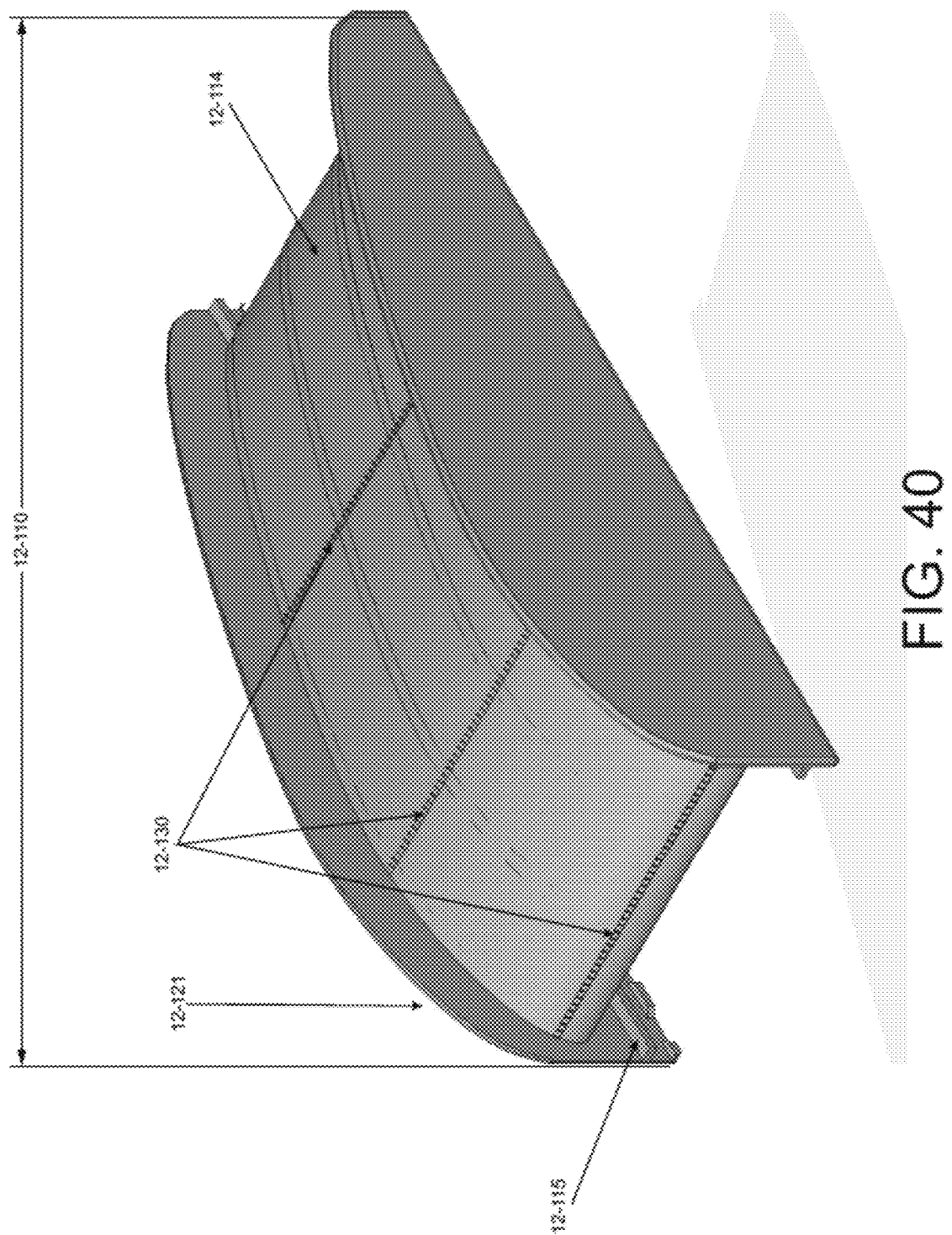
FIG. 40 shows a perspective view of lightened structure 12-110 of first subsystem 12-000.

The first subsystem (12-000) of the ecological system of the present invention is a body of aerodynamic profiles (12-100) optionally comprising one or more wing tip devices (12-121) shown in FIG. 40. The one or more aerodynamic profiles (12-100) comprises one or more vortex generator devices (12-130) also shown in FIG. 40. The one or more aerodynamic profiles (12-100) comprise one or more flow guides (12-140) although not shown in the figures. Said aerodynamic profile (12-100) comprises a lightened structure (12-110) shown in FIGS. 40 and 41 located within said aerodynamic profile (12-100).

FIG. 40 shows the profile in construction, or lightened structure (12-110), in which ribs to be perforated are shown, the skin (12-114), and the coupling elements (12-115).

The ribs (12-111) are rigid structures adapted to the aerodynamic form which reduce the profile's weight without affecting its sturdiness, and the skin is adhered to the ribs (12-111) and altogether form the first subsystem (12-000).

Figure 41:
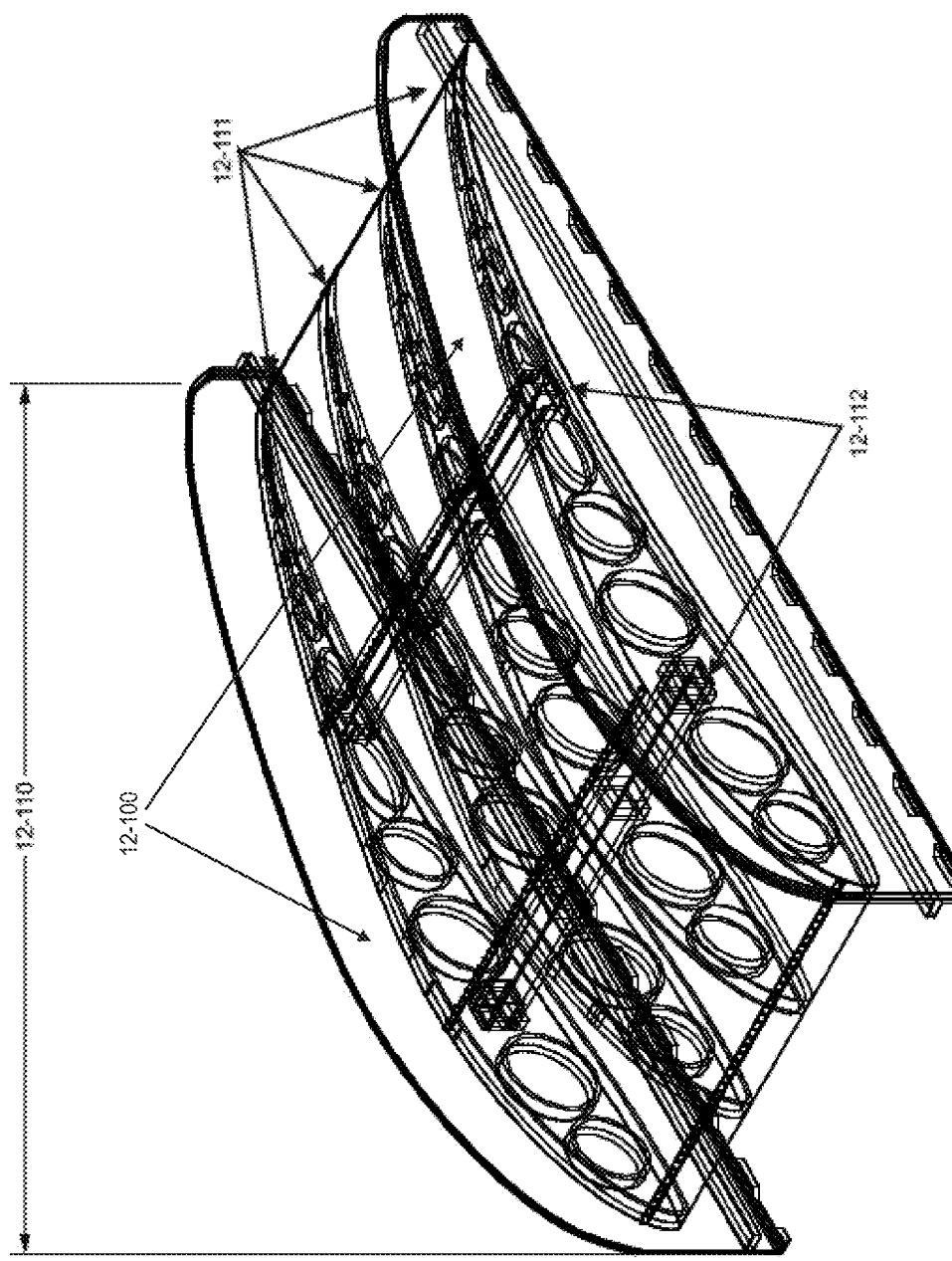
FIG. 41 shows a perspective view plane of the lightened structure 12-110 of first subsystem 12-000.

FIG. 41 shows a plan view of the lightened structure (12-110), the ribs (12-111) adapted to the aerodynamic profile form, the skin (12-114) which adheres to the ribs (12-111) and all together forming the aerodynamic profile (12-100). FIG. 41 also shows the beams (12-112) that tie the ribs (12-111) and provide structural support to anchor the system to the wing tip devices (12-121), which fix the system to the vehicle (400).

Figure 37:
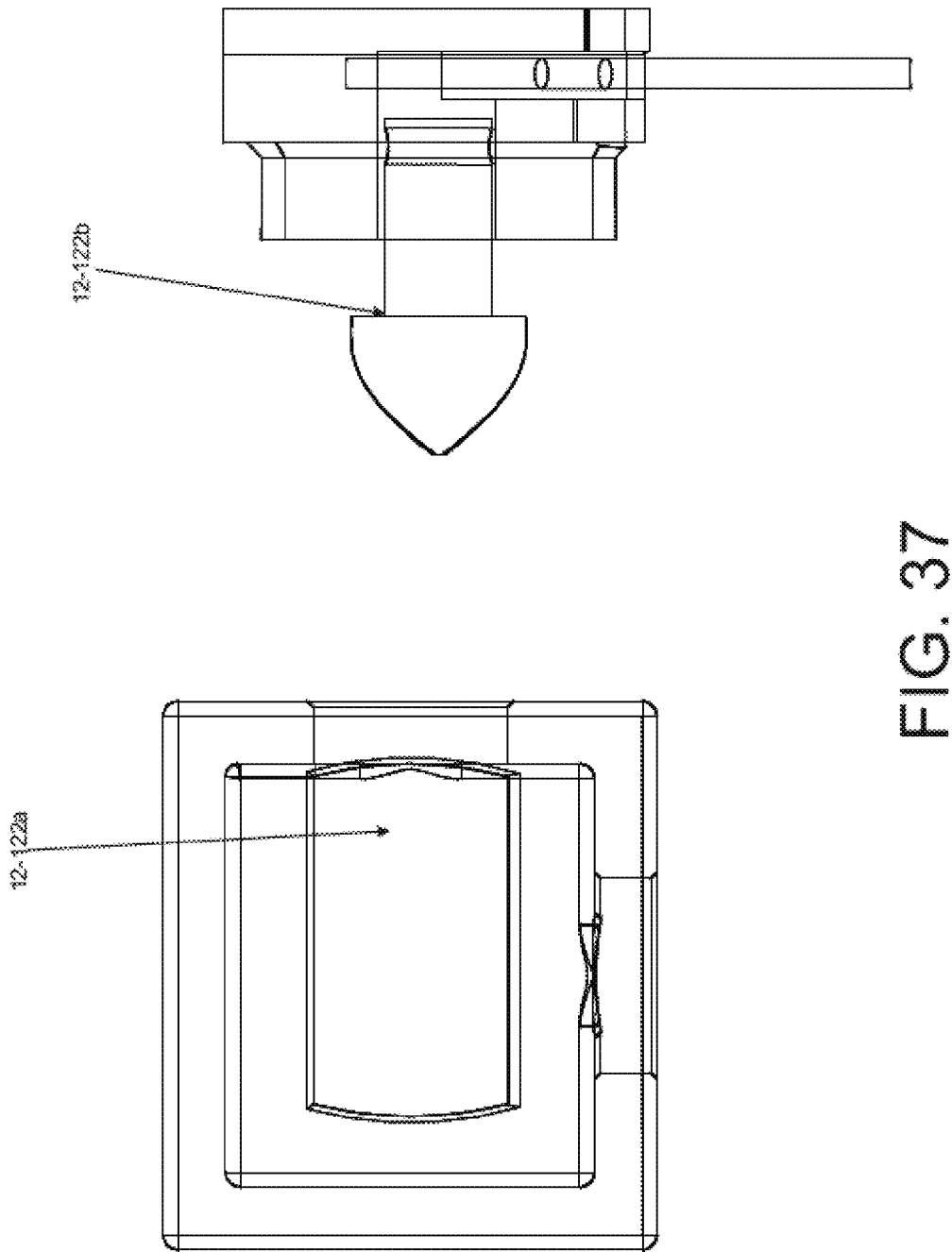

In one embodiment of the invention the aerodynamic profile (12-100) is joined to the vehicle (400) by selected fastening means, without limitation, of the side beams (12-122) which penetrate as male in one or more dies (12-122a) of vehicle (400), belts, cables, screws, bolts, nuts, cords or fastening brooches. FIG. 37 shows examples of fastening means consisting of one or more hubs located in the side beams (12-122) which penetrate as male in one or more dies (12-122a) of said vehicle (400).

In one embodiment, the aerodynamic profile (12-100) optionally comprises a support external structure (12-120) which is supported on one or more wing tip devices (12-121) which in turn transmit the force to side or lateral beams (12-122) which penetrate as a male in one or more dies (12-122a) of the vehicle (400).

Figure 49:
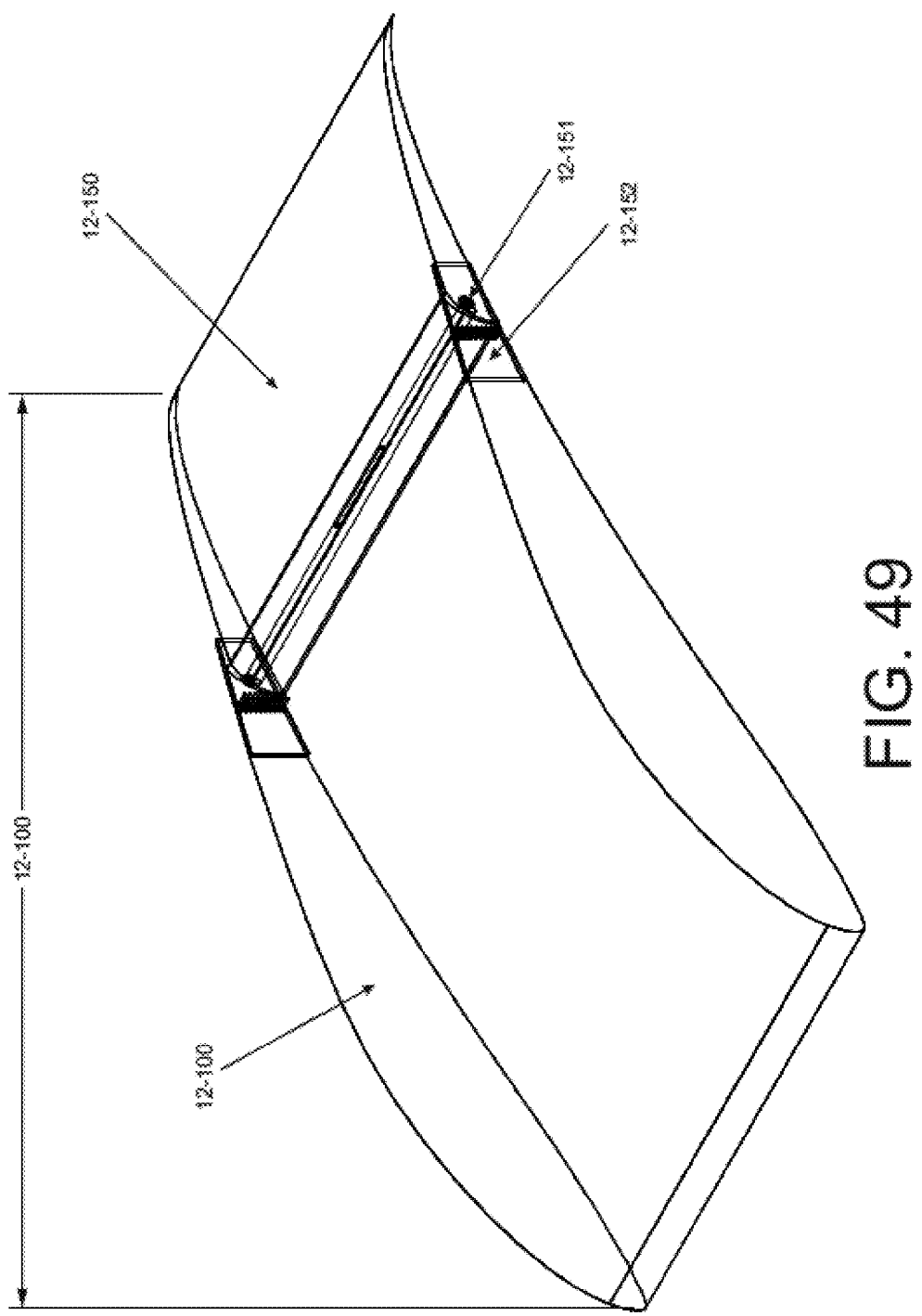
FIG. 49 shows the hyper-lifting devices (12-150)

The aerodynamic profile (12-100) comprises the combination of elements as hyper lifting devices (12-150), wing tip devices (12-121), side beams (12-122), lightened structure (12-110) and flow guides (12-140). FIG. 49 shows the first subsystem (12-000) wherein one can see that the aerodynamic profile (12-100) comprises one or more hyper lifting devices (12-150), said hyper lifting devices (12-150) can be located at the attack edge or slat or at the leakage edge or flap. FIG. 49 locates them at the flap.

Figure 1:
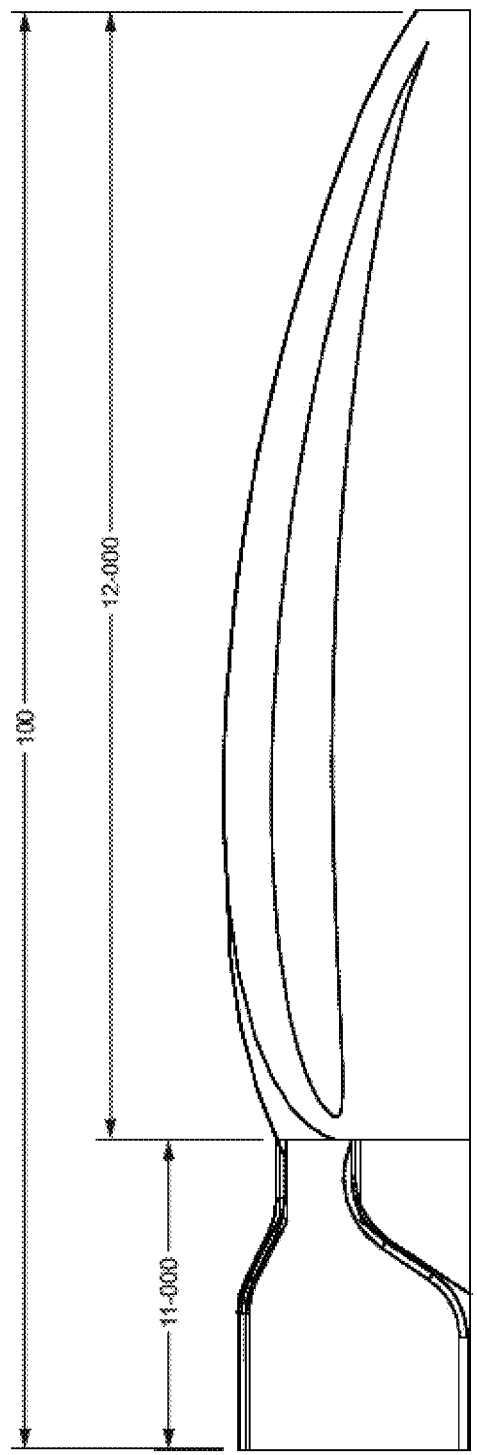
FIG. 1 is a cross section view of an example of an embodiment of the ecological system 100 of the invention, wherein the first subsystem 12-000 and the device 11-000 are shown.

FIG. 1 shows device (11-000) of the ecological system (100) which collects air and through the area reduction at the output generates an increase in air flow velocity until it impacts an aerodynamic profile (12-100) or first subsystem (12-000) and generates lifting on it and from that reduces the vehicle (400) weight.

Figure 2:
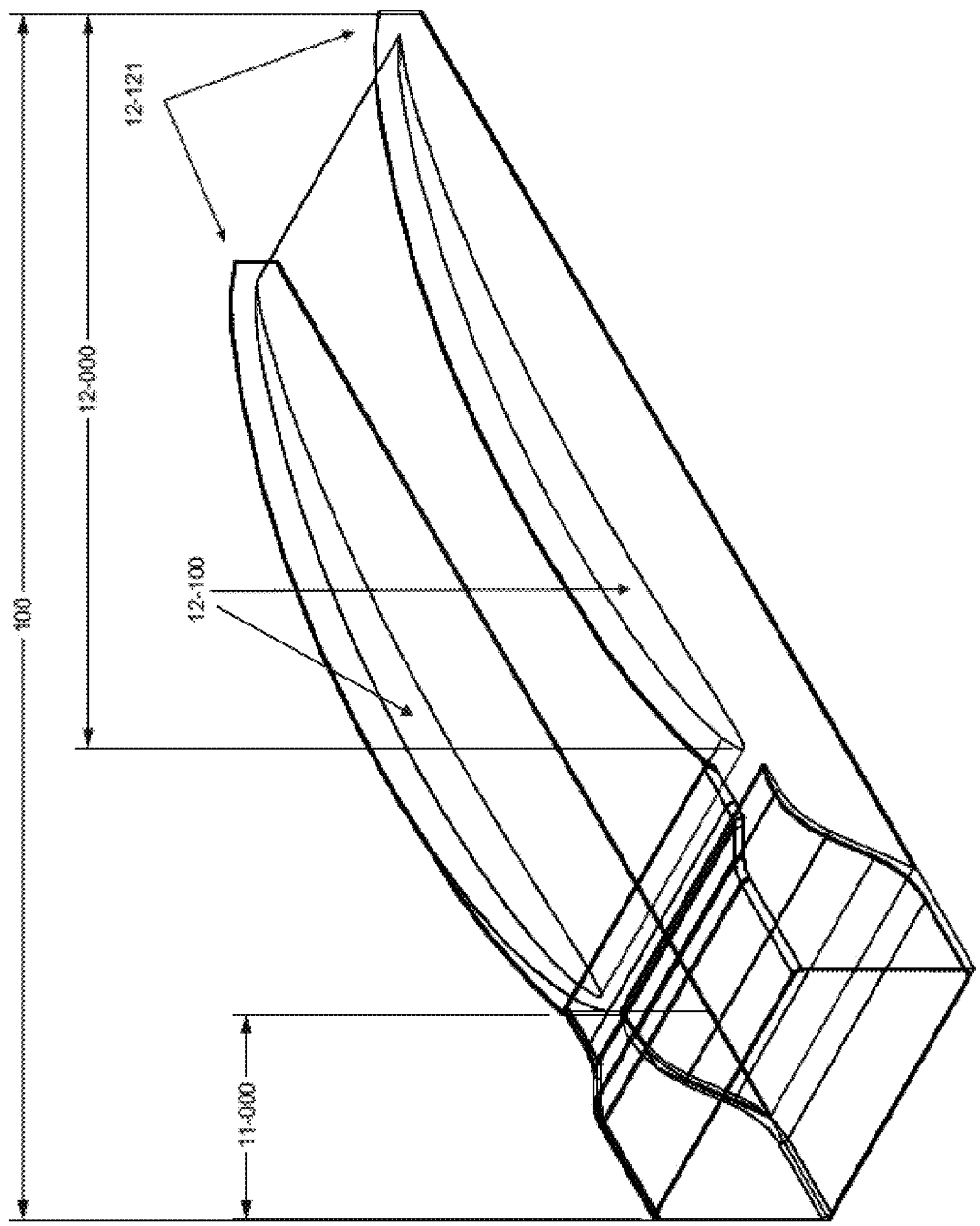
FIG. 2 is a perspective view of an example of an embodiment of the ecological system 100, wherein the first subsystem 12-000 and the device 11-000 are shown.

FIG. 2 shows the same device (11-000) wherein the wing tip devices (12-121) have double function, integrating and anchoring device (11-000) with the aerodynamic profile (12-100) in the vehicle (400), and the second function is preventing the air flow circulating under the aerodynamic profile (12-100) to be mixed with the air flow circulating over the profile (12-100). The wing tip devices (12-121) prevent this Flow mixture to maintain the aerodynamic lifting generated by the ecological system (100).

Figure 3:
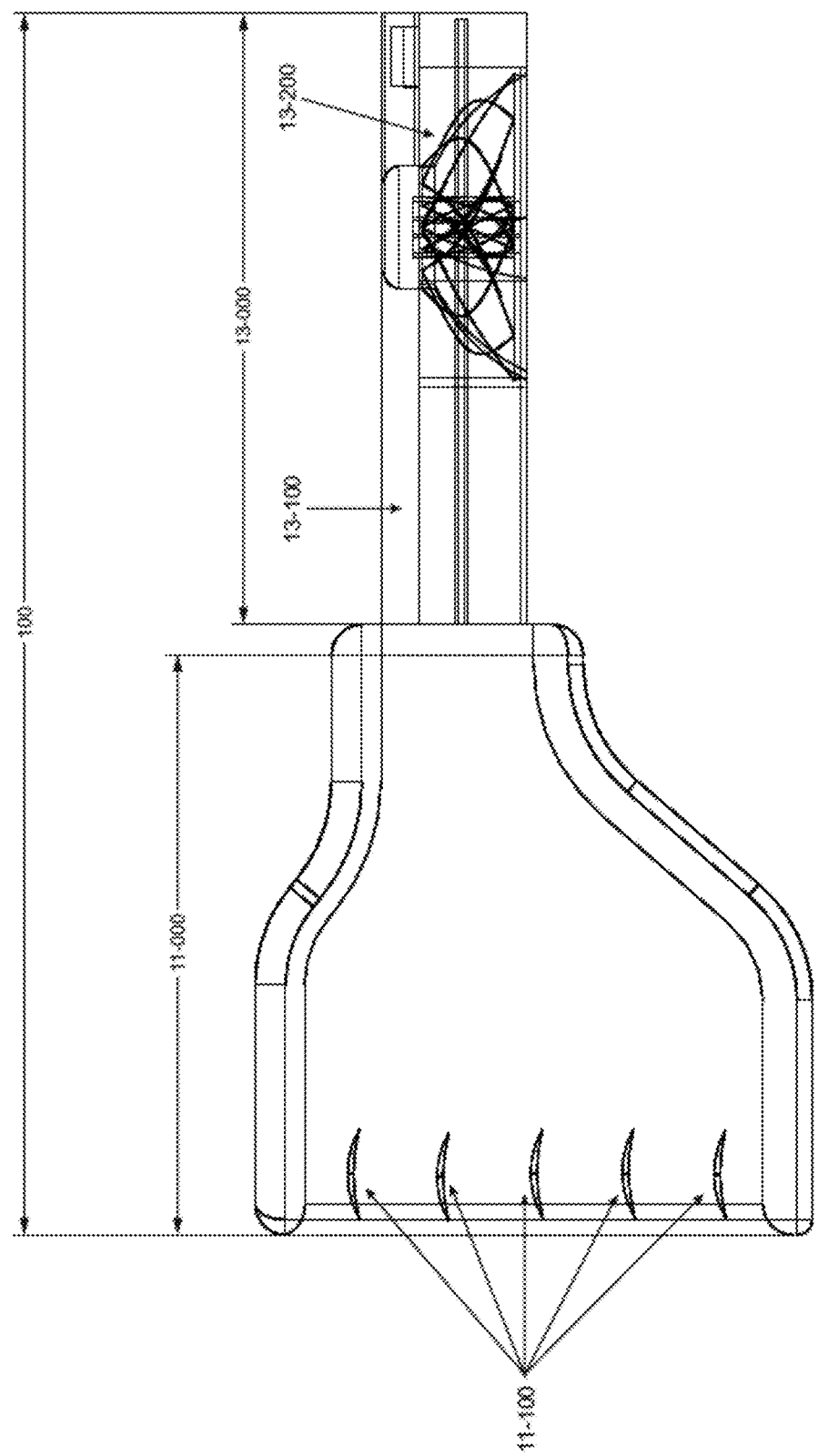
FIG. 3 is a cross section view of an example of an embodiment of the ecological system 100 of the invention, wherein the second subsystem 13-000 and the device 11-000 are shown.
Figure 10:
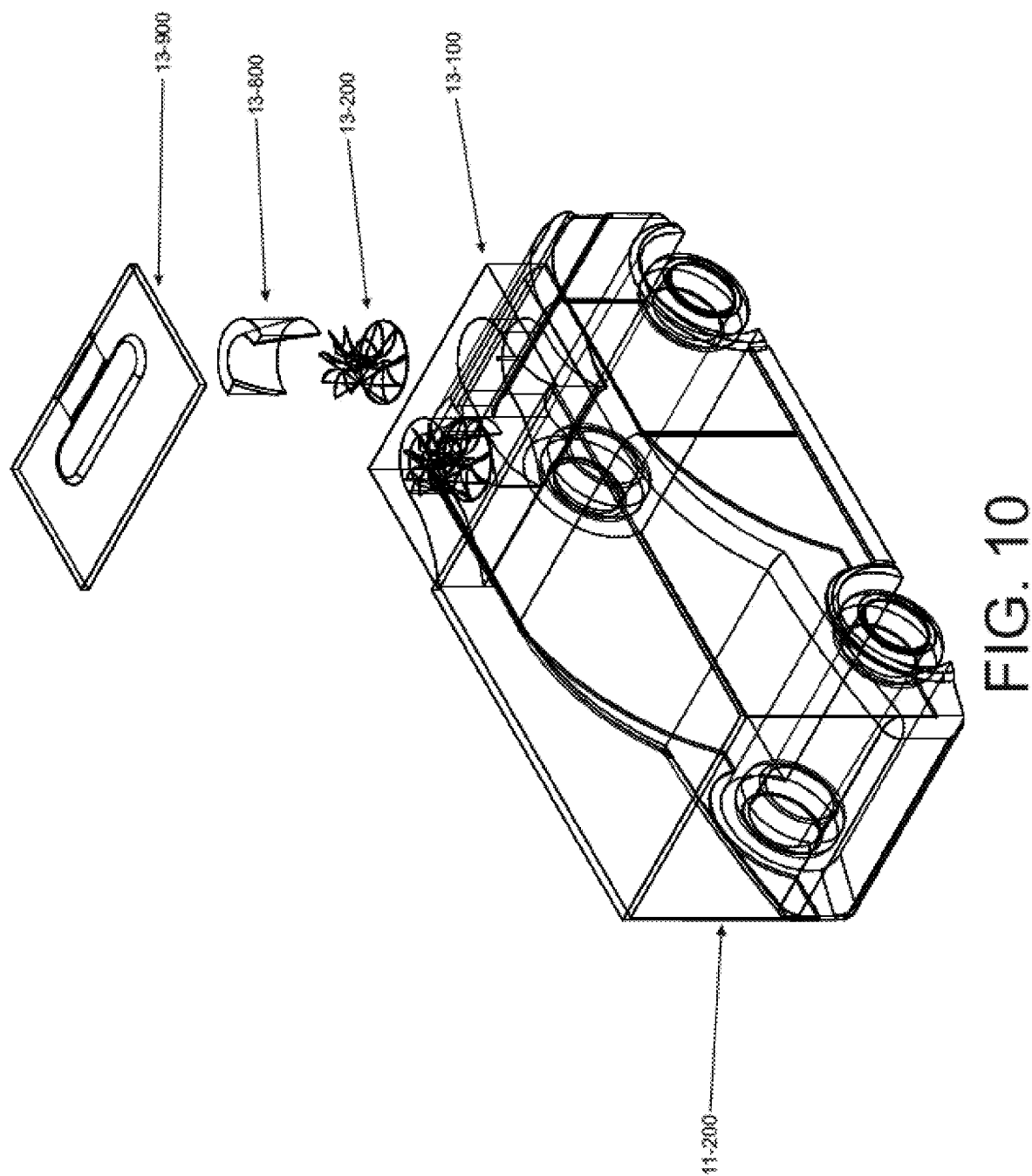
FIG. 10 shows the exploding view of the car, wherein turbines (13-200) are shown.
Figure 11:
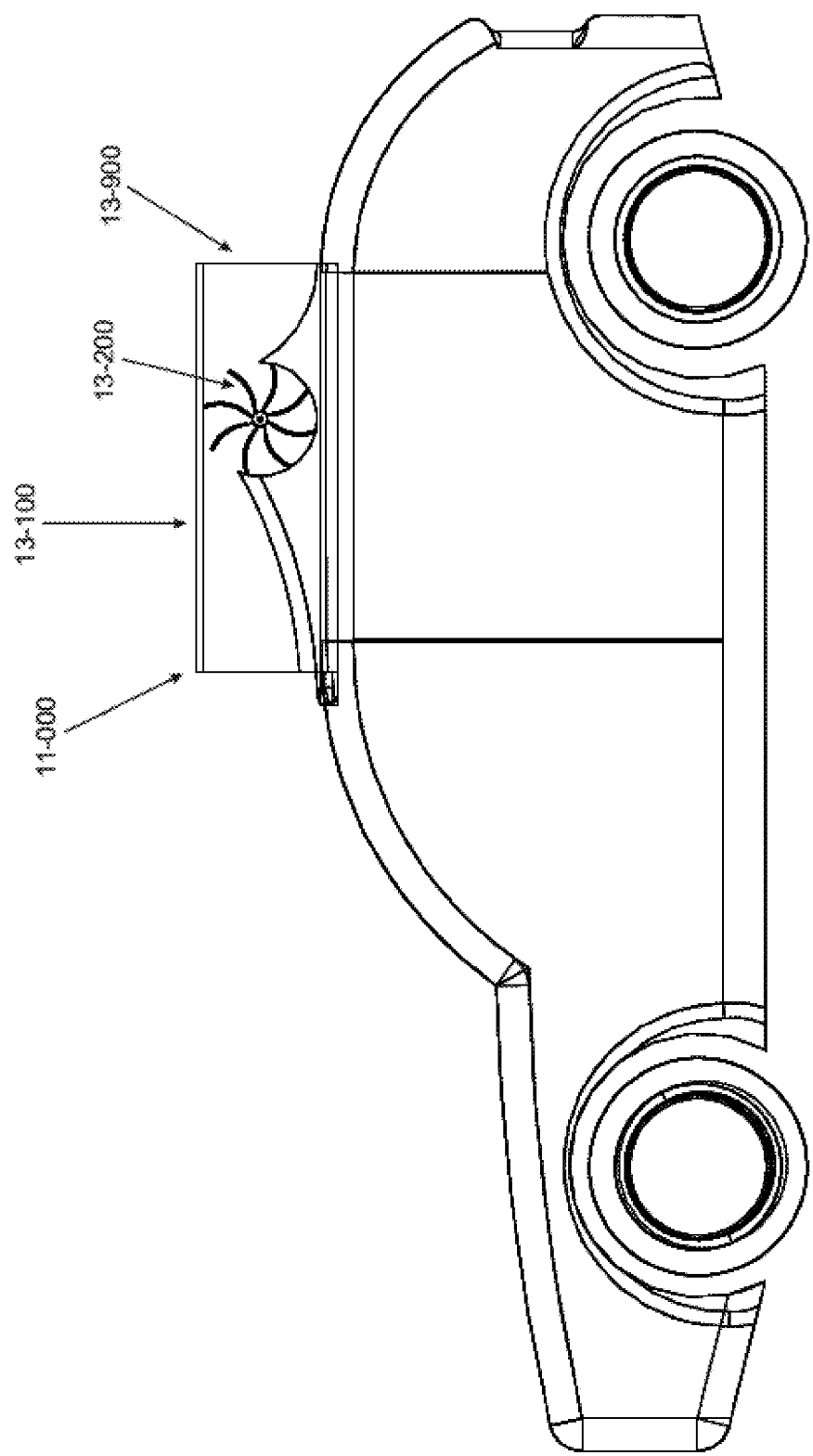
FIG. 11 shows the cross section of the car with an ecological system 100 according to an example of an embodiment wherein the housing 13-100 of the second subsystem 13-000 y turbine 13-200 are shown.
Figure 12:
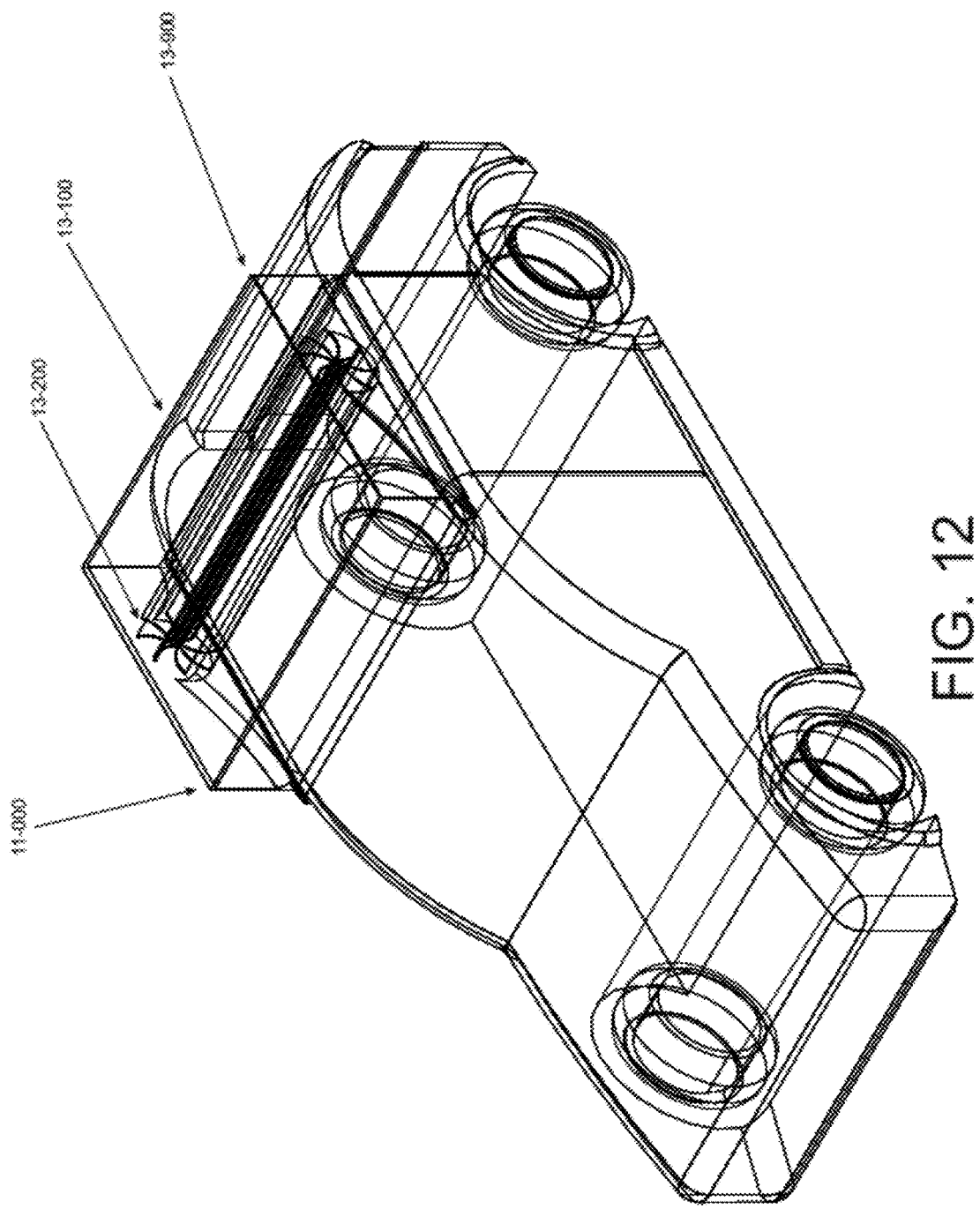
FIG. 12 shows the perspective view of the car wherein the second subsystem 13-000, the housing 13-100 and the exhaust elements 13-900 with the embodiment of radial turbines.
Figure 13:
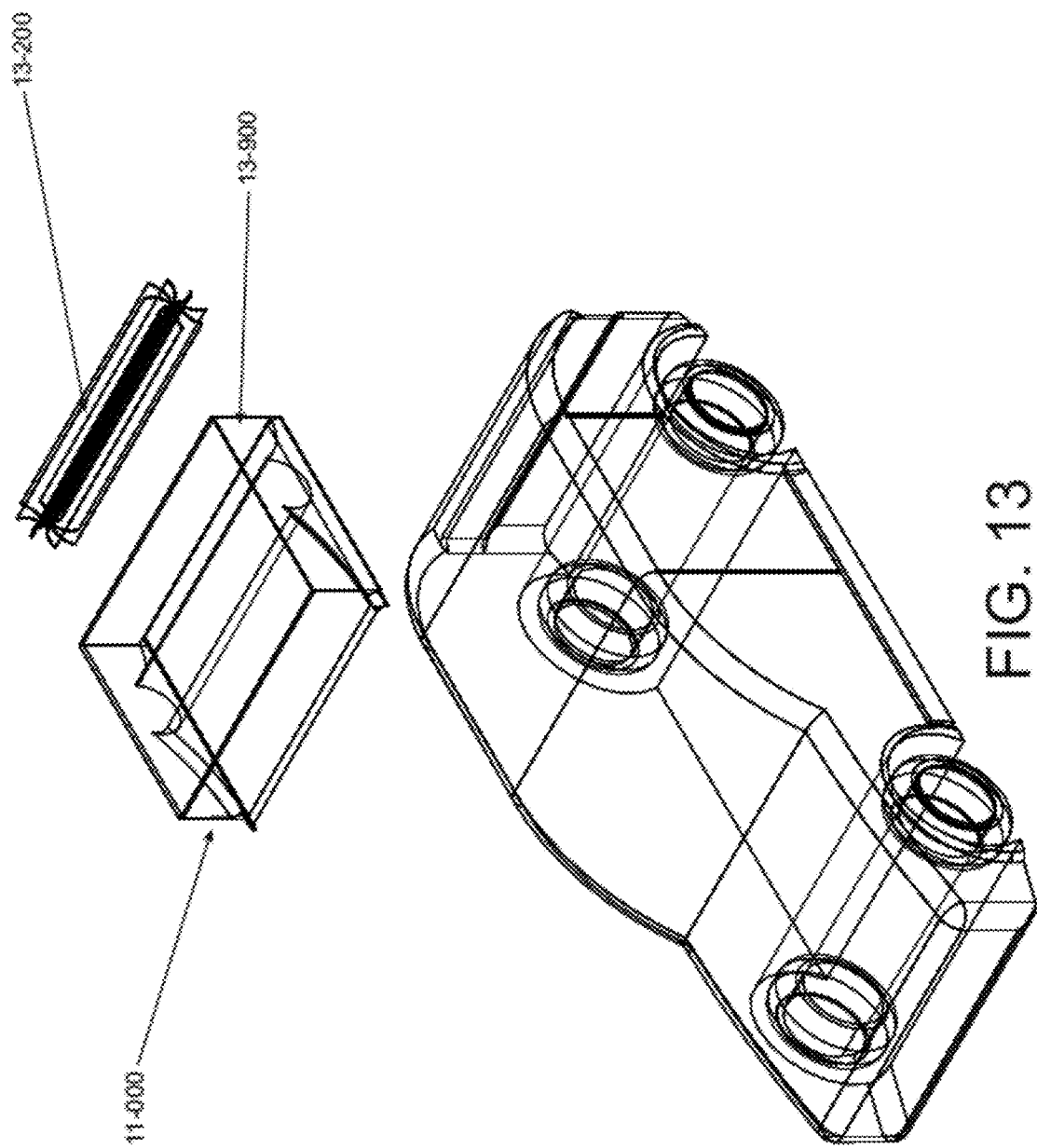
FIG. 13 shows the exploded view of the car wherein turbines (13-200) and exhaust elements 13-900 are shown.
Figure 44:
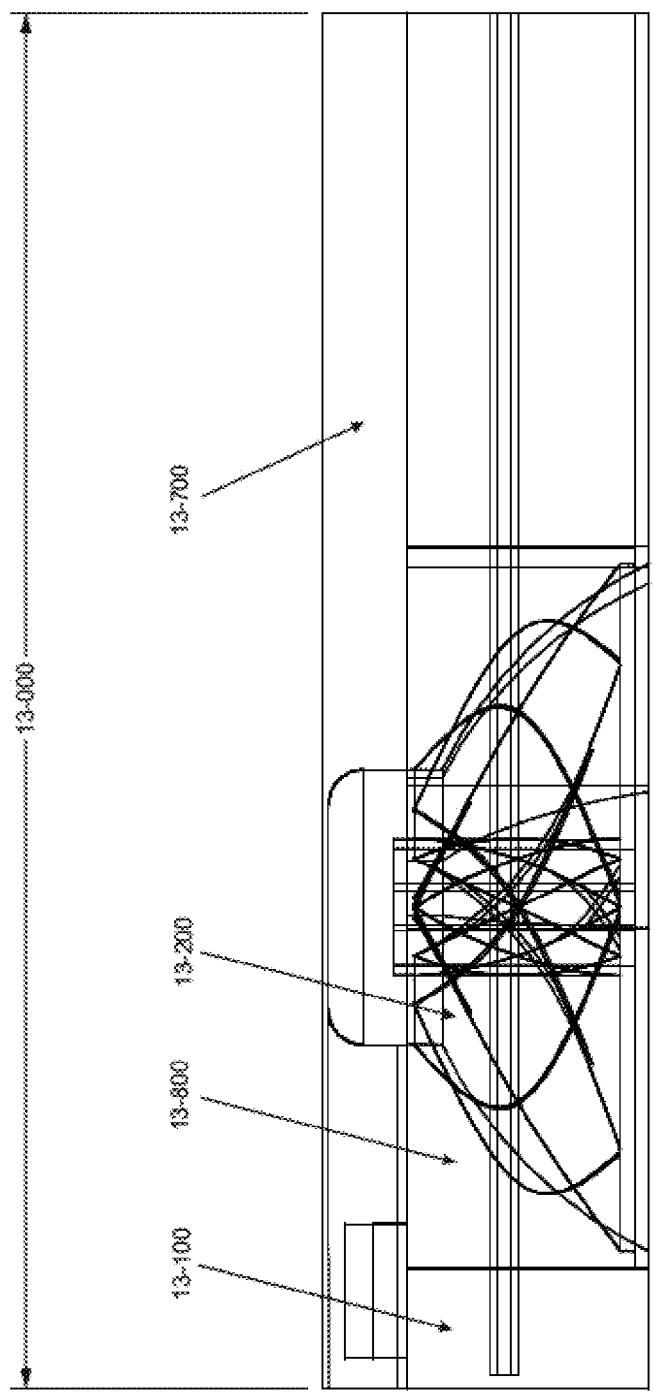
FIG. 44 shows a front view of second subsystem 13-000.
Figure 45:
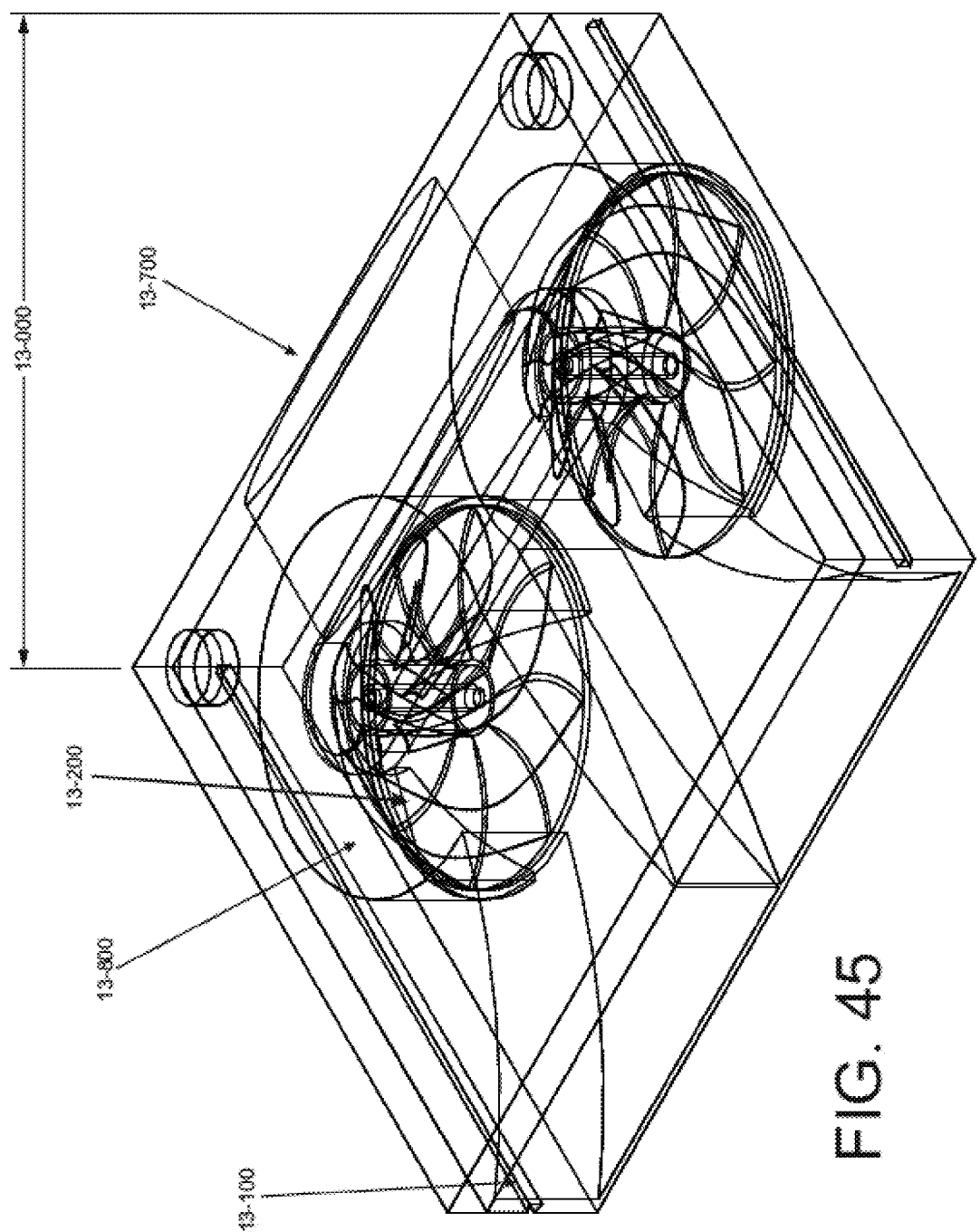
FIG. 45 shows a perspective view of the second subsystem 13-000.

FIGS. 3, 10, 11 y 12 show the second subsystem (13-000) of the ecological system of the present invention, which comprises a housing (13-100), one or more turbines (13-200) that drive one or more electric energy generators through one or more transmission systems (13-400) not shown in the figures, one or more internal or external motors of the turbine, one or more internal or external transmission systems, one or more noise diffusor or noise cancelers (13-700) and one or more exhaust elements (13-900), the latter elements are shown in FIGS. 44, 45.

The housing (13-100) encompasses the turbines (13-200) which allow the electric energy generation, the housing (13-100) is a structure built in its outside in a rigid material and in its inside is a structure preferable of the honeycomb type to mitigate noise produced by the turbines (13-200). Said housing (13-100) has displacement means, preferably one or more rails, on its side walls so that said subsystem can be retracted and thus facilitate its uninstalling and transporting. Turbines (13-200) can be longitudinal or axial type as shown in FIG. 11.

Figure 17:
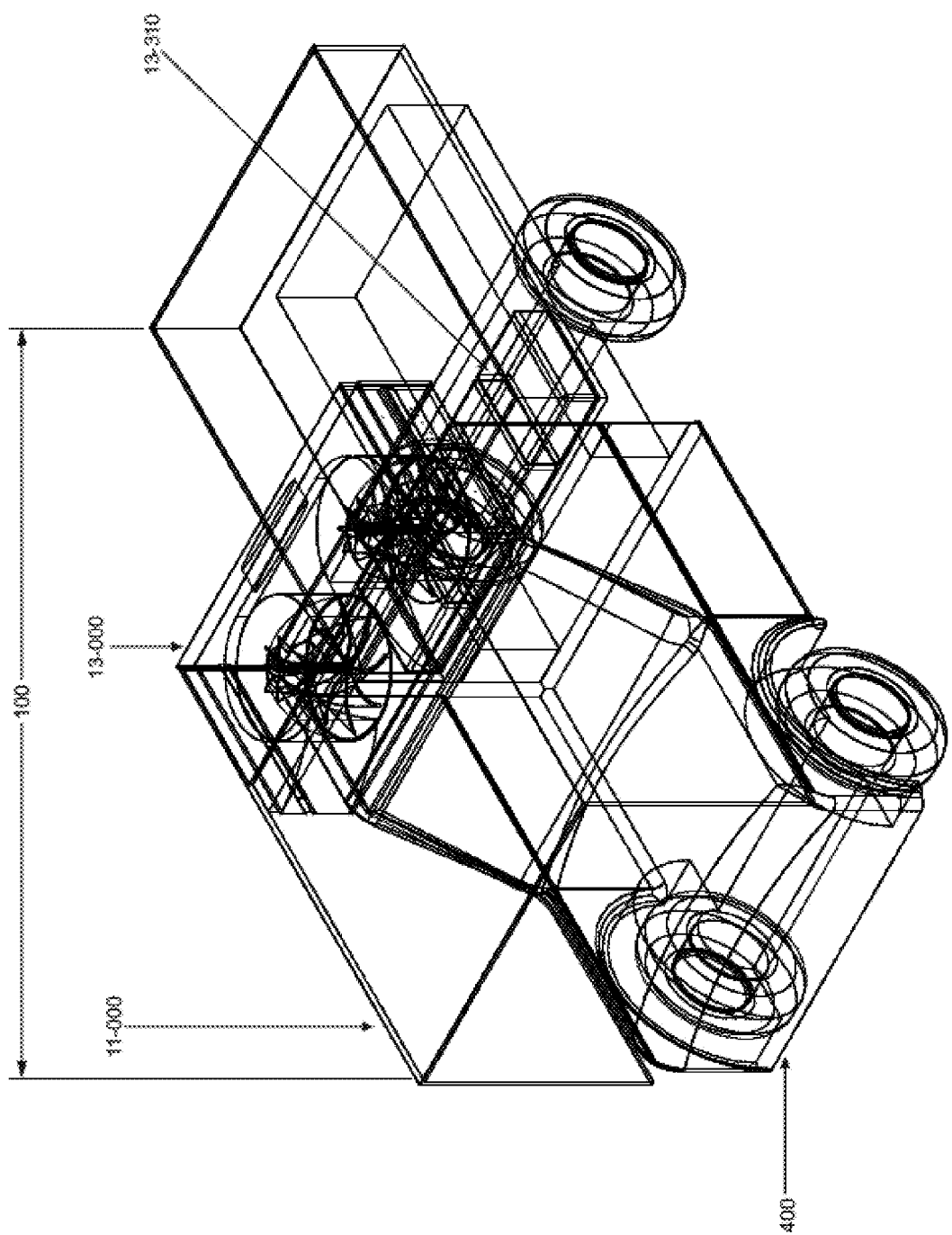
FIG. 17 shows the perspective view of the pickup truck with an ecological system 100 according to an example of an embodiment, wherein the second subsystem 13-000 and the device 11-000 are shown.

In a preferred embodiment turbines (13-200) are wind turbines which compress striking air, and address it towards the air exhaust elements (13-900) and to the noise cancelling elements (13-700), turbines (13-200) rotate in opposite directions, additionally, as the air strikes with their Blades a coil in the center of the turbine (13-200) rotates and induces electron flow in an axle supported in the housing wherein energy is distributed to converters or to energy storage batteries (13-310), shown in FIG. 17, which can optionally be part of the system or lodged in the vehicle.

Noise cancelling elements (13-700) corresponds to a sheet which mixes air Flow inside the turbines (13-200) facing it and allowing that the sound waves generated when air is compressed find each other and cancel each other.

Figure 50:
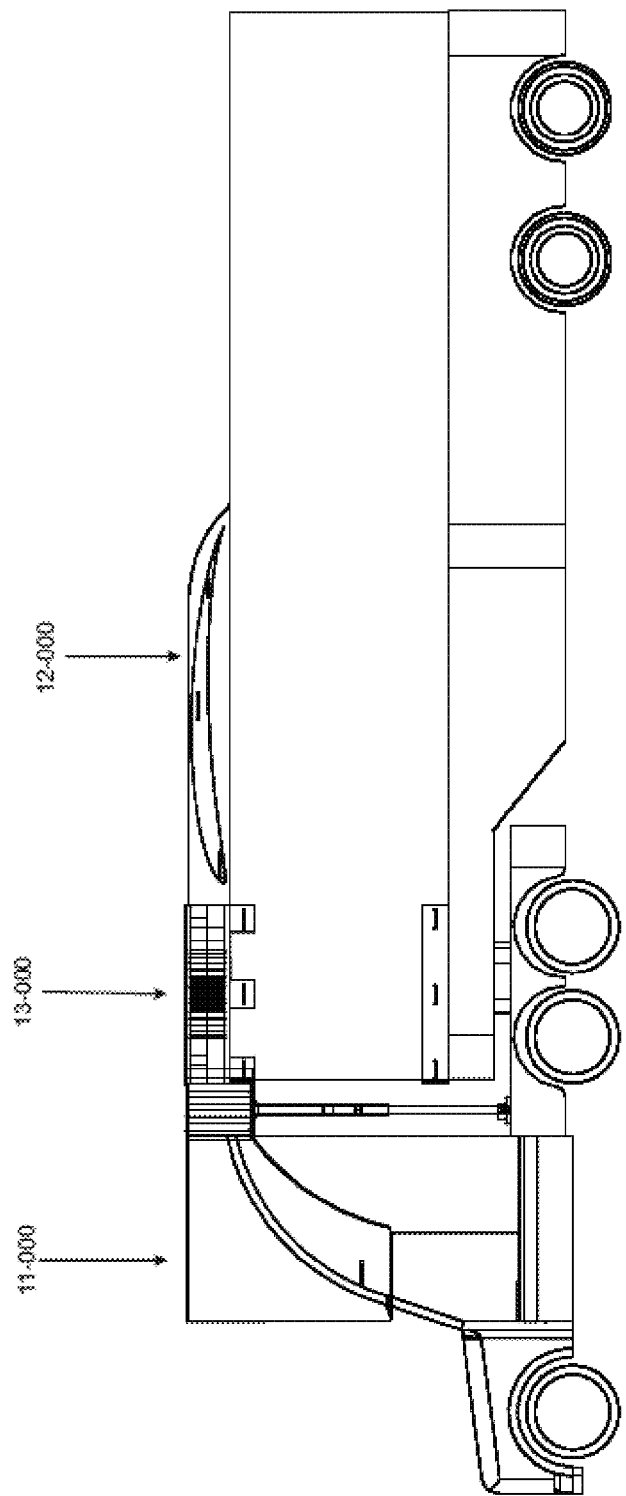
FIG. 50 shows the combination of first subsystem 12-000 and second subsystem 13-000 coupled to the device 11-000 in the articulated truck.
Figure 51:
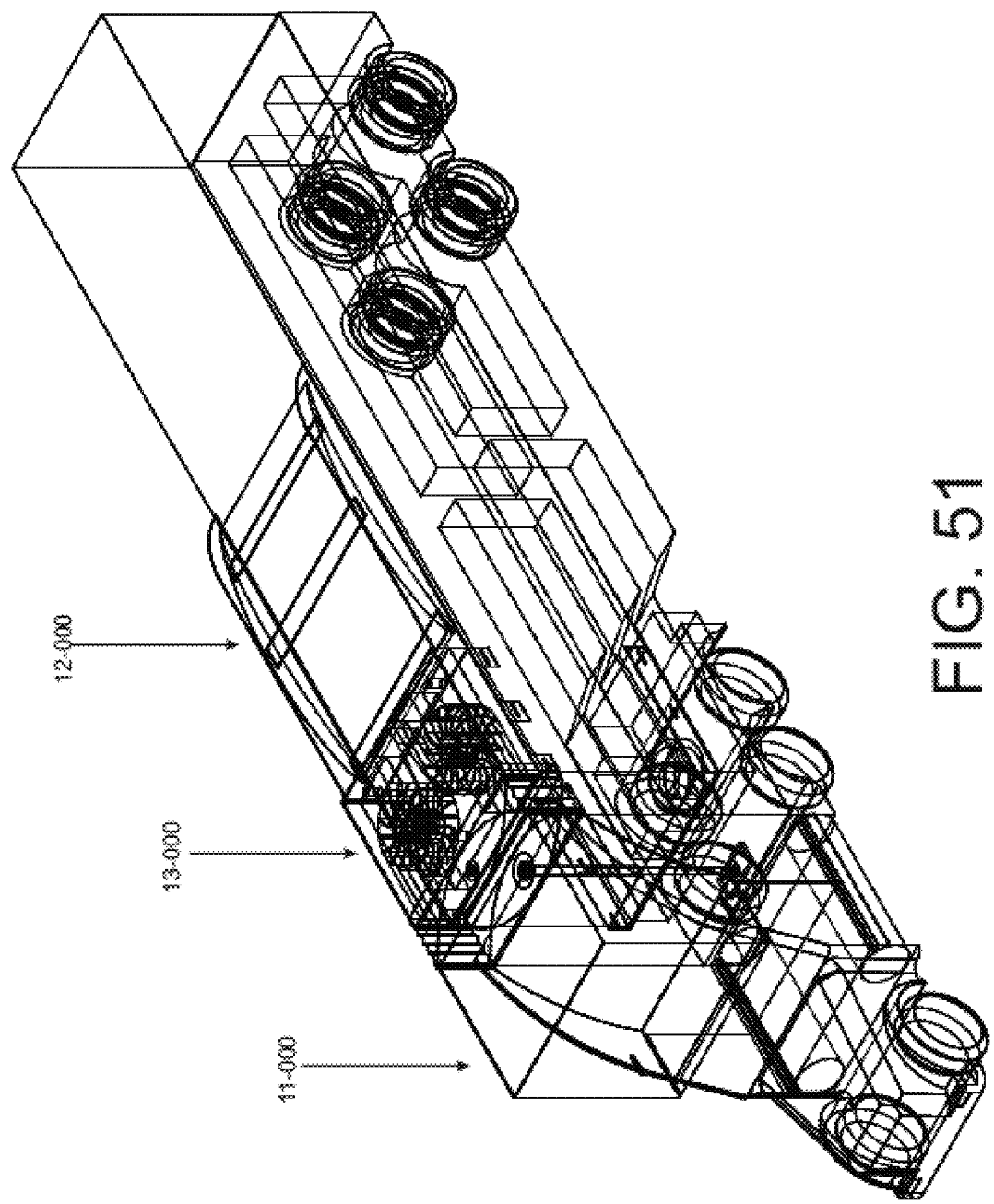
FIG. 51 shows a perspective view of the combination of first 20 subsystem 12-000 and second subsystem 13-000 coupled to the device 11-000 in the articulated truck.

In other embodiment of the invention, the first subsystem (12-000) and the second subsystem (13-000) of the ecological system (100) operate together. For example, FIGS. 50 and 51 show a preferred embodiment of the ecological system (100) that uses kinetic energy for a moving vehicle (400), wherein the vehicle (400) is an articulated truck having subsystems (12-000) and (13-000) jointly operating.

In another embodiment of the invention, subsystems (13-000) and (12-000) separately operate within the ecological system (100).

For example, an ecological system embodiment has a device (11-000) which guides, compresses, accelerates and projects an airmass caught by device (11-000) in the moving vehicle (400), and a subsystem (12-000) receiving projected air flow from the device (11-000) towards an aerodynamic profile (12-100) which generates lifting to the vehicle (400).

Figure 5:
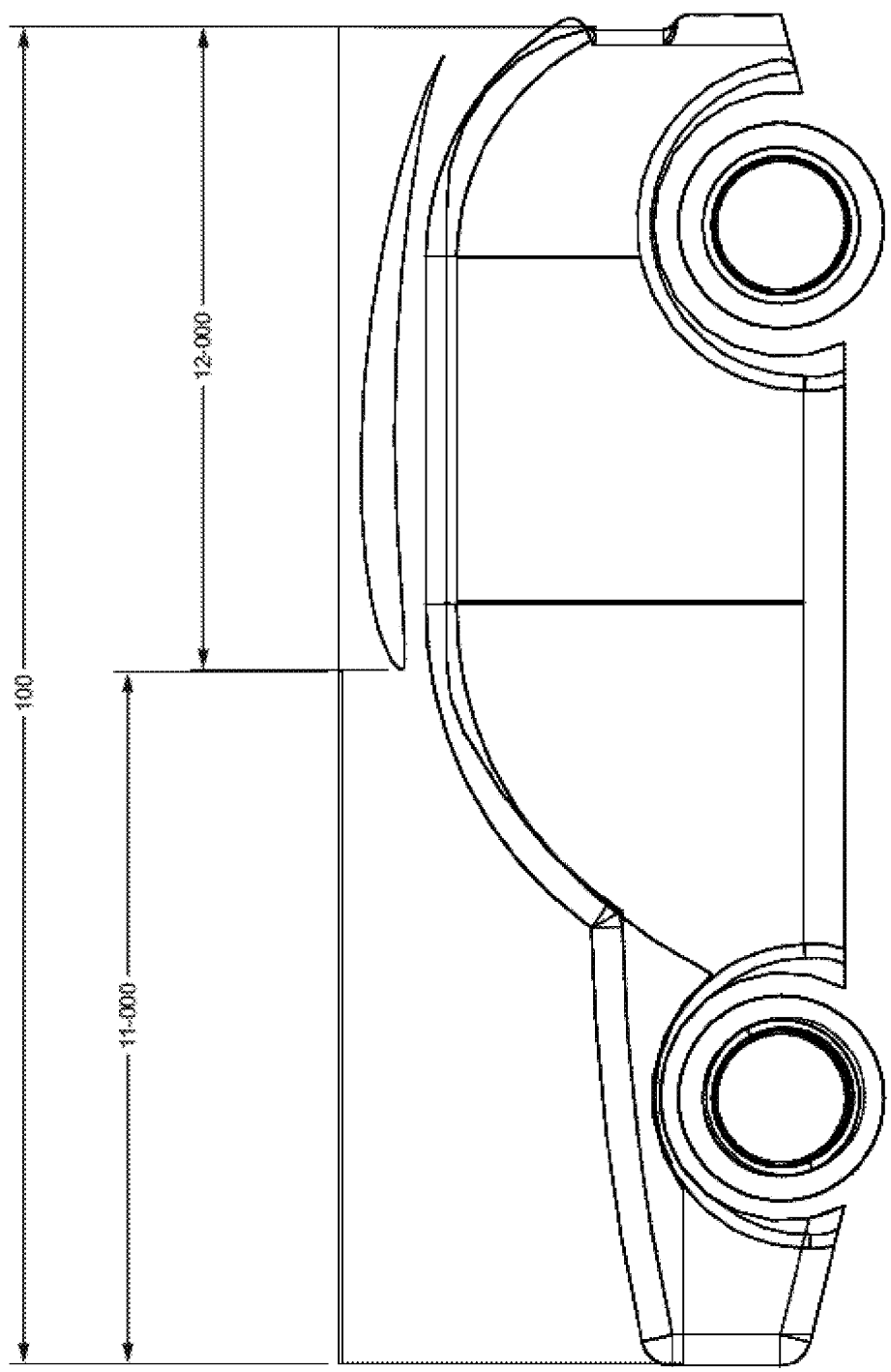
FIG. 5 shows a cross section of the car with an ecological system 100 according to an example of an embodiment, wherein the first subsystem 12-000 and the device 11-000 are shown.
Figure 6:
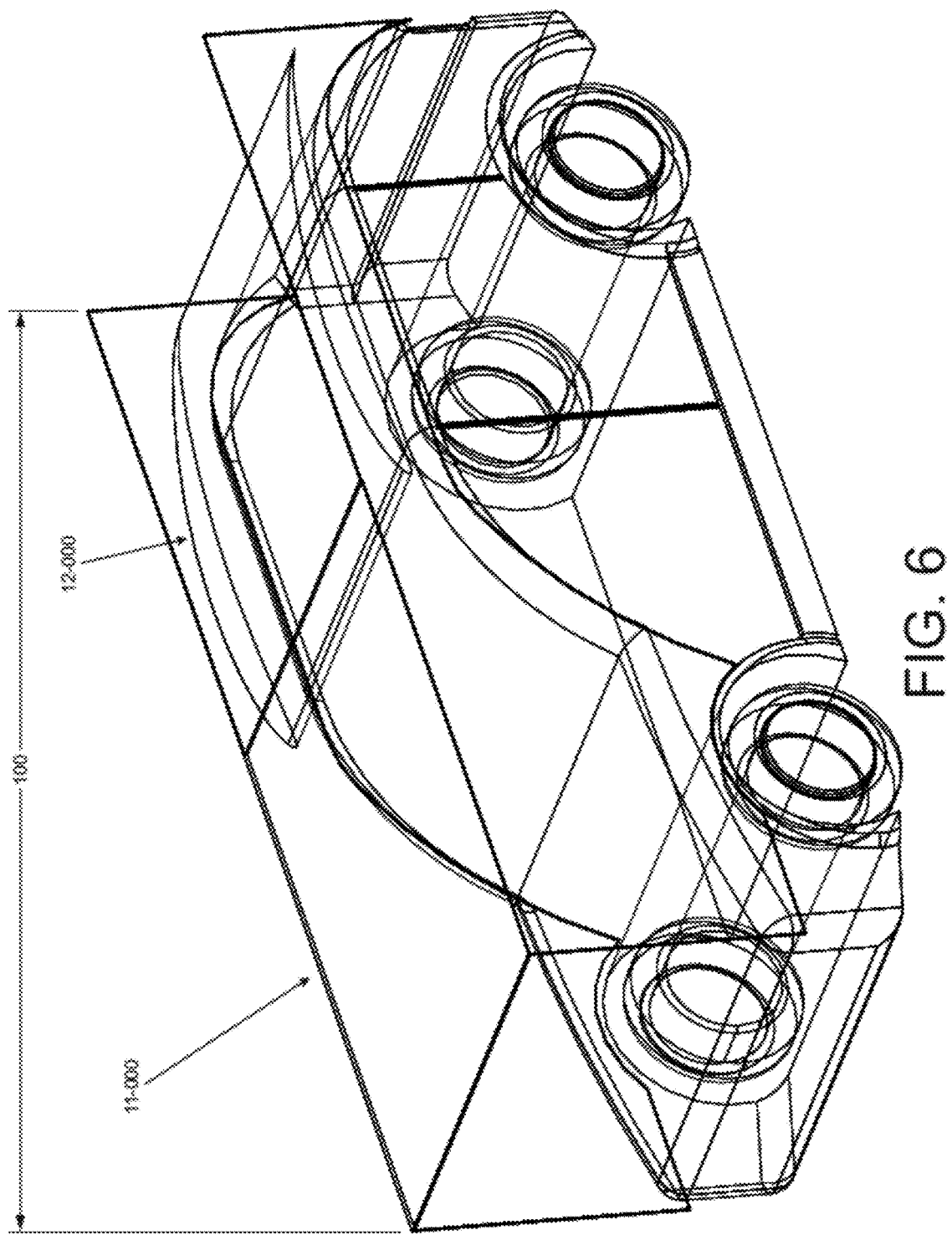
FIG. 6 is a perspective view of the car with an ecological system 100, according to an example of an embodiment wherein the first subsystem 12-000 and the device 11-000 are shown.

FIGS. 5, 6 y 7 shows that in this embodiment the vehicle is a car, a normal car, a five-door car, in which the input area of device (11-000) is formed by the vehicle (400) itself and an air collect boxing system and the aerodynamic profile found at the upper part of the vehicle (400). In this embodiment the system is manufactured with a transparent r translucent material such that no blind points are generated in the vehicle (400).

Figure 7:
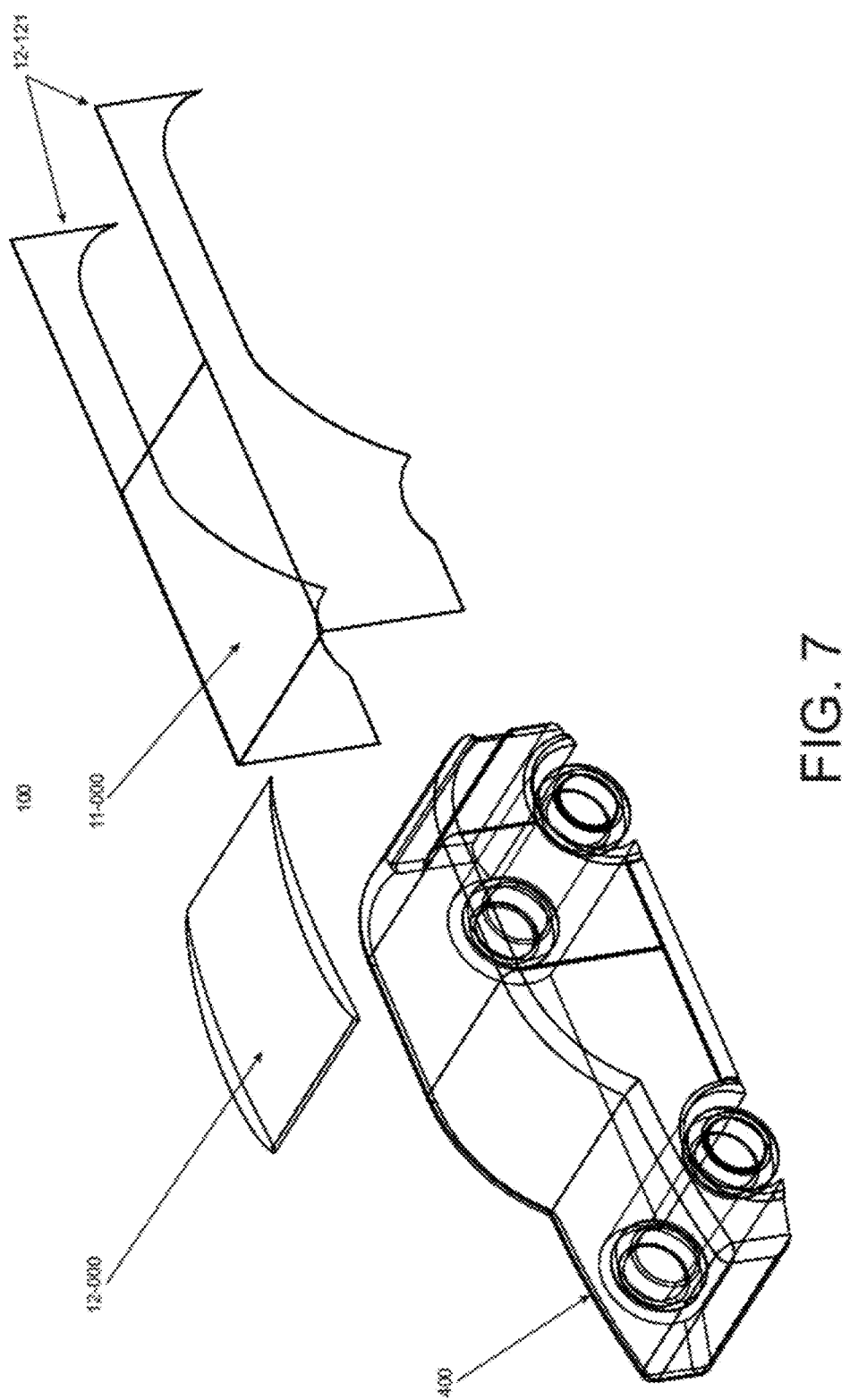
FIG. 7 shows the exploding view of the car with an ecological system 100 according to an example of an embodiment, wherein the first subsystem 12-000 and the device 11-000 are shown.
Figure 8:
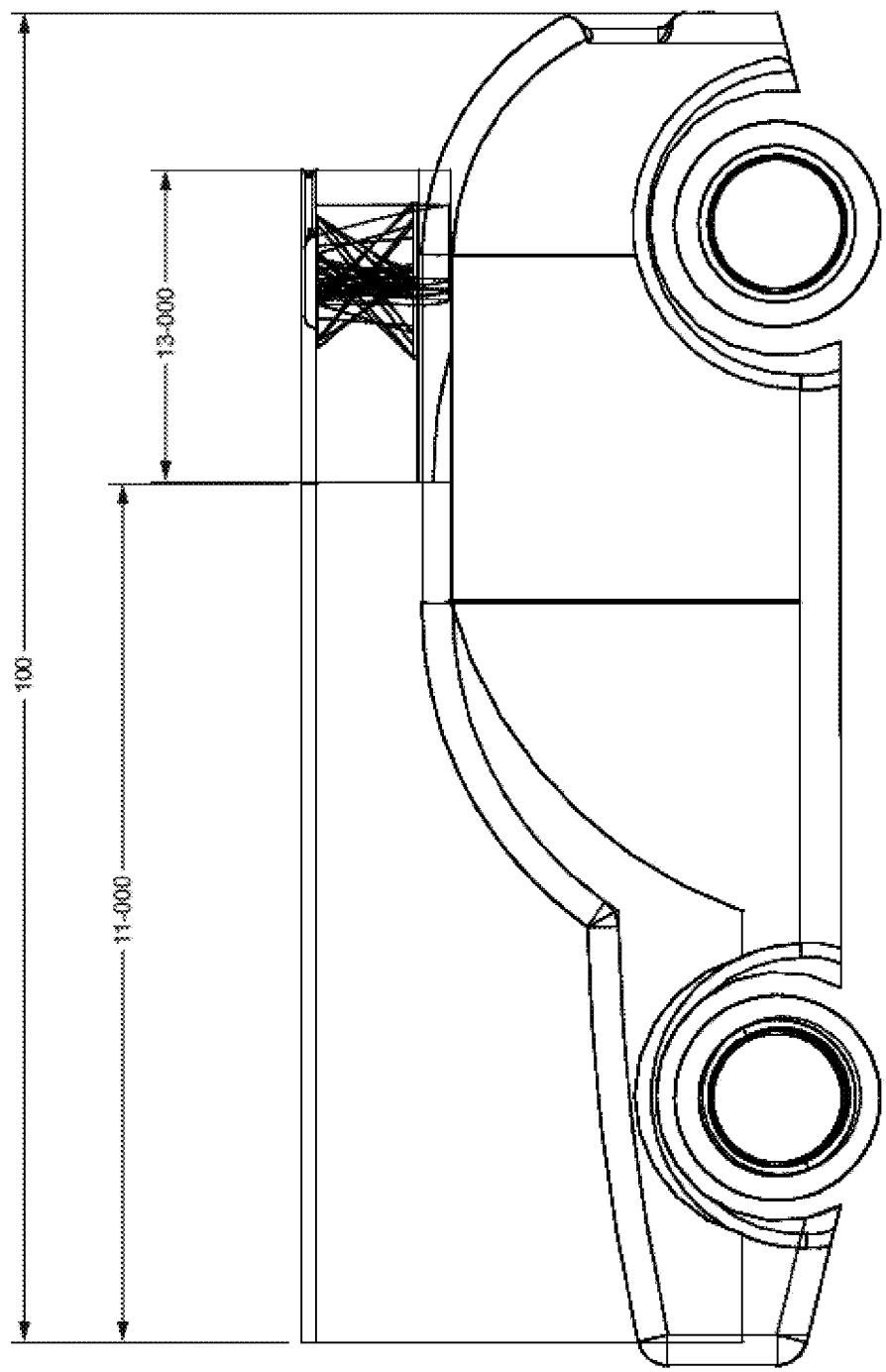
FIG. 8 shows a cross section of the car with an ecological system 100 according to an example of an embodiment, wherein the second subsystem 13-000 and the device 11-000 are shown.
Figure 9:
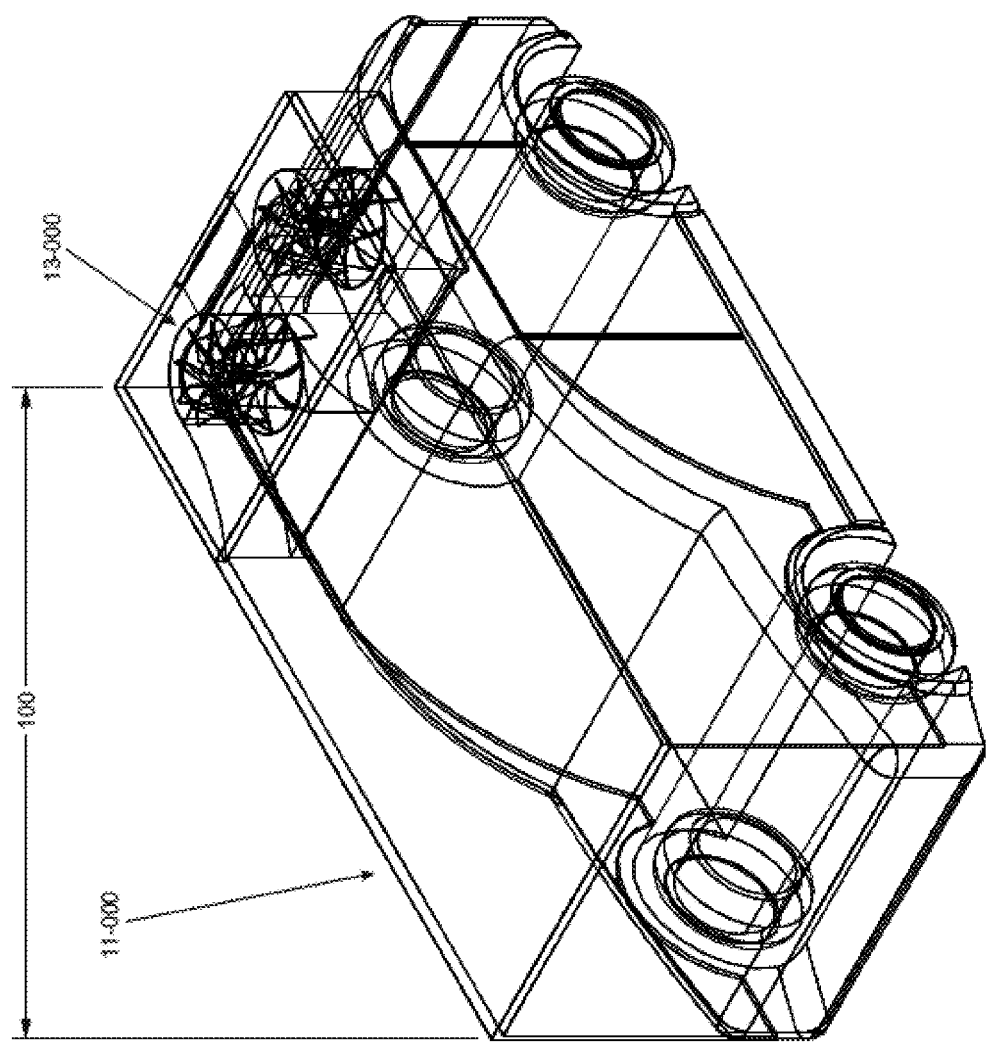
FIG. 9 shows the perspective view of the car with an ecologic system 100 according to an example of an embodiment, wherein the second subsystem 13-000 and the device 11-000 are shown.

FIG. 7 shows an exploded view of the ecological system for the same vehicle (400) shown in FIGS. 5 y 6, wherein the device (11-000) is conformed when joined with the vehicle (400), the aerodynamic of the vehicle (400) in combination with device (11-000) in this embodiment is formed by two walls, hood, roof and windshield of the vehicle (400). It also shows the wing tip devices (12-121).

Figure 14:
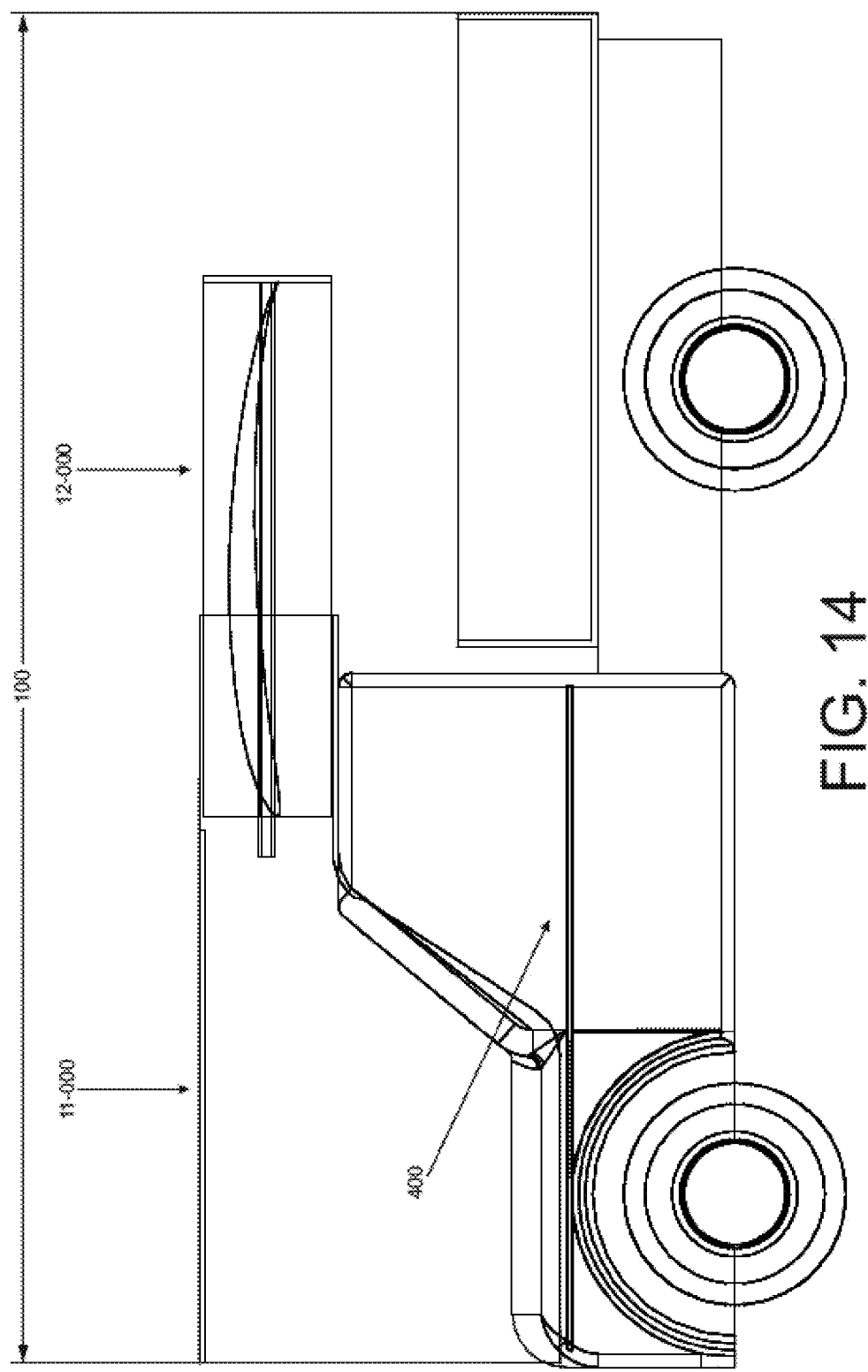
FIG. 14 shows the cross section of a pickup truck with an ecological system 100 according to an example of an embodiment, wherein the first subsystem 12-000 and the device 11-000 are shown.
Figure 15:
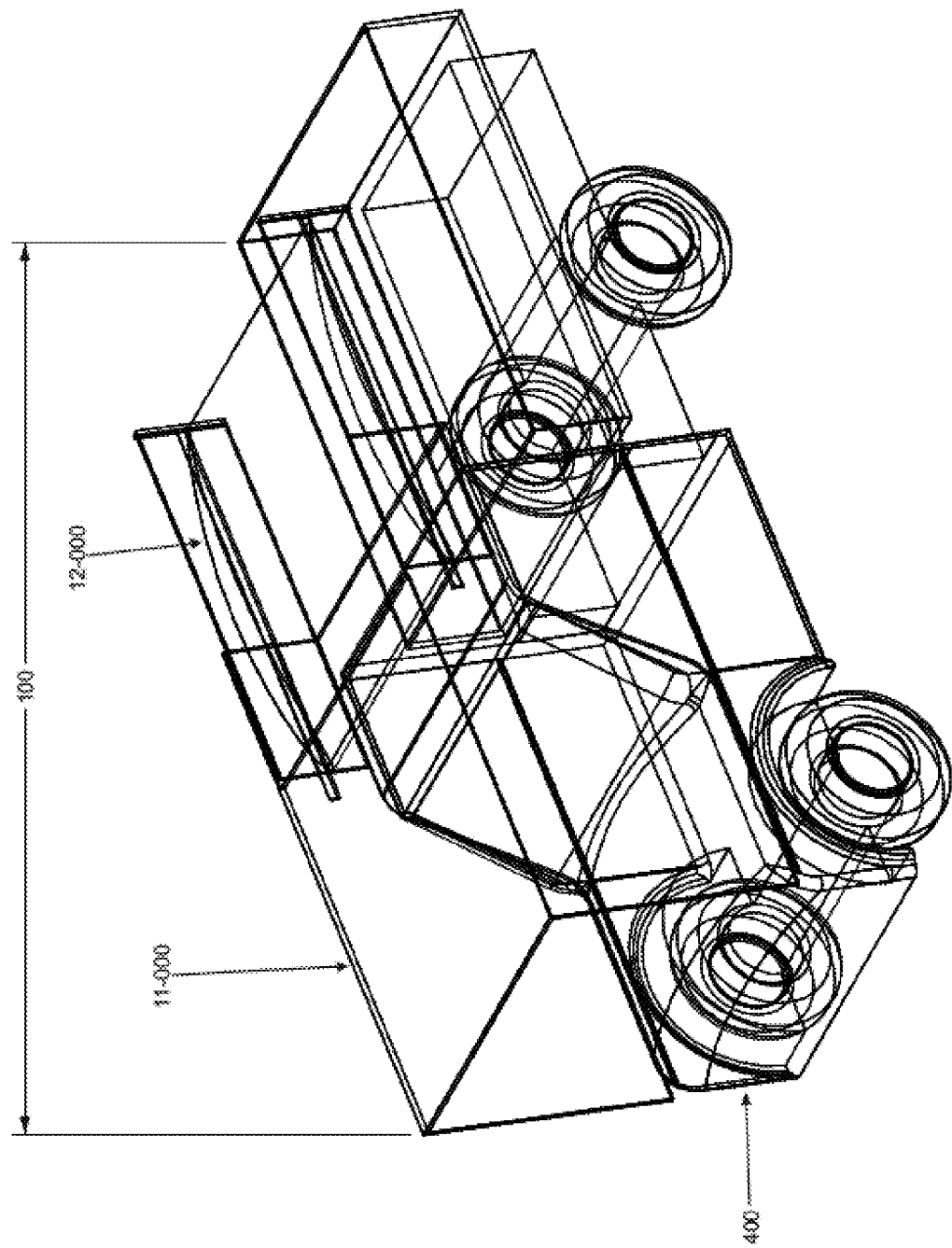
FIG. 15 shows the perspective view of the pickup truck with an ecological system 100 according to an example of an embodiment, wherein the first subsystem 12-000 and the device 11-000 are shown.

FIGS. 14 and 15 show another embodiment of the configuration of the ecological system (100) which comprises device (11-000) and subsystem (12-000). In this embodiment the vehicle (400) is a pickup truck. The device (11-000) is formed by a housing that forms the duct and the pickup truck geometry, and subsystem (12-000) is installed in the cabin of the pickup truck, corresponding to the aerodynamic profile (12-100).

Figure 19:
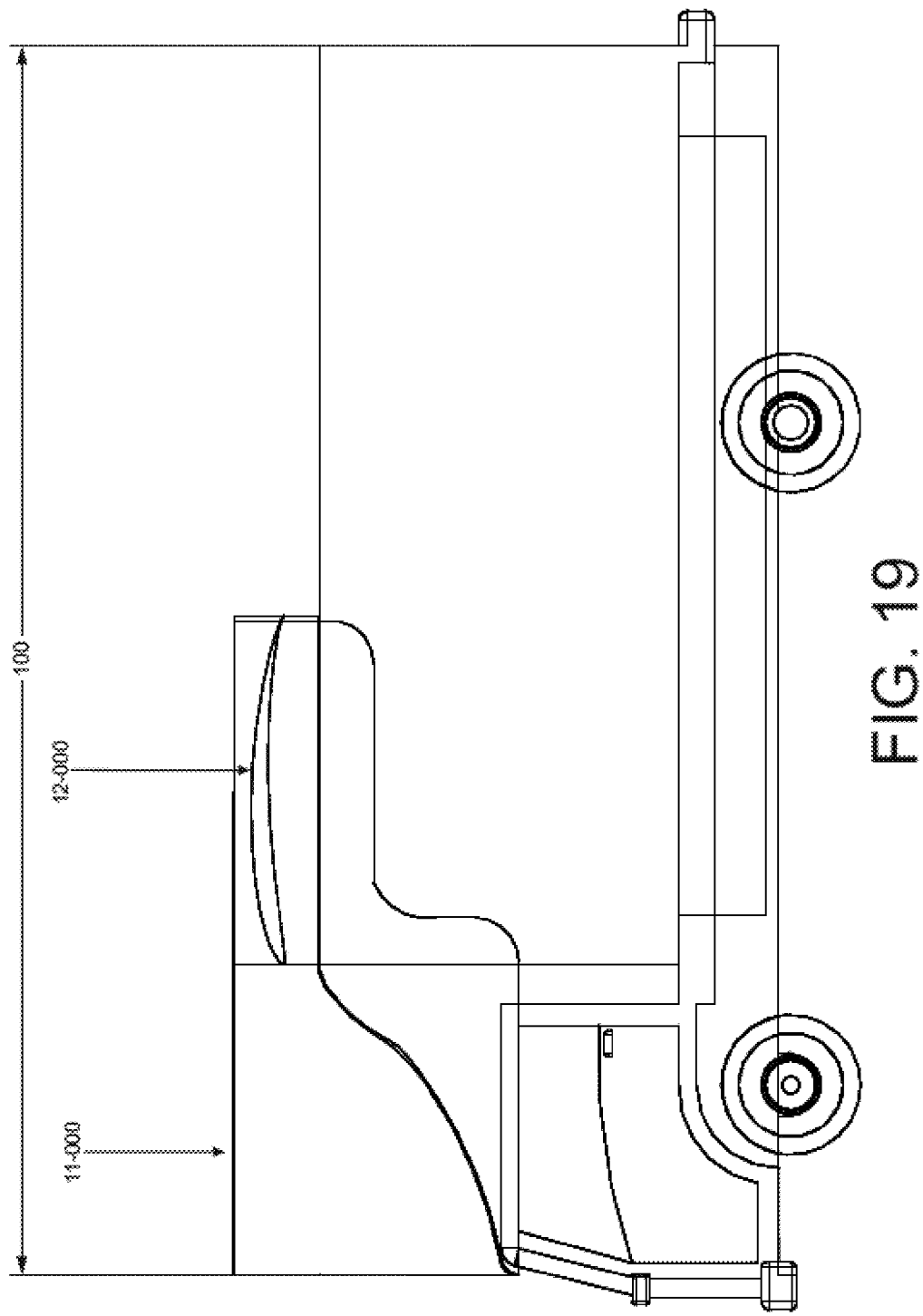
FIG. 19 shows the cross section of a non-articulated truck with an ecological system 100, wherein the first subsystem 12-000 and the device 11-000 are shown.
Figure 20:
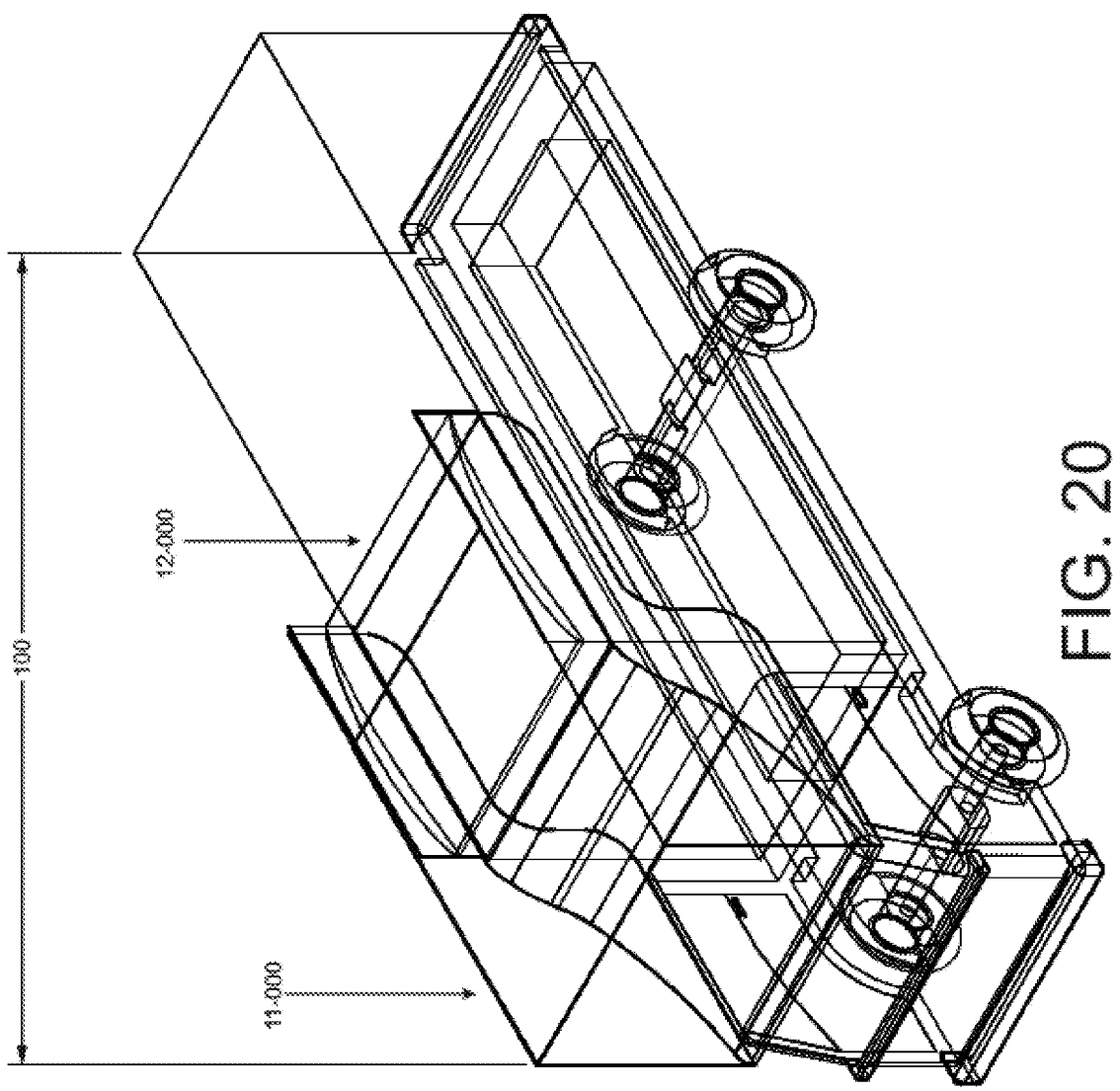
FIG. 20 shows the perspective view of the non-articulated truck with an ecological system 100 according to an example of an embodiment, wherein the first subsystem 12-000 and the device 11-000 are shown.
Figure 21:
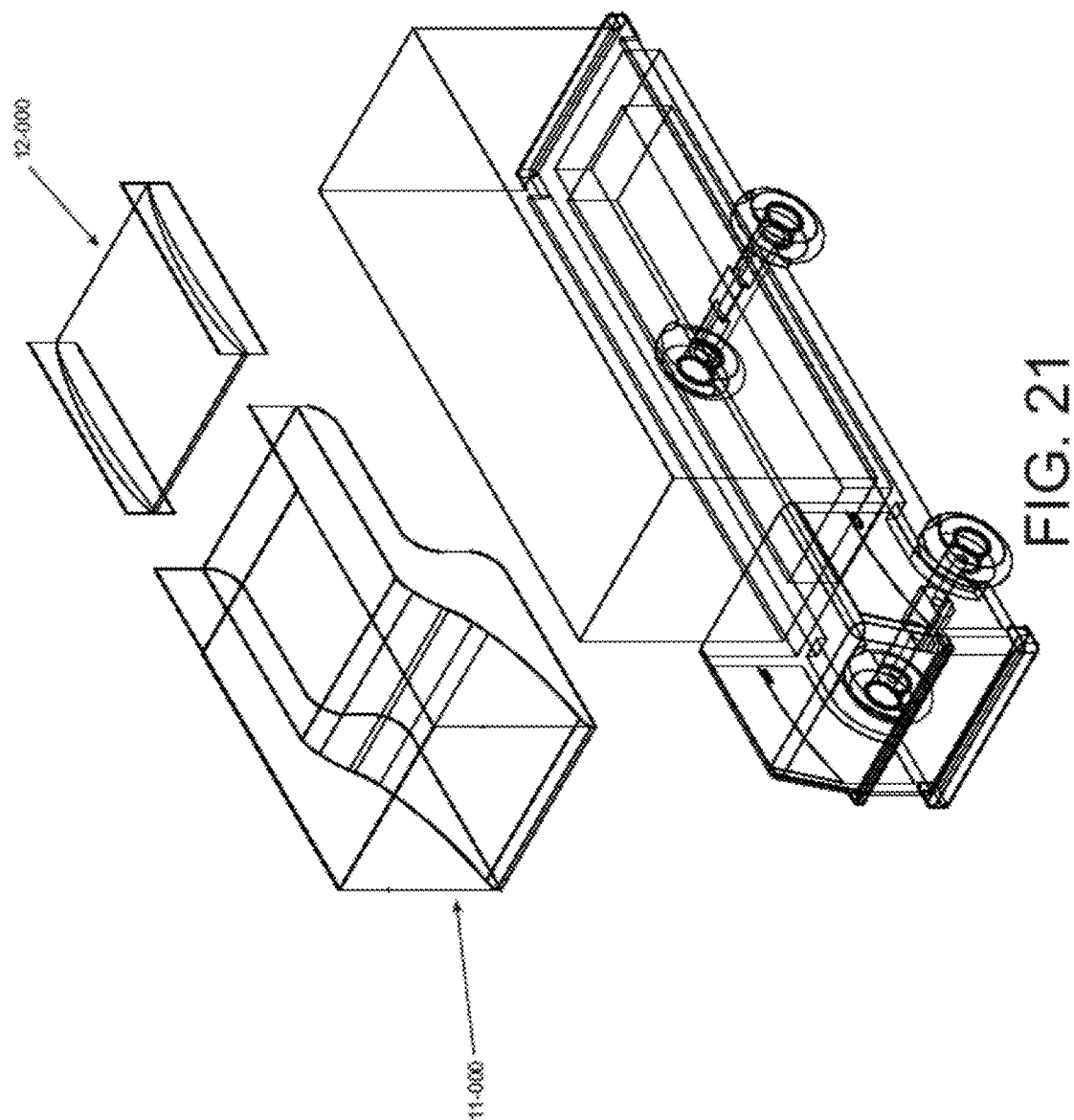
FIG. 21 shows the exploded view of the non-articulated truck with an ecological system 100 according to an example of an embodiment, the first subsystem 12-000 and the device 11-000 are shown.

FIGS. 19, 20 and 21 show another embodiment of the configuration of the ecological system (100) comprising the device (11-000) and subsystem (12-000). In this embodiment, vehicle (400) is a boxcar or van or a non-articulated truck. Because the van has an area that generates aerodynamic resistance then, device (11-000) comes complete, and is located on the van's head with its area reduction to generate the higher possible velocity to subsystem (12-000) or aerodynamic profile (12-100). In this embodiment, the van or non-articulated truck is not a part of device (11-000) but said device (11-000) can be completely separated.

Figure 25:
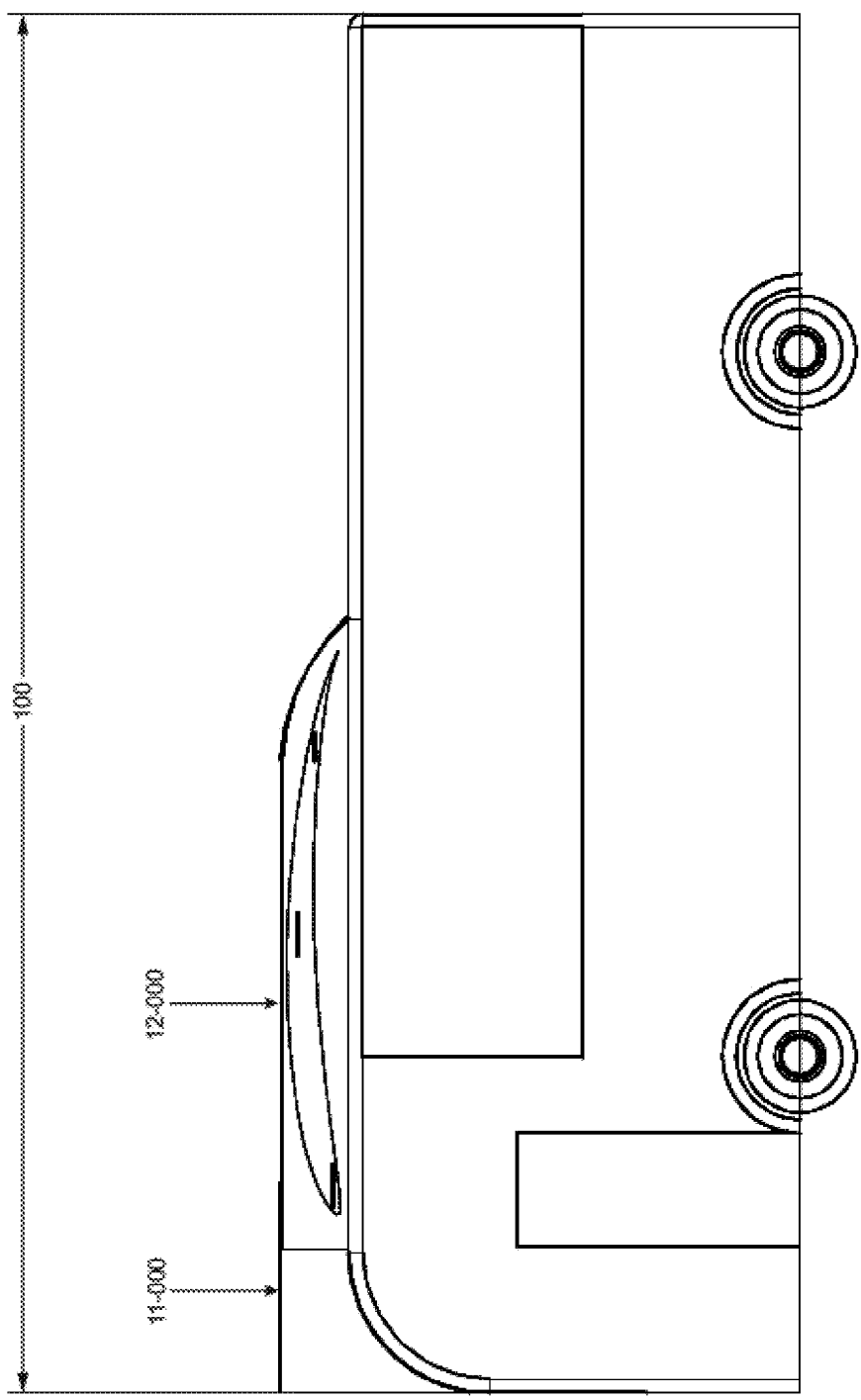
FIG. 25 shows a cross section of the bus with an ecological system 100 according to an example of an embodiment, wherein the first subsystem 12-000 and said device 11-000 are shown.
Figure 26:
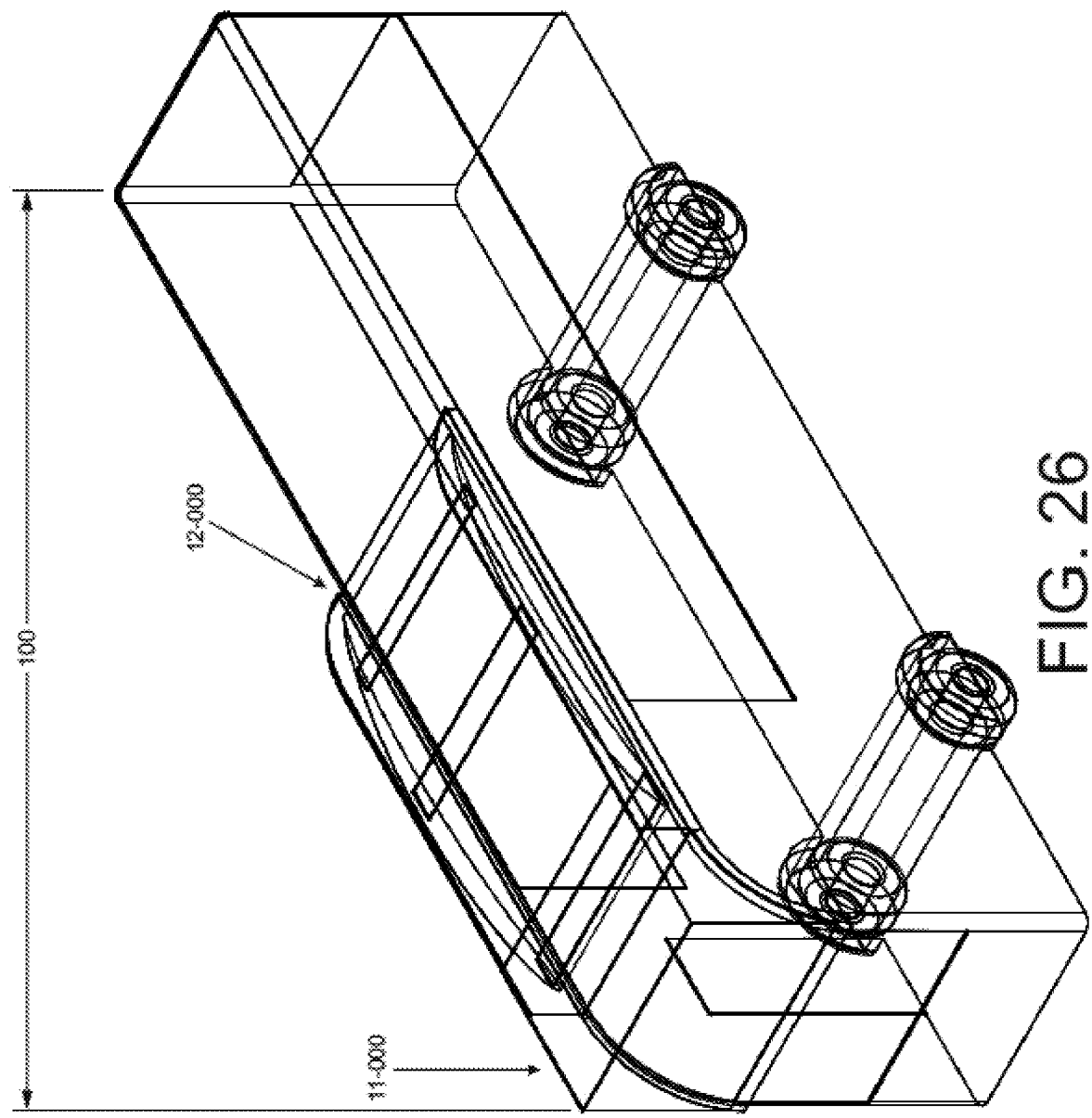
FIG. 26 shows the perspective view of the bus with an ecological system 100 according to an example of an embodiment, wherein the first subsystem 12-000 and the device 11-000 are shown.
Figure 27:
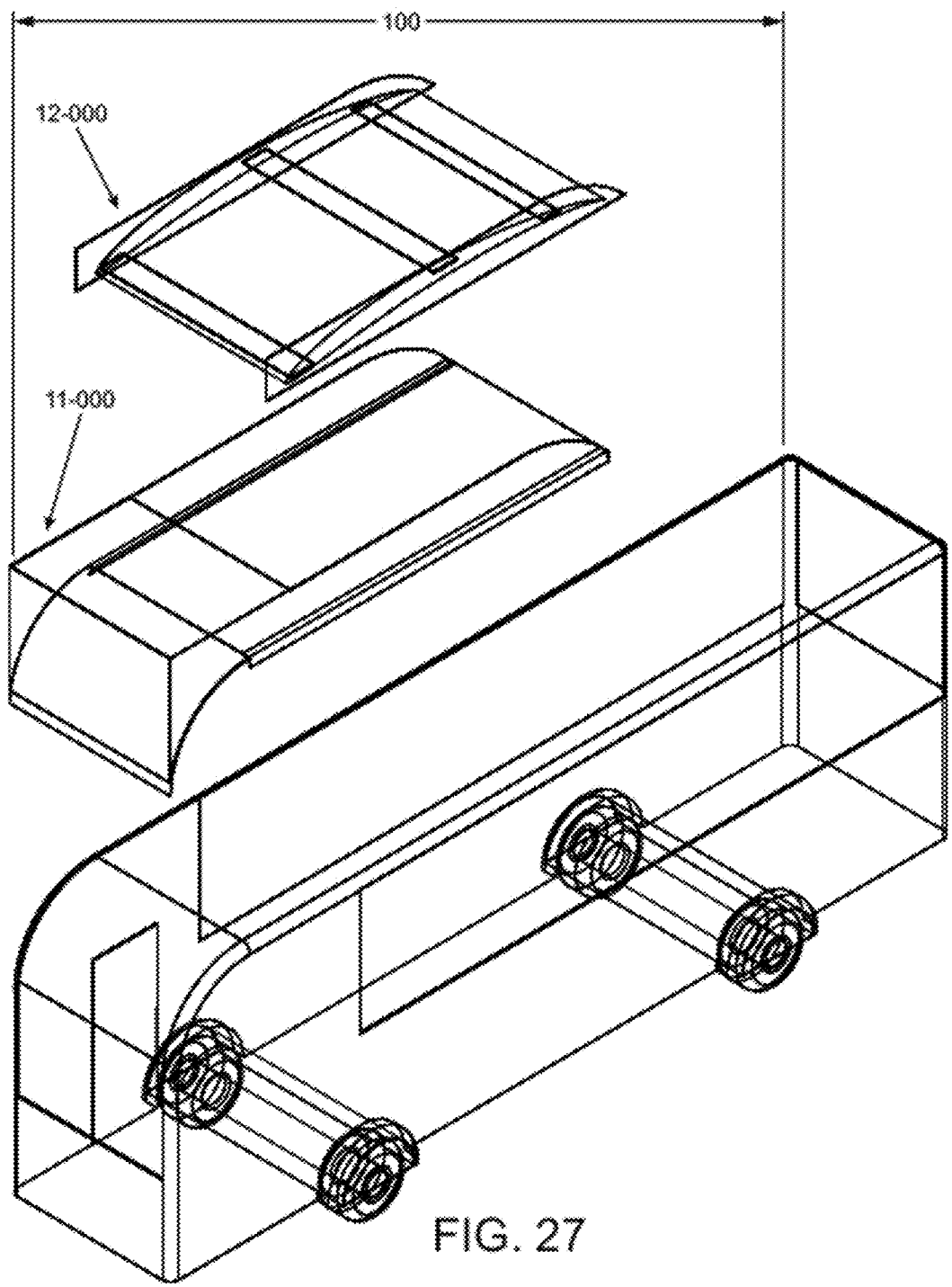
FIG. 27 shows the exploded view of the bus with an ecological system 100 according to an example of an embodiment, wherein the second subsystem 13-000 and the device 11-000 are shown.

FIGS. 25, 26 y 27 show another embodiment of the configuration of the ecological system (100) comprising device (11-000) and subsystem (12-000), in this embodiment vehicle (400) is a standard bus. In this embodiment device (11-000) has a greater length to generate a more laminar flow with a more aerodynamic end. In this embodiment, device (11-000) is also separated.

Figure 31:
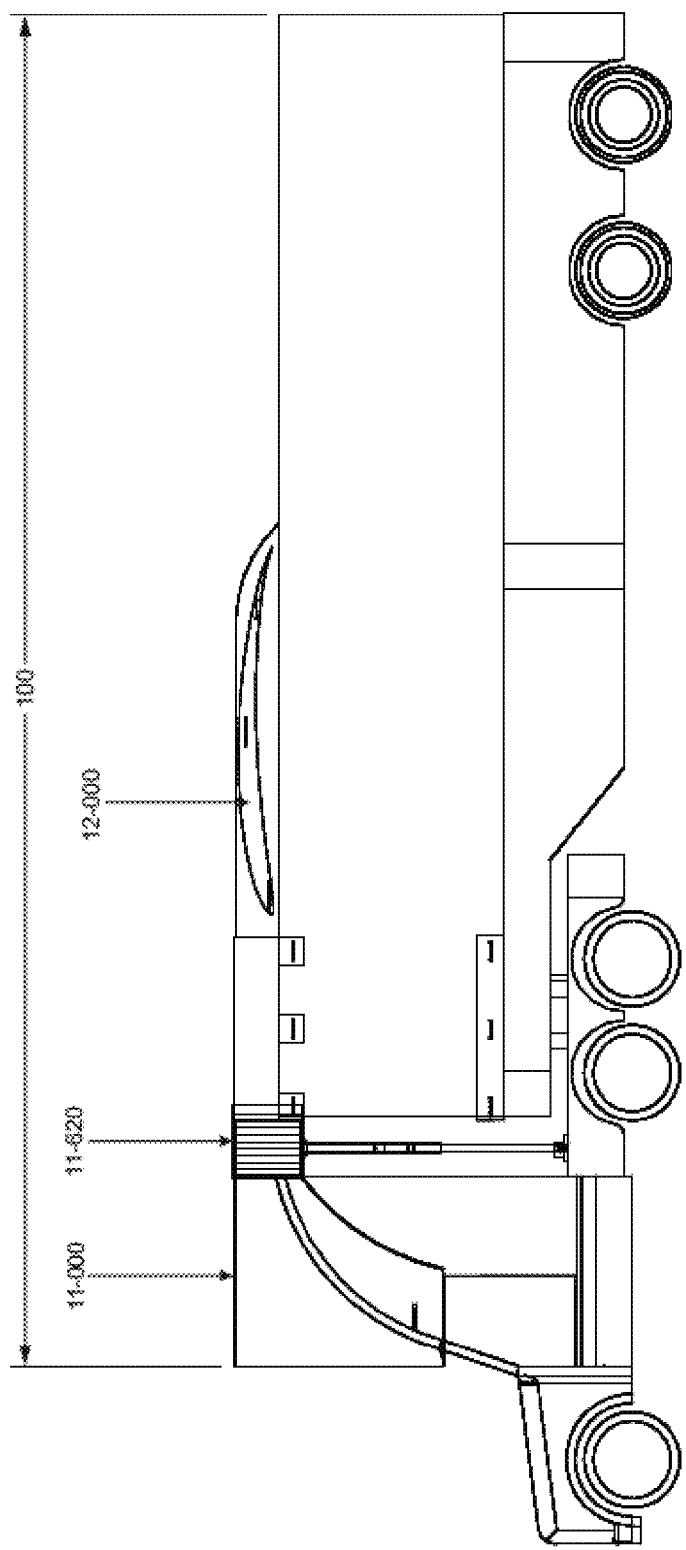
FIG. 31 shows the cross section of an articulated truck with an ecological system 100 according to an example of an embodiment, wherein the first subsystem 12-000 and the device 11-000 are shown.
Figure 32:
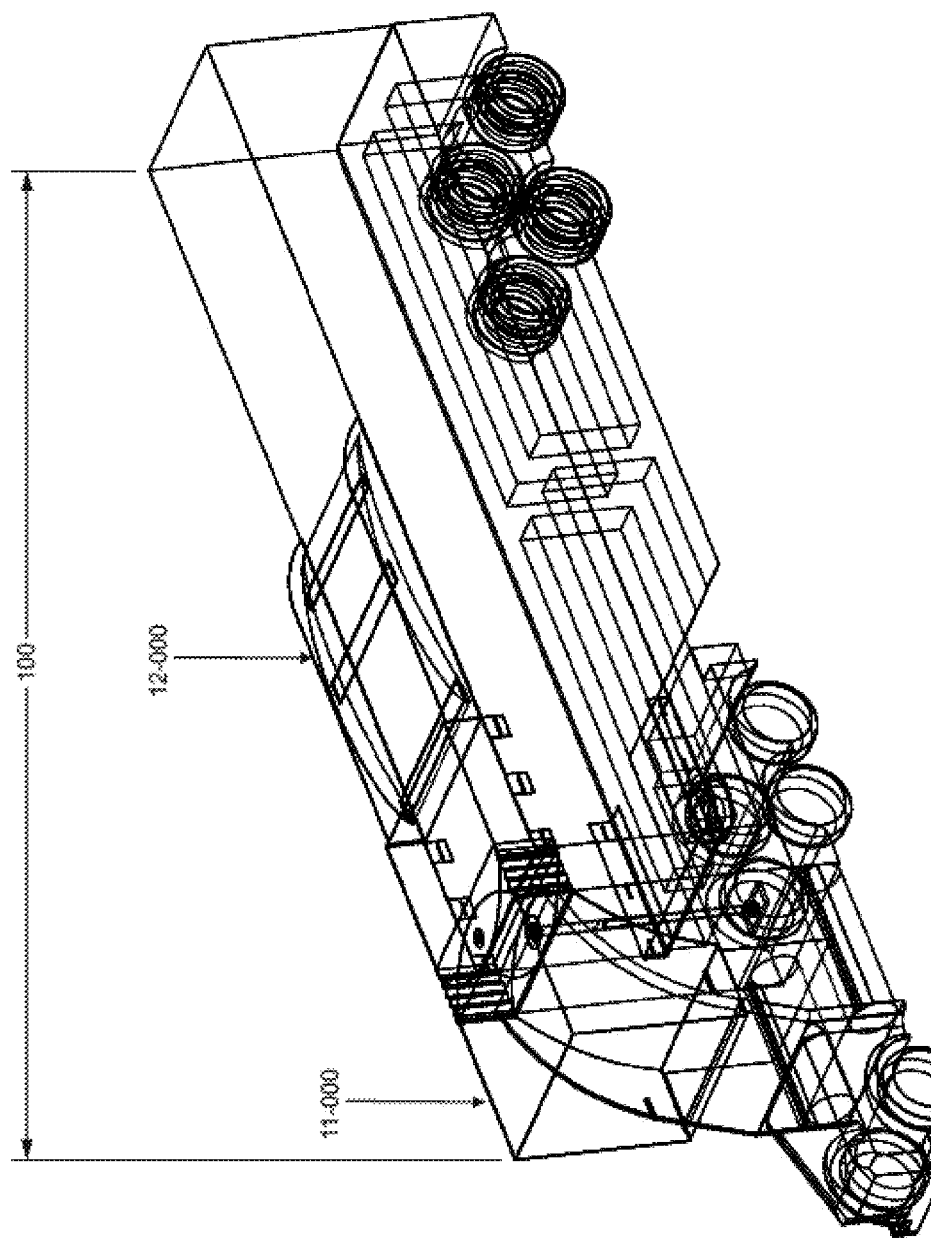
FIG. 32 shows the perspective view of the articulated truck with an ecological system 100 according to an example of an embodiment and with first subsystem 12-000.
Figure 33:
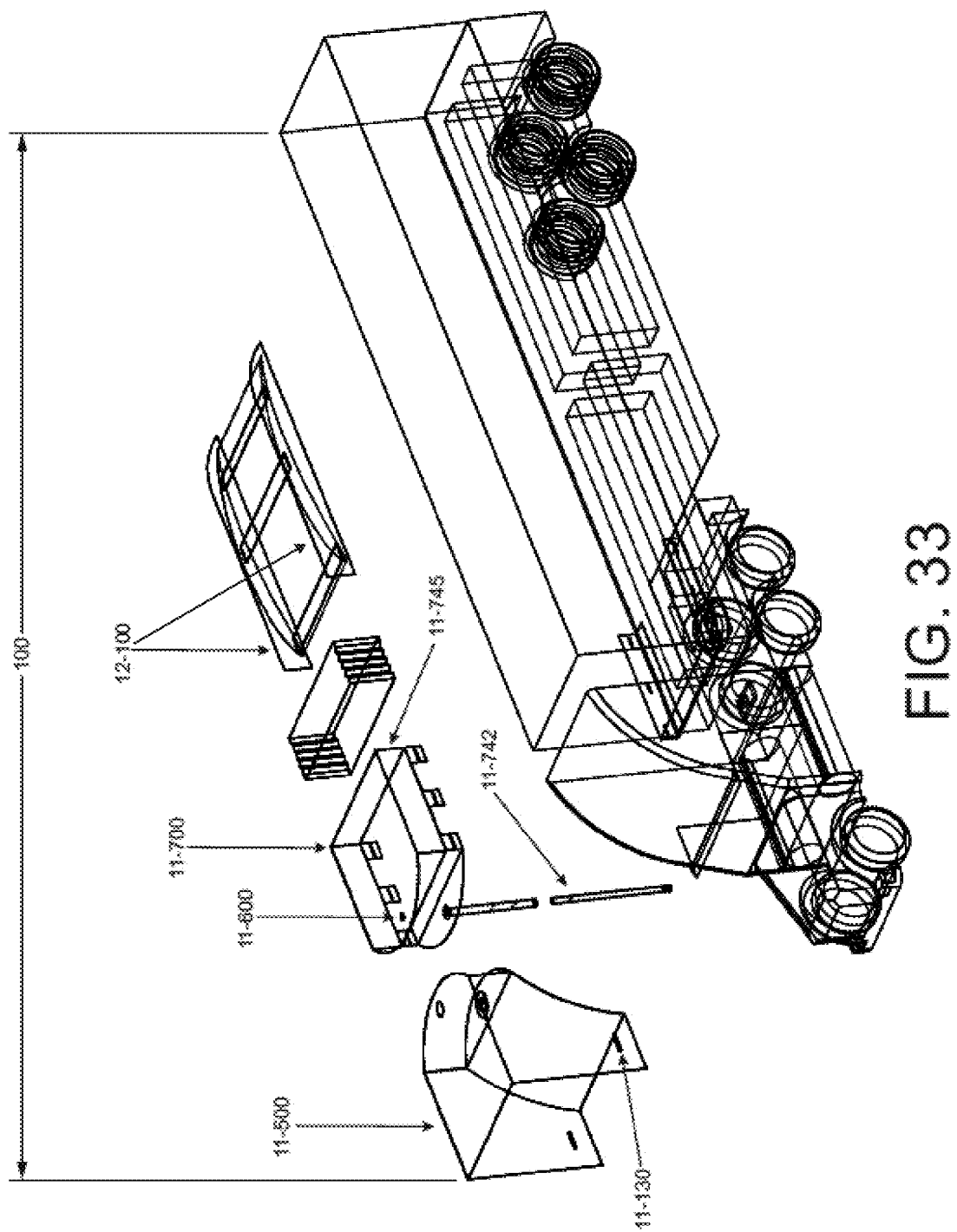
FIG. 33 shows the exploded view of the articulated truck with an ecological system 100 according to an example of an embodiment and the first subsystem 12-000.

FIGS. 31,32 y 33 show a preferred embodiment of the invention wherein vehicle (400) is an articulated truck device (11-000) and first subsystem (12-000) are shown. Said device (11-000) guides, compresses, accelerates and projects the airmass caught by device (11-000) in the moving articulated truck and first subsystem (12-000) receiving the air Flow projected from the device (11-000) towards an aerodynamic profile (12-100) which generates lifting to the articulated truck. FIG. 33 clearly shows the laminar Flow ejector (11-700) of device (11-000), which optionally comprises displacement means, preferably rails, in both side and/or vertical walls, fastening means for its assembly in the container and a vertical support column for mounting and demounting the system and mechanical devices for gripping.

Said rails allow the first subsystem (12-000) to slid inwards of the device (11-000) when demounting the container and/or trailer is carried out.

The support column operates in a pneumatic, electric, mechanic or manual manner and allows holding the system when is removed from the container or box truck.

The vertical support column useful to install the system is located on the chassis of the vehicle (400) to distribute the force and is conveniently located to serve as support when the system is removed from the container or box truck, without its presence obstructing or affecting the movement or natural rotation of the head of the vehicle (400) with respect to the container or trailer.

In a preferred embodiment, the fastening means are moorings that fasten the system to the container or the articulated truck, and preferably consists in one or more cinches.

Figure 42:
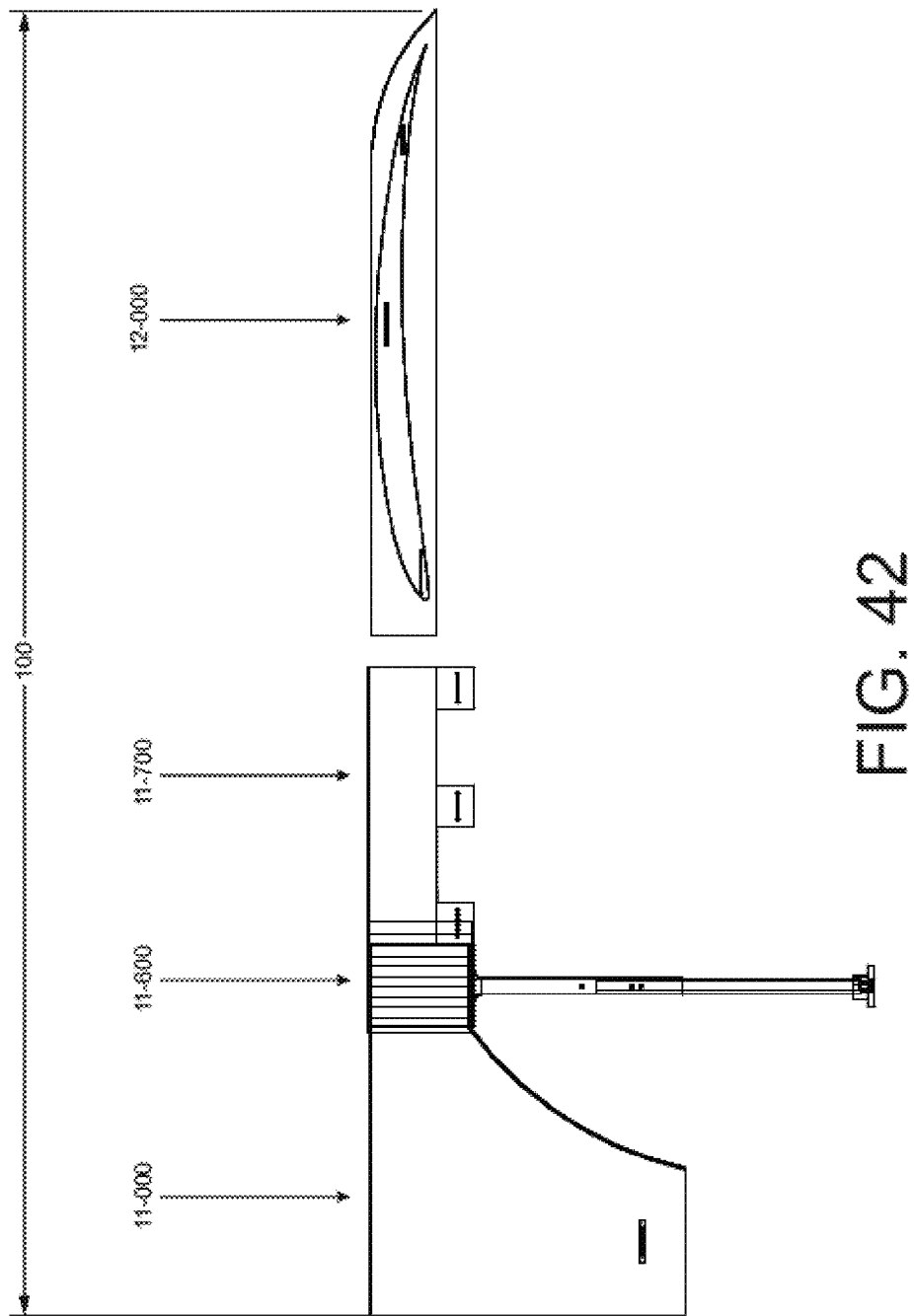
FIG. 42 shows a cross section of the coupling of device 11-000 with the first subsystem 12-000.

FIGS. 42 and 43 show the coupling of the first subsystem (12-000) to the device (11-000). The articulation means (11-600) and the laminar flow ejector (11-700) are also shown.

In another embodiment, the ecological system (100) comprises the device (11-000) that guides, compresses, accelerates and projects an airmass caught by the device (11-000) in the moving vehicle (400), and the second subsystem (13-000) receiving the air flow projected from the device (11-000) towards one or more electric energy generating turbines (13-200). This embodiment uses the air stream to generate electric energy that can be stored and used to feed the vehicle (400) as such.

Figure 4:
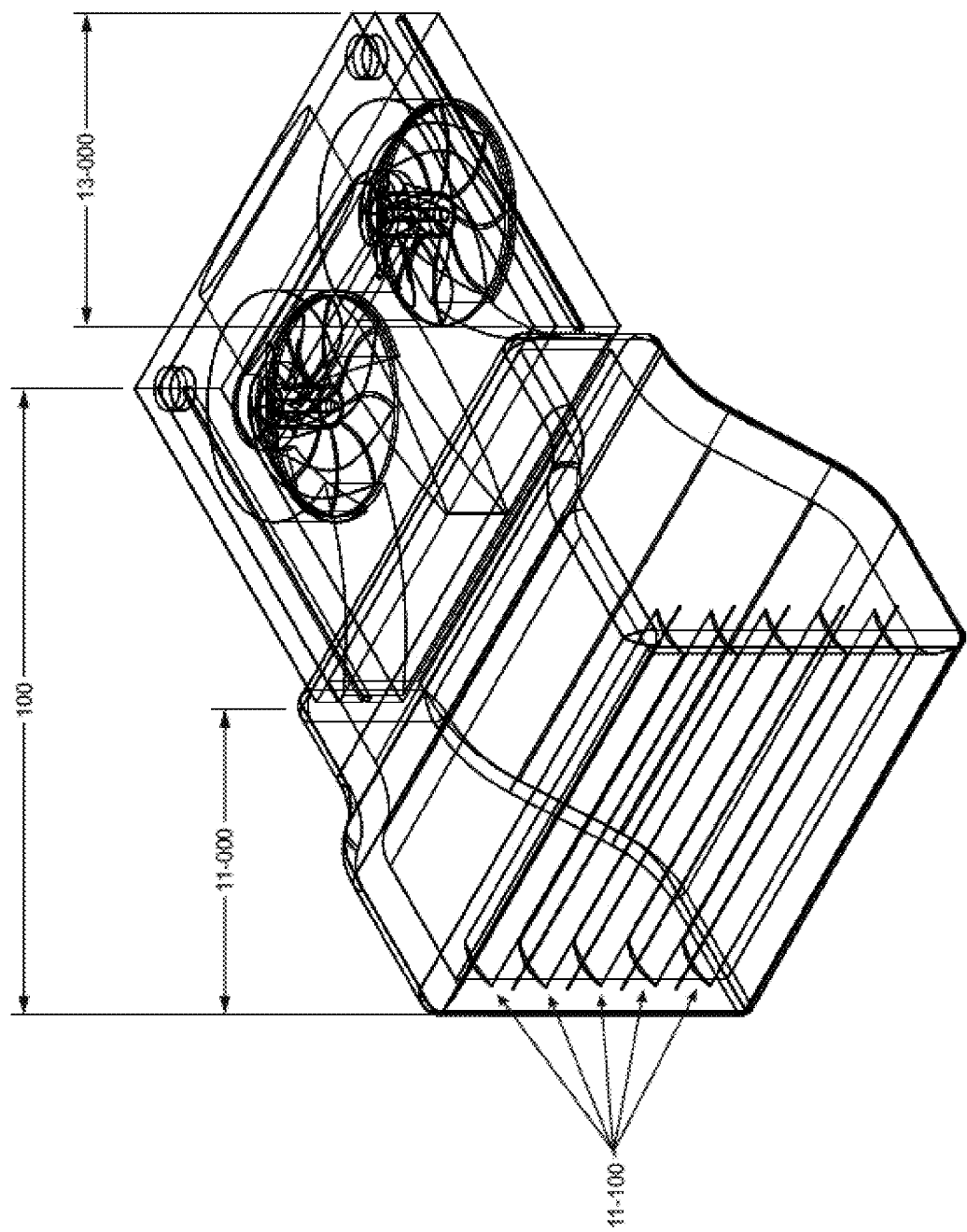
FIG. 4 is a perspective view of an example of embodiment of the ecological system 100, wherein the second subsystem 13-000 and the device 11-000 are shown.

FIG. 3 shows the device (11-000) with the second subsystem (13-000) which corresponds to an energy generator. Likewise, it shows the grille (11-100) found at the input of the device (11-000) and is useful as backup in case that the system of the invention receives an amount of air greater than that one supported by the system. In such case, the grille (11-100) closes to avoid unwanted effects, such as instability, overturn or energy overcharge in the energy generator. Also, FIG. 4 shows the device (11-000) with the second subsystem (13-000) with the energy generator with its turbines (13-200), its air collecting and reduction system and its exhaust tube, its output system.

FIGS. 8, 9, 10, 11, 12 y 13 show that in this embodiment vehicle (400) is a car, a normal car, a five door car, in which the input area of the device (11-000) is formed by the vehicle (400) as such and an air collecting boxing system and the subsystem (13-000) found in the upper part of the vehicle (400).

FIG. 10 shows system (100) with the device (11-000), with an exploded view of the energy generator wherein it is shown the walls forming the device (11-000) along with the vehicle (400), the housing (13-100) of the energy generator, the turbines (13-200) along with the gear collectors to prevent aerodynamic losses, and the exhaust elements (13-900), in which the air of the turbines (13-200) is combined producing a counter position, which causes reduction of wave opposition and thus noise is reduced.

Figure 16:
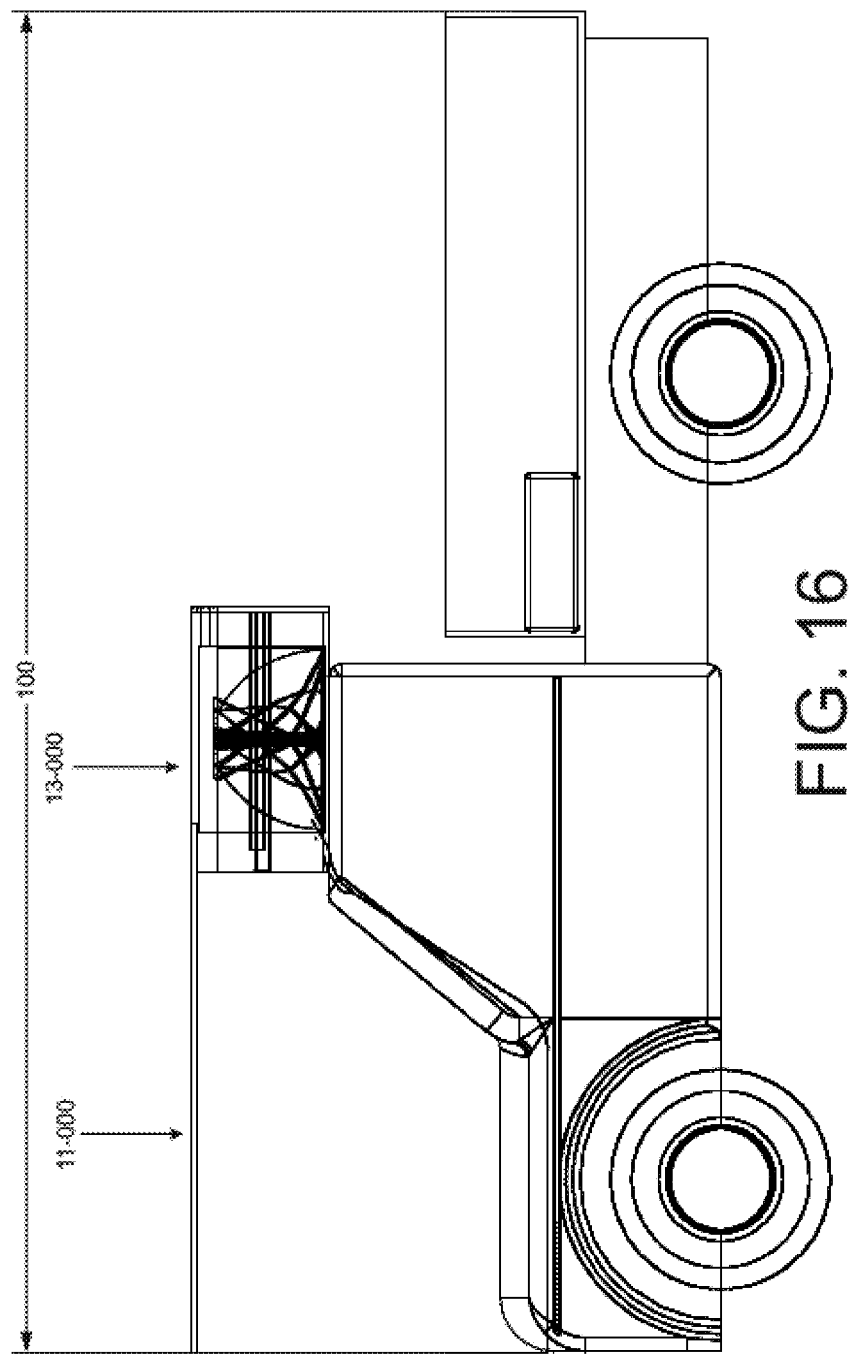
FIG. 16 shows the cross section of the pickup truck with an ecological system 100 according to an example of an embodiment, wherein the second subsystem 13-000 and the device 11-000 are shown.
Figure 18:
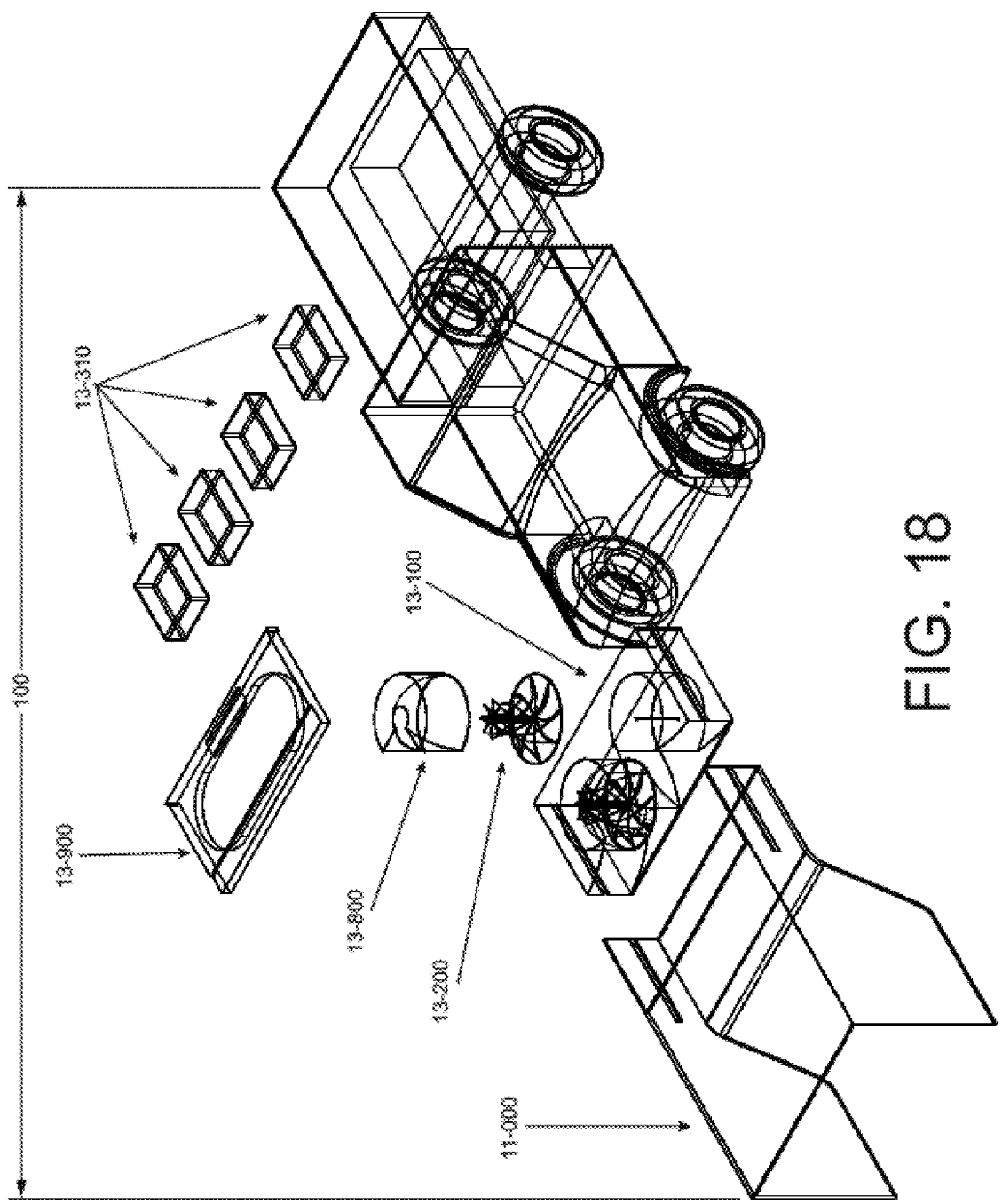
FIG. 18 shows the exploded view of the pickup truck wherein turbines (13-200) and exhaust elements 13-900 are shown.

FIGS. 16, 17 and 18 show another embodiment of the configuration of the ecological system (100) which comprises the device (11-000) and the second subsystem (13-000). In this embodiment, vehicle (400) is a pickup truck. Said device (11-000) is formed by a housing which forms the duct and pickup truck geometry, and second subsystem (13-000) corresponding to the energy generator is installed in the cabin, which is found in the upper part of the pickup truck.

In these figures it can be seen the sealing elements (13-800) and the exhaust elements (13-900).

The sealing elements (13-800) are an inverted cone-shaped structure which creates a seal with the turbine (13-200) so that air can be compressed and transported towards the air exhaust elements (13-900) and noise cancelling elements (13700).

Figure 22:
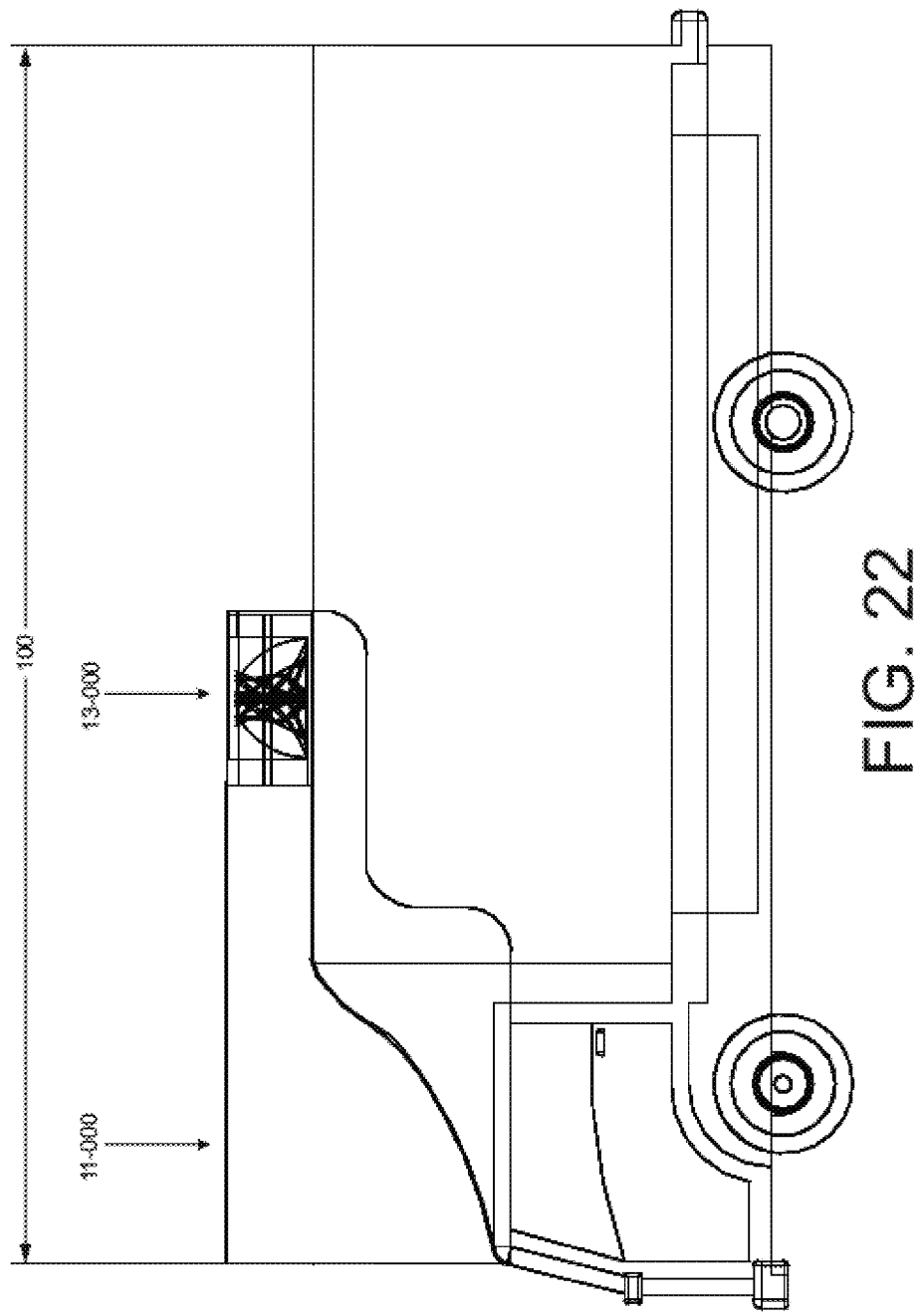
FIG. 22 shows the cross section of the non-articulated truck with an ecological system 100 according to an example of an embodiment, wherein the second subsystem 13-000 and the device 11-000 are shown.
Figure 23:
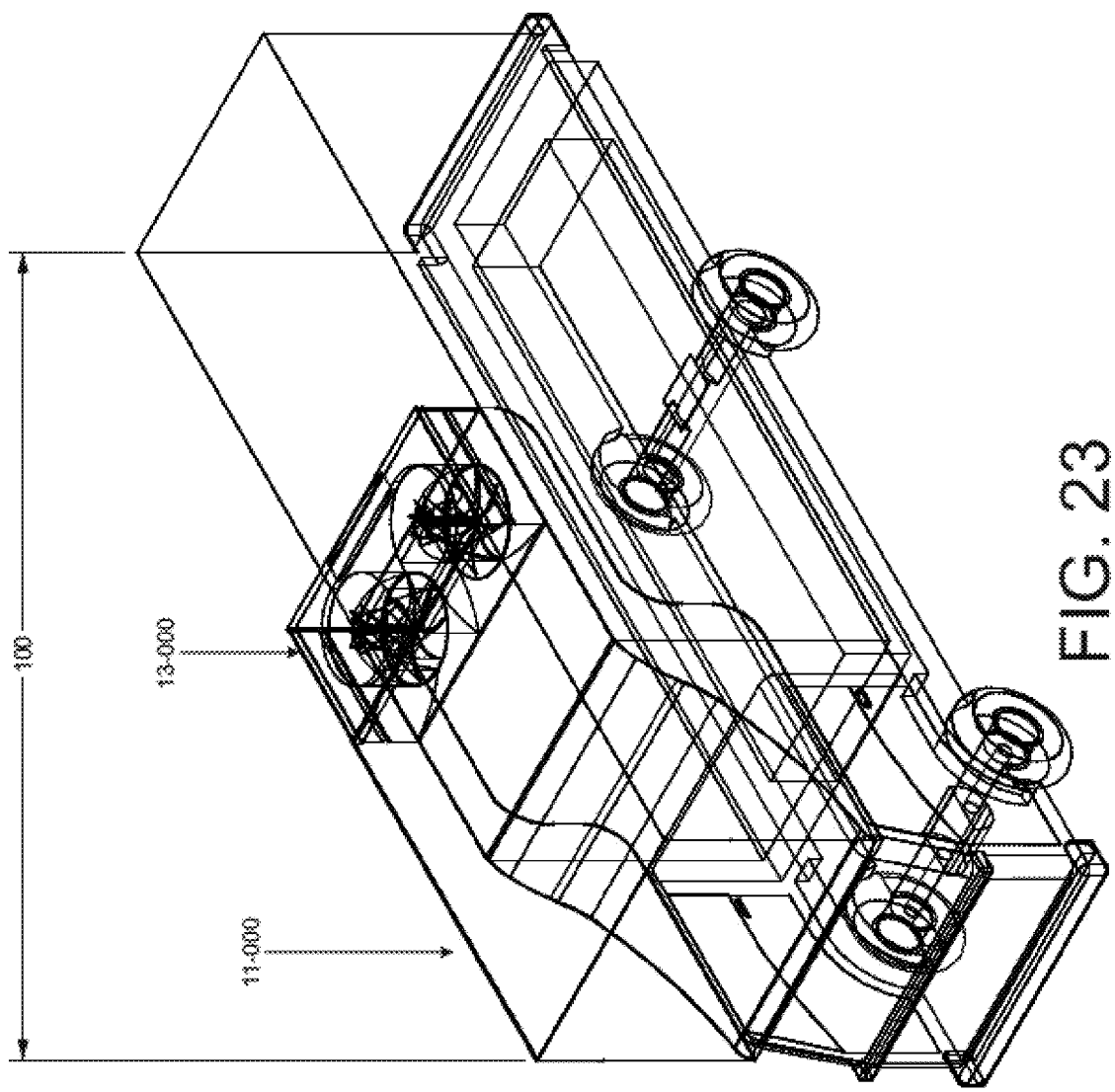
FIG. 23 shows the perspective view of a non-articulated truck with an ecological system 100 according to an example of an embodiment, wherein the second subsystem 13-000 and the device 11-000 are shown.
Figure 24:
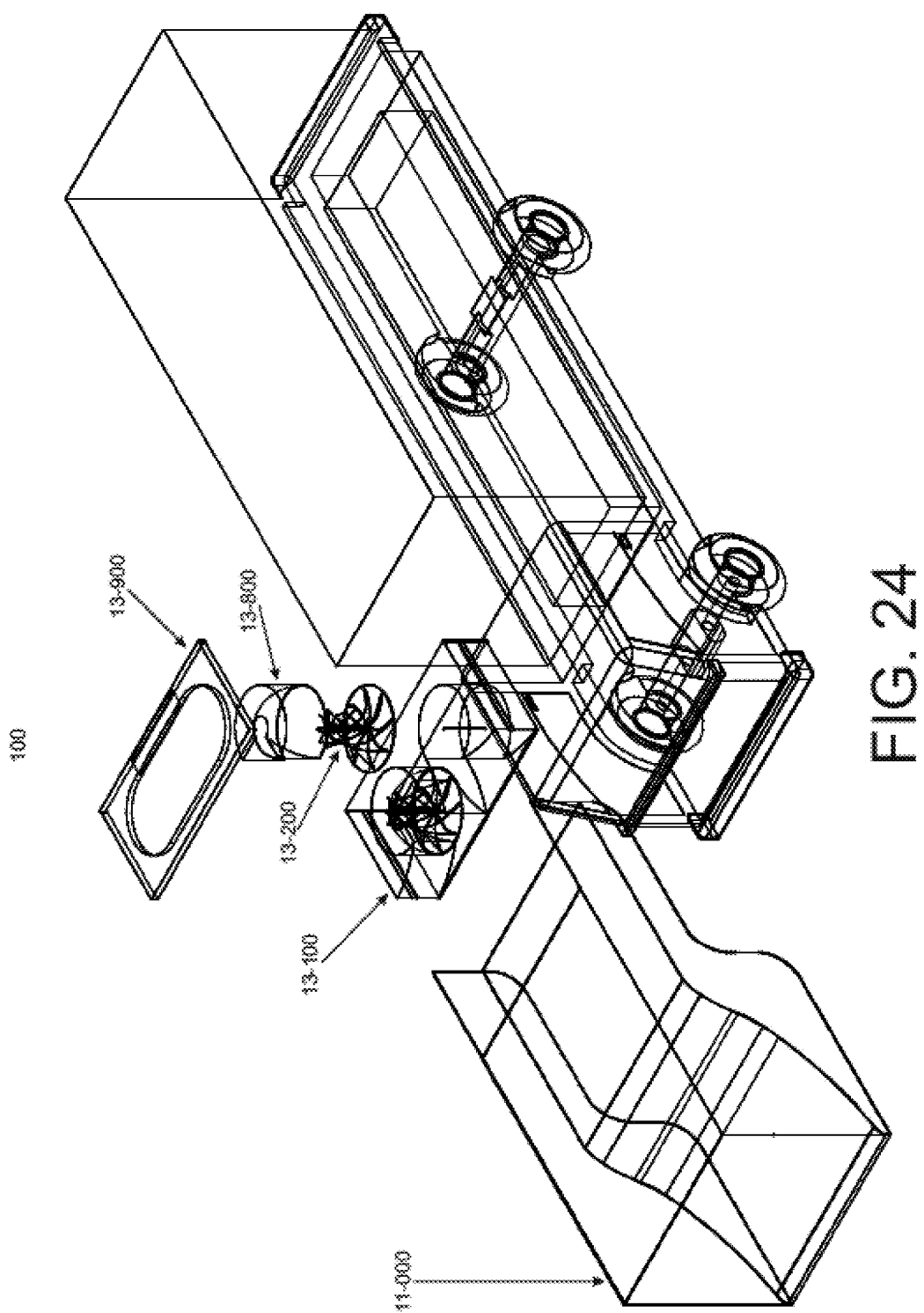
FIG. 24 shows an exploded view of a non-articulated truck with an ecological system 100 according to an example of an embodiment, wherein second subsystem 12-000 and device 11-000 are shown.

FIGS. 22, 23, y 24 show cross section, perspective and exploded views of the device (11-000) and the subsystem (13-000) for the embodiment of the van or the non-articulated truck. Sealing elements (13-800), exhaust elements (13-900), turbines (13-200) and the housing (13-100) are shown.

Figure 28:
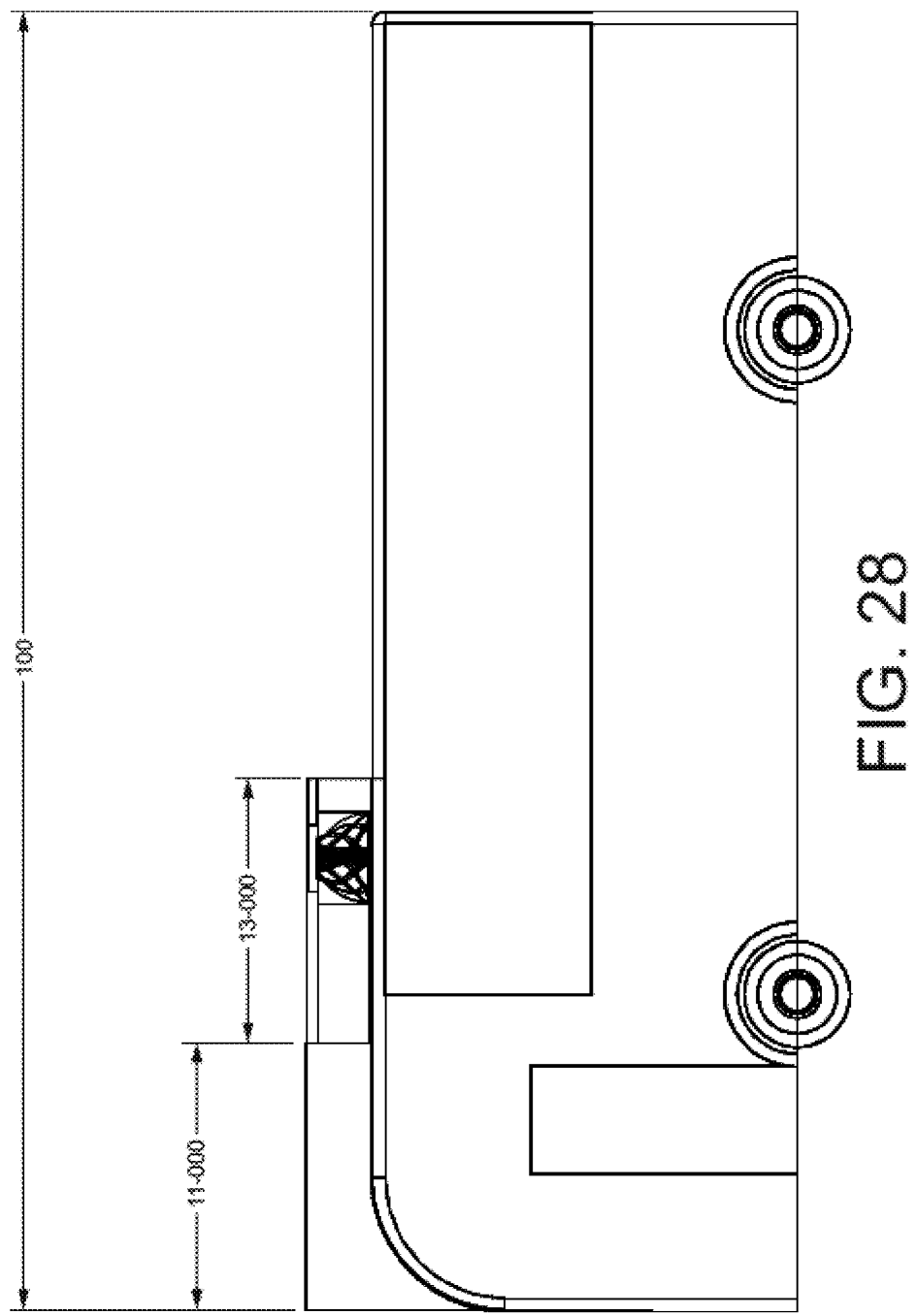
FIG. 28 shows the cross section of the bus with an ecological system 100 according to an example of an embodiment, wherein the second subsystem 13-000 and the device 11-000 are shown.
Figure 29:
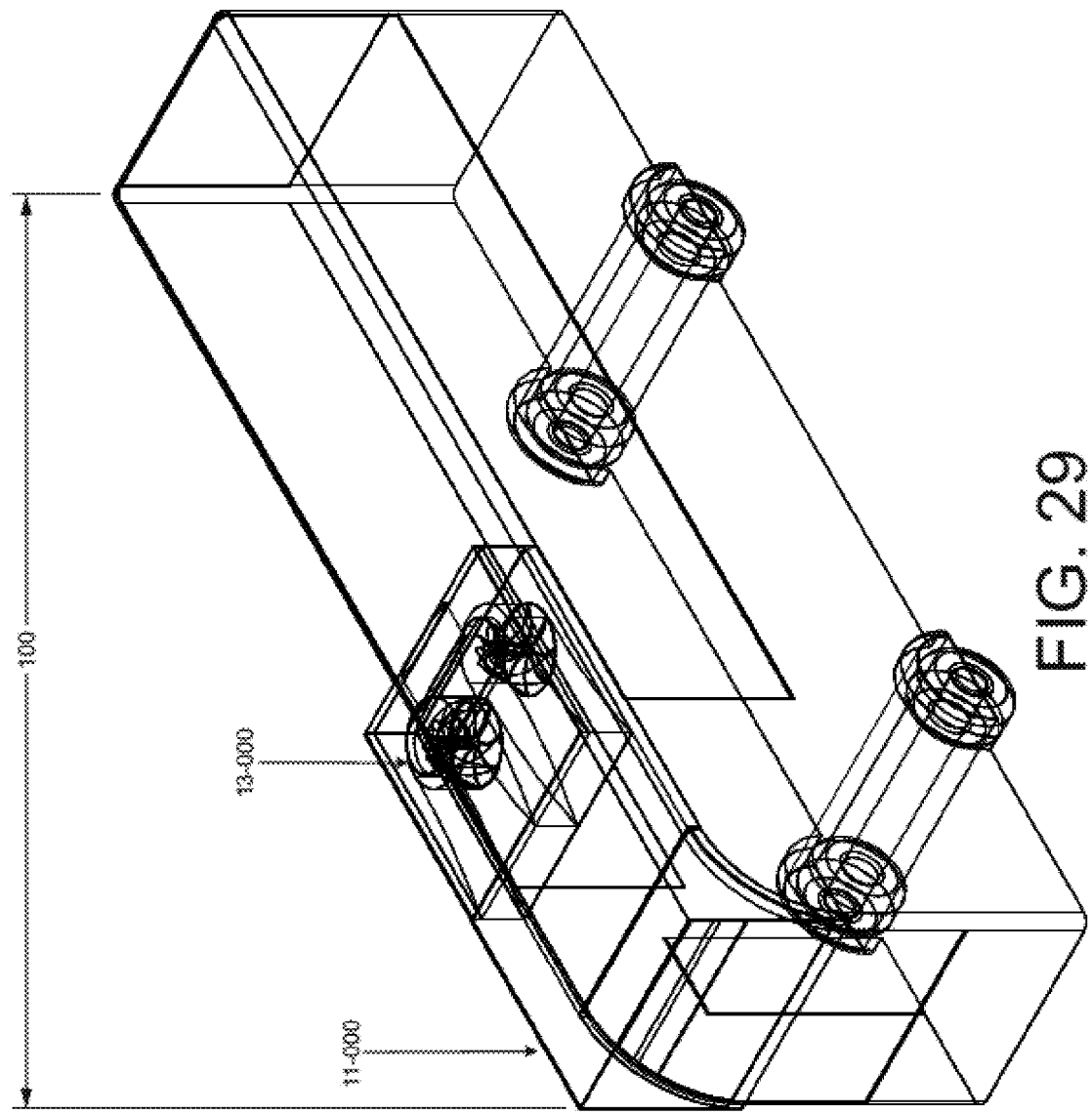
FIG. 29 shows the perspective view of the bus with an ecological system 100 according to an example of an embodiment wherein the second subsystem 13-000 and the device 11-000 are shown.
Figure 30:
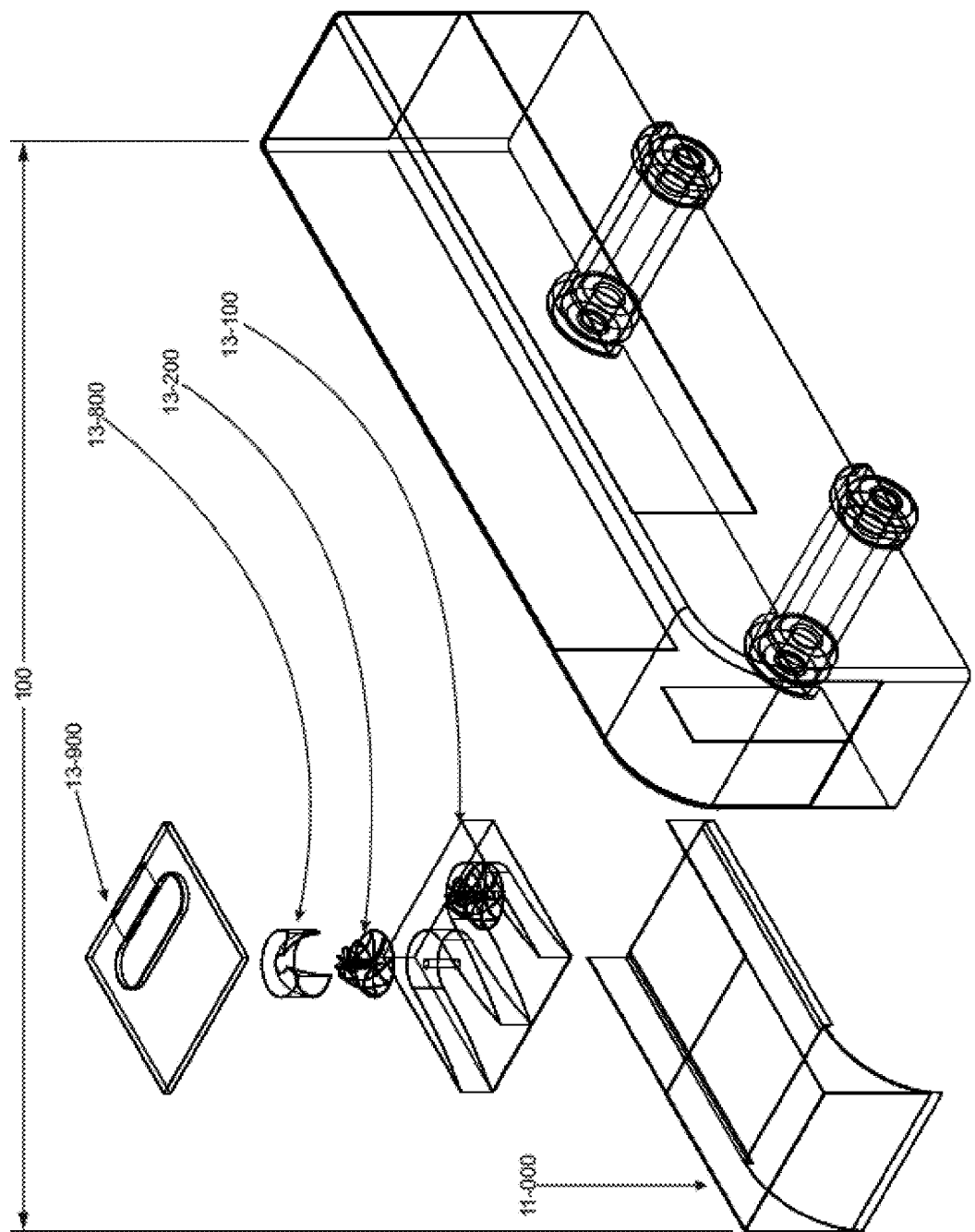
FIG. 30 shows an exploded view of the bus with an ecological system 100 according to an example of an embodiment wherein second subsystem 13-000 with its parts and device 11-000 are shown.

FIGS. 28, 29 y 30 show another embodiment of the configuration of the ecological system (100) comprising the device (11-000) and the second subsystem (13-000). In this embodiment the vehicle (400) is a standard bus. In this embodiment the device (11-000) is also separated. Sealing elements (13-800), exhaust elements (13-900), turbines (13-200) and the housing (13-100) are also shown.

Figure 34:
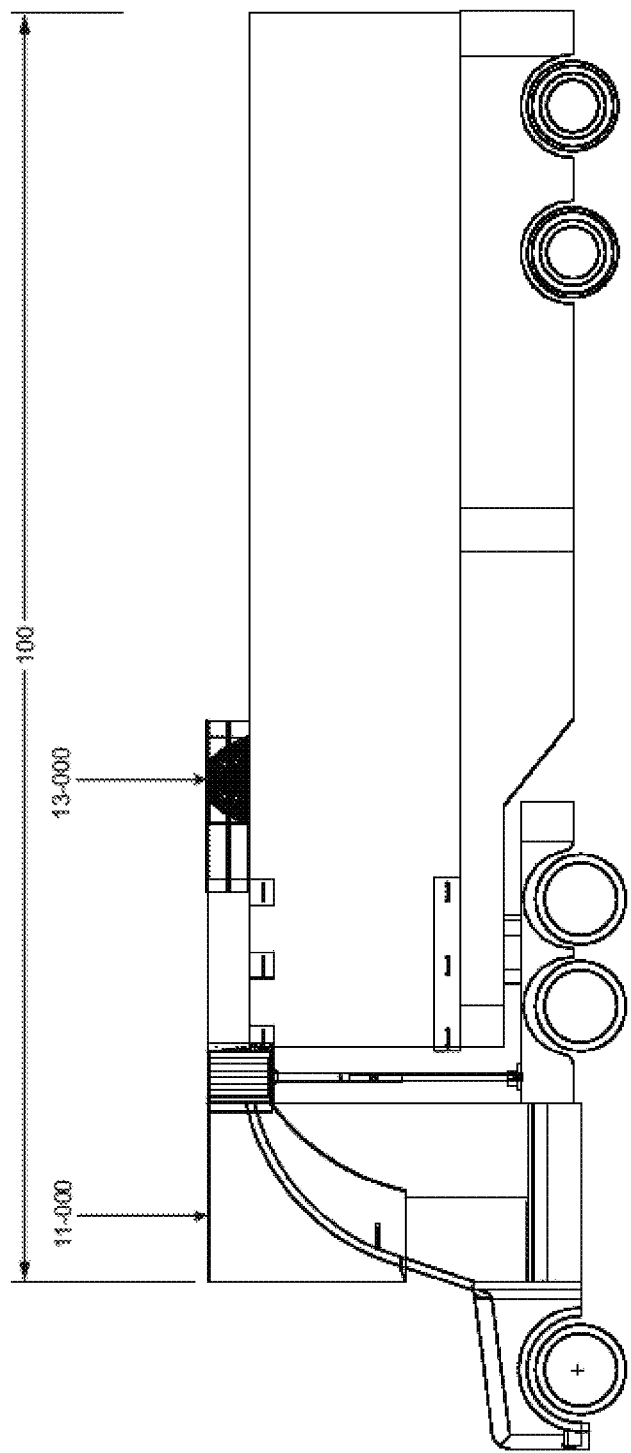
FIG. 34 shows the cross section of the articulated truck with an ecological system 100 according to an example of an embodiment and the second subsystem 13-000.
Figure 35:
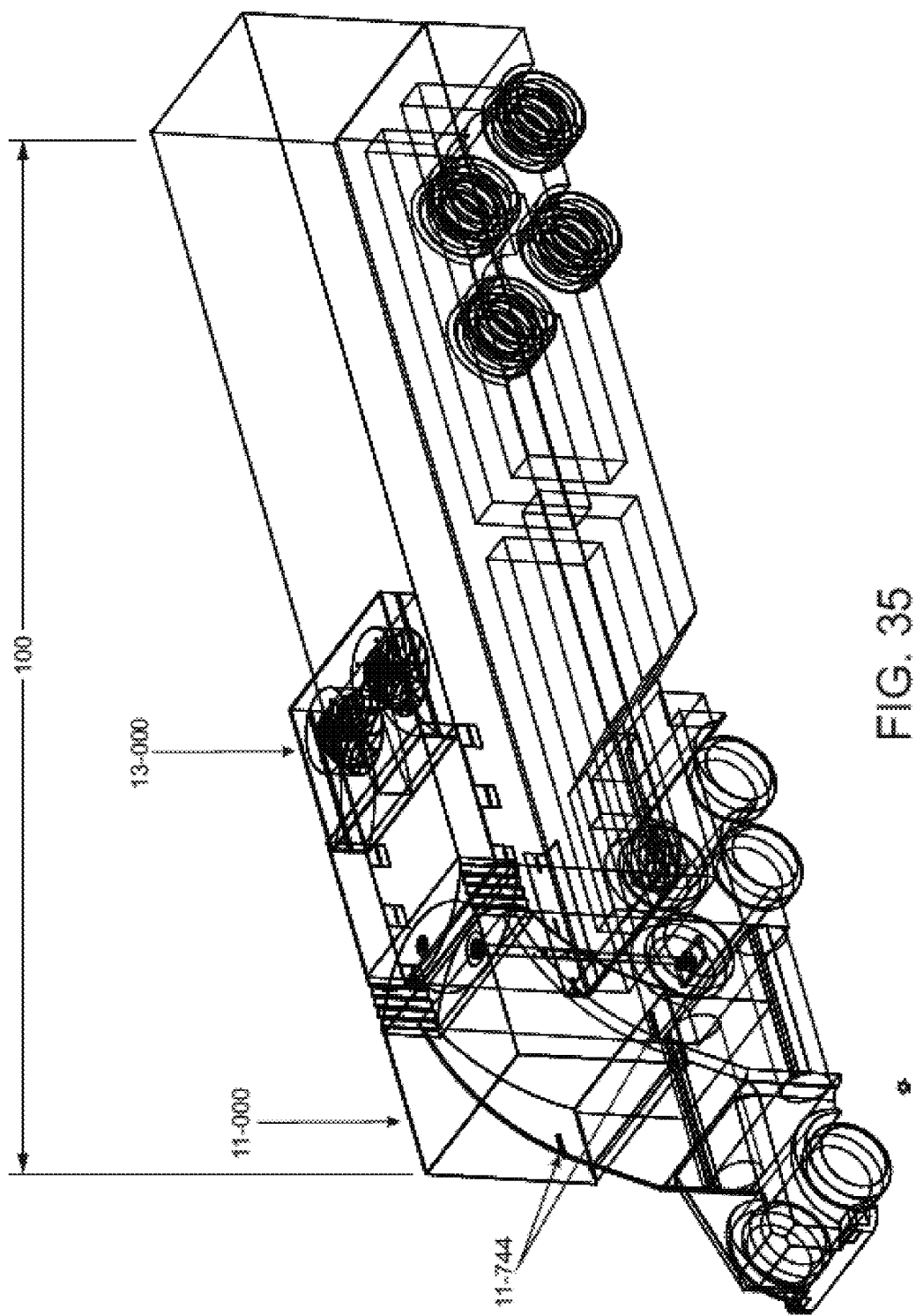
FIG. 35 shows the perspective view of an articulated truck with an ecological system 100 according to an example of an embodiment and the second subsystem 13-000.
Figure 36:
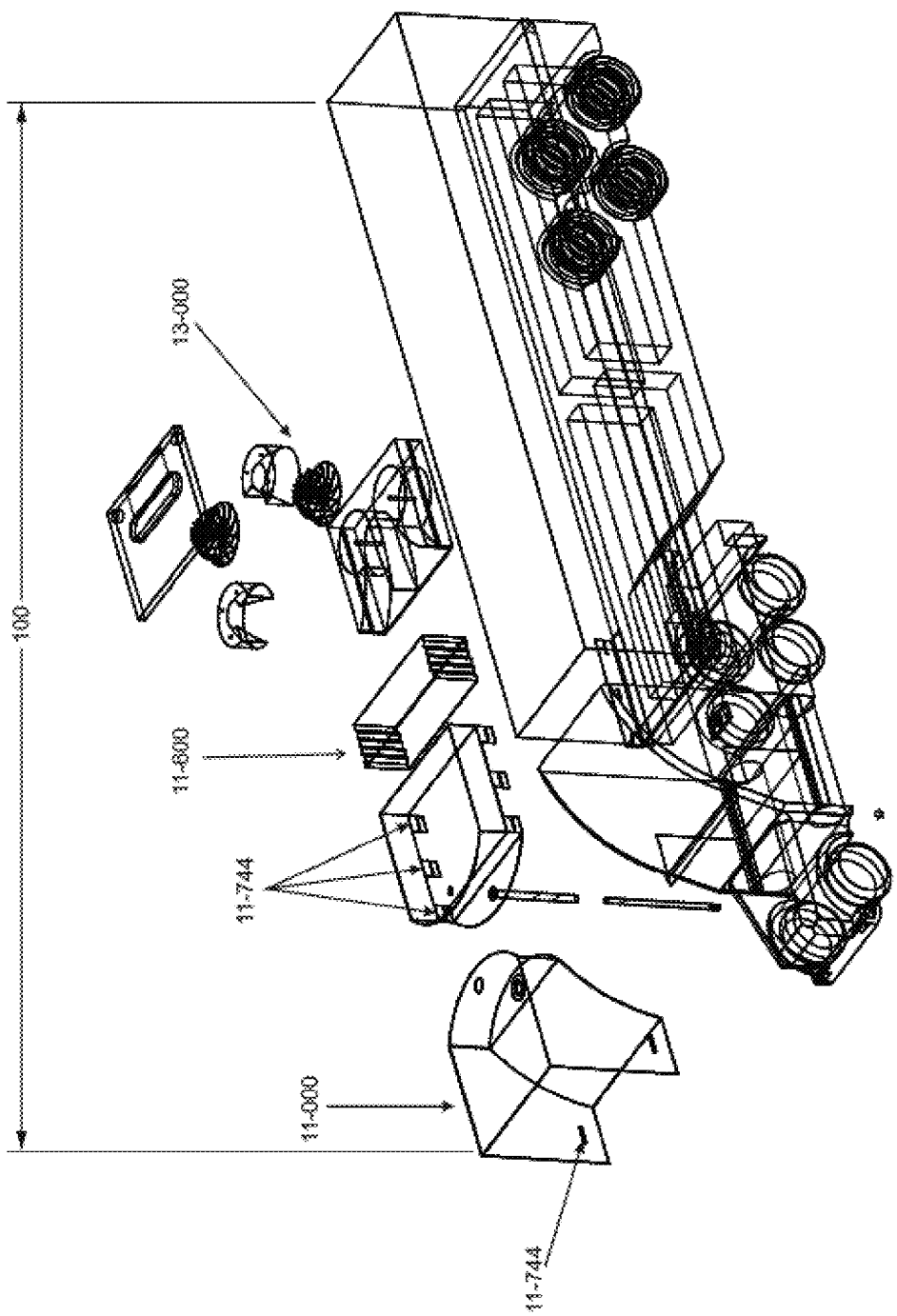
FIG. 36 shows an exploded view of the articulated truck with an ecological system 100 according to an example of an embodiment and the second subsystem 13-000.

FIGS. 34, 35 y 36 show a preferred embodiment of the invention wherein the vehicle (400) is an articulated truck and device (11-000) and second subsystem (13-000) are shown, Said device (11-000) guides, compresses, accelerates and projects an airmass caught by the device (11-000) in the moving vehicle (400) and the second subsystem (13-000) receiving the air flow projected by the device (11-000) towards one or more electric energy generating turbines (13-200).

FIGS. 35 y 36 also show articulation means (11-600) and fastening elements (11-744).

FIGS. 44 y 45 show frontal and perspective views of the second subsystem (13-000) wherein housing (13-100), turbines (13-200), noise cancelling elements (13-700) and sealing elements (13-800) can be observed.

Figure 46:
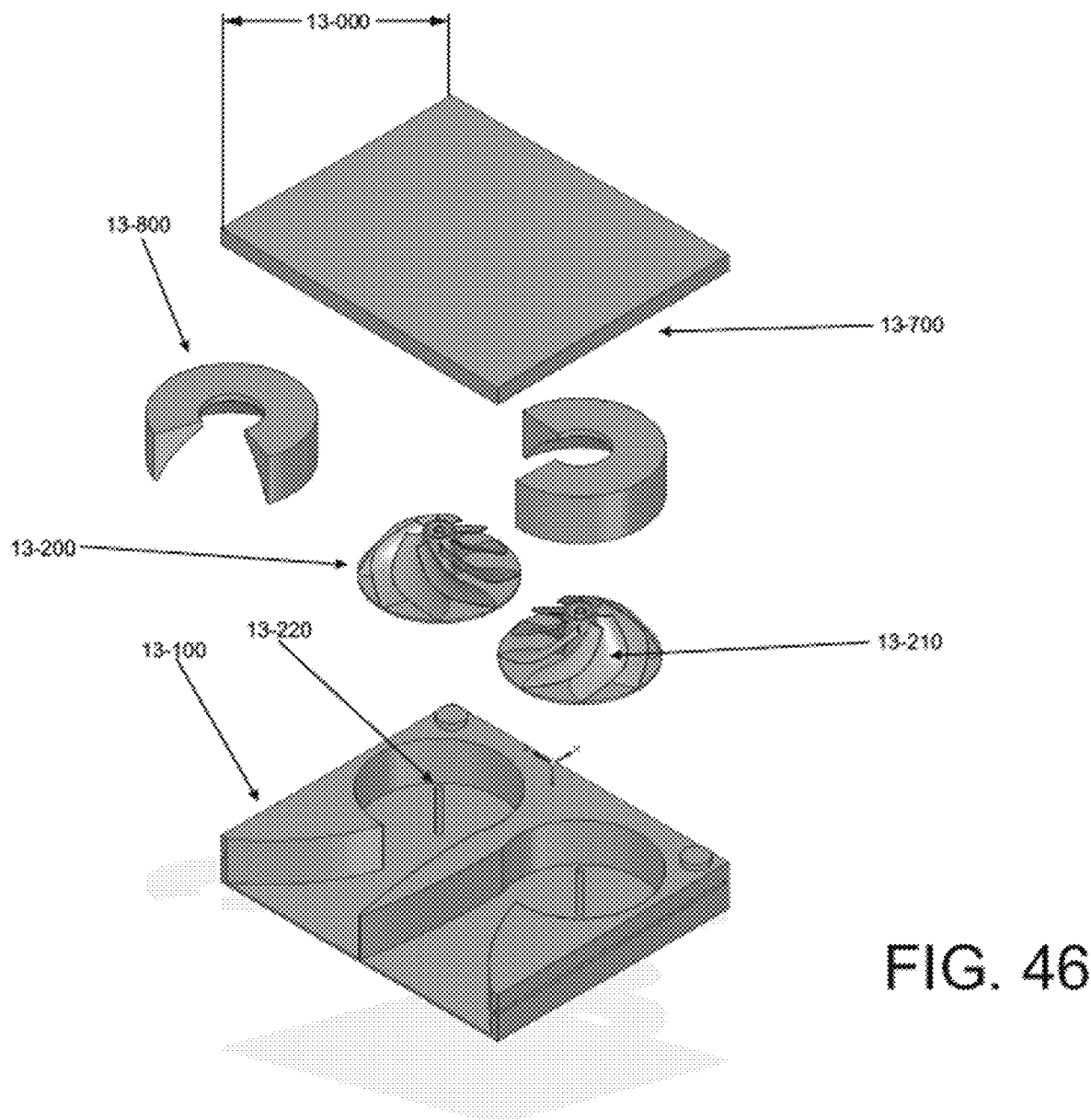
FIG. 46 shows an exploded view of the parts of the second subsystem 13-000.

FIG. 46 show an exploded view of the subsystem (13-000), wherein the different parts of said subsystem are shown, such as the exhaust elements (13-800) and noise cancelling (13700).

Figure 47:
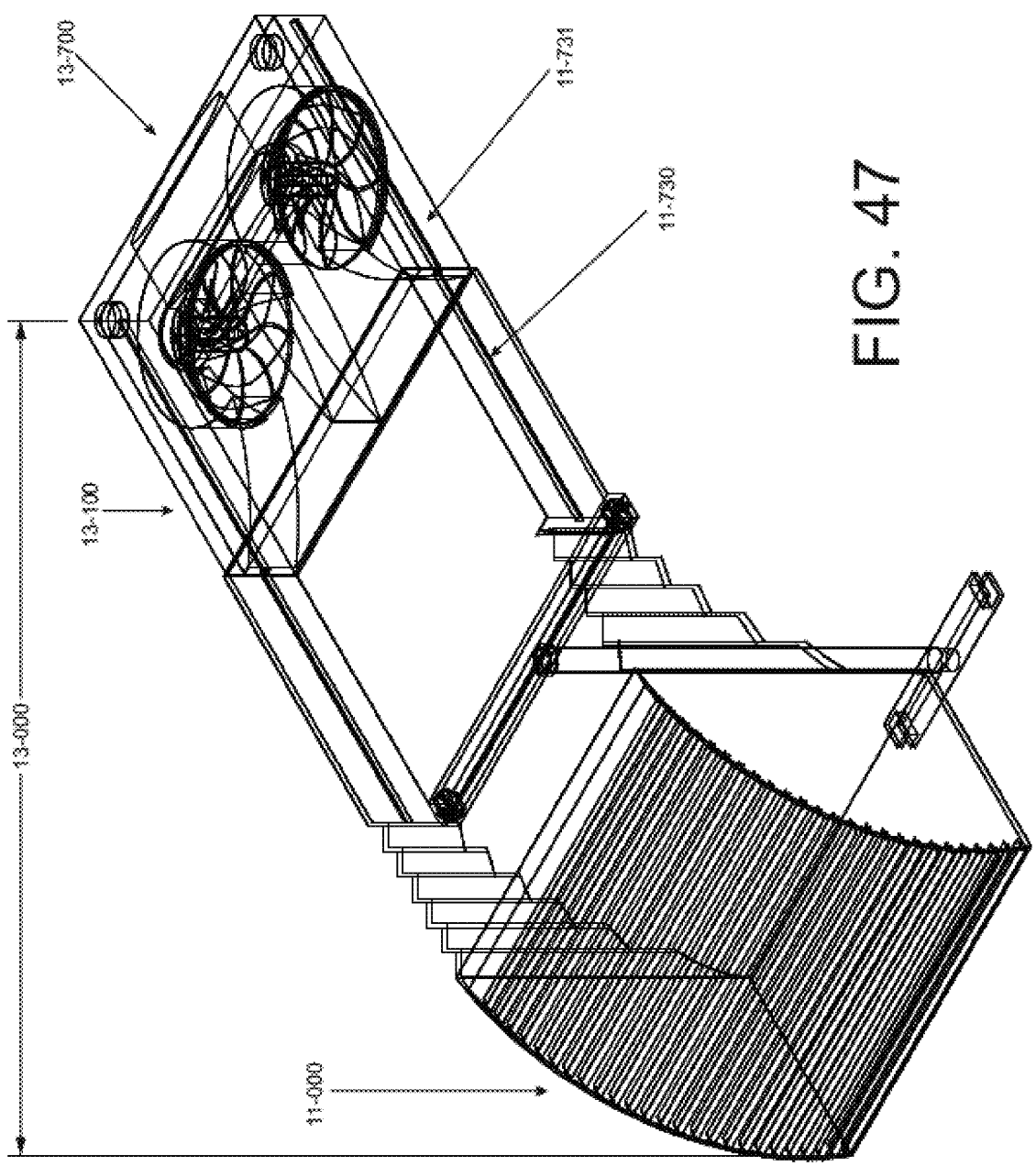
FIG. 47 shows a perspective view of coupling of device 11-000 y second subsystem 13-000.

FIG. 47 shows coupling of the second subsystem (13-000) with the device (11-000).

Figure 48:
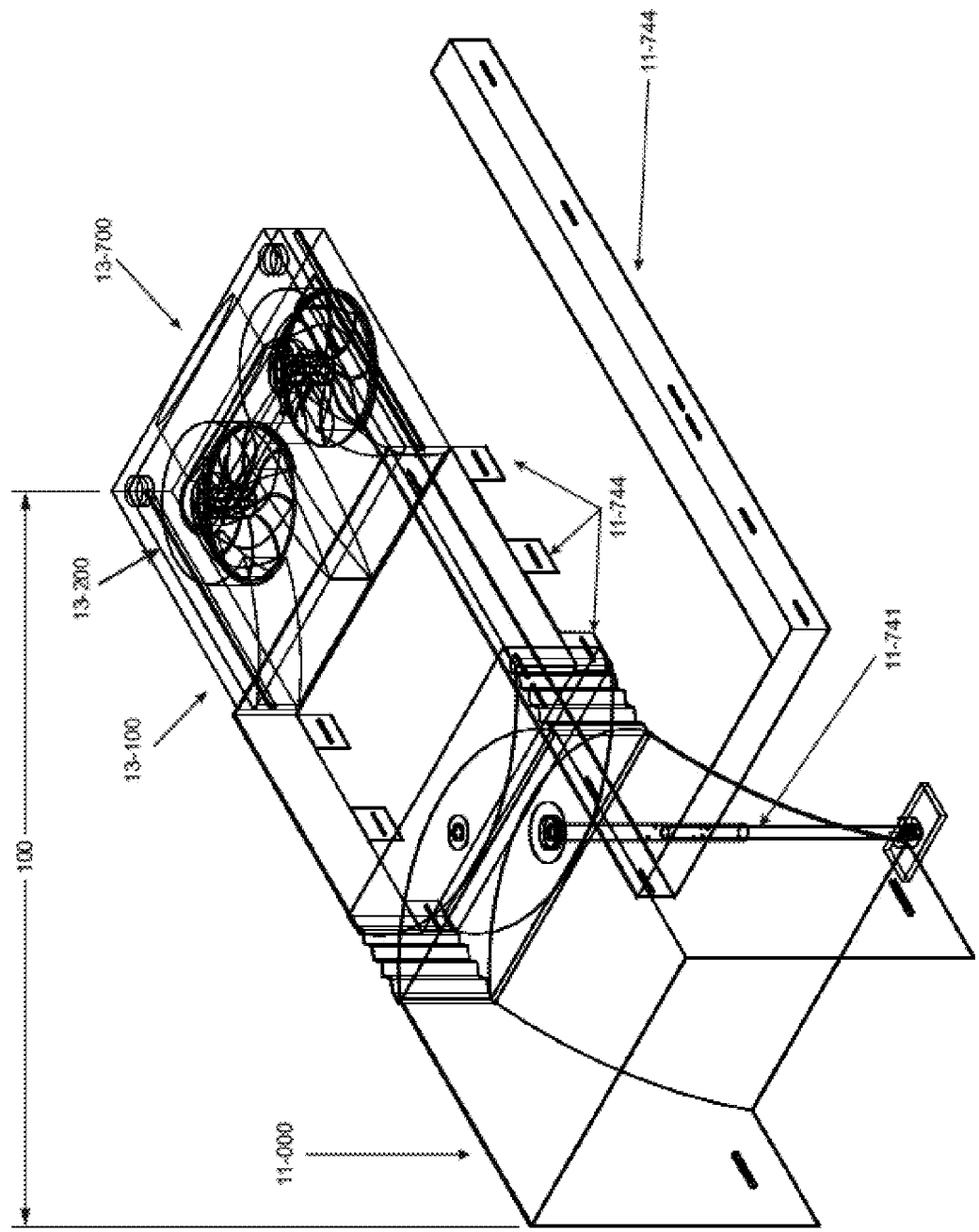
FIG. 48 show a perspective view of coupling of device 11-000 and second subsystem 13-000, with the system folded.

FIG. 48 shows the folded coupling of the second subsystem (13-000) and the device (11-000).

Figure 57:
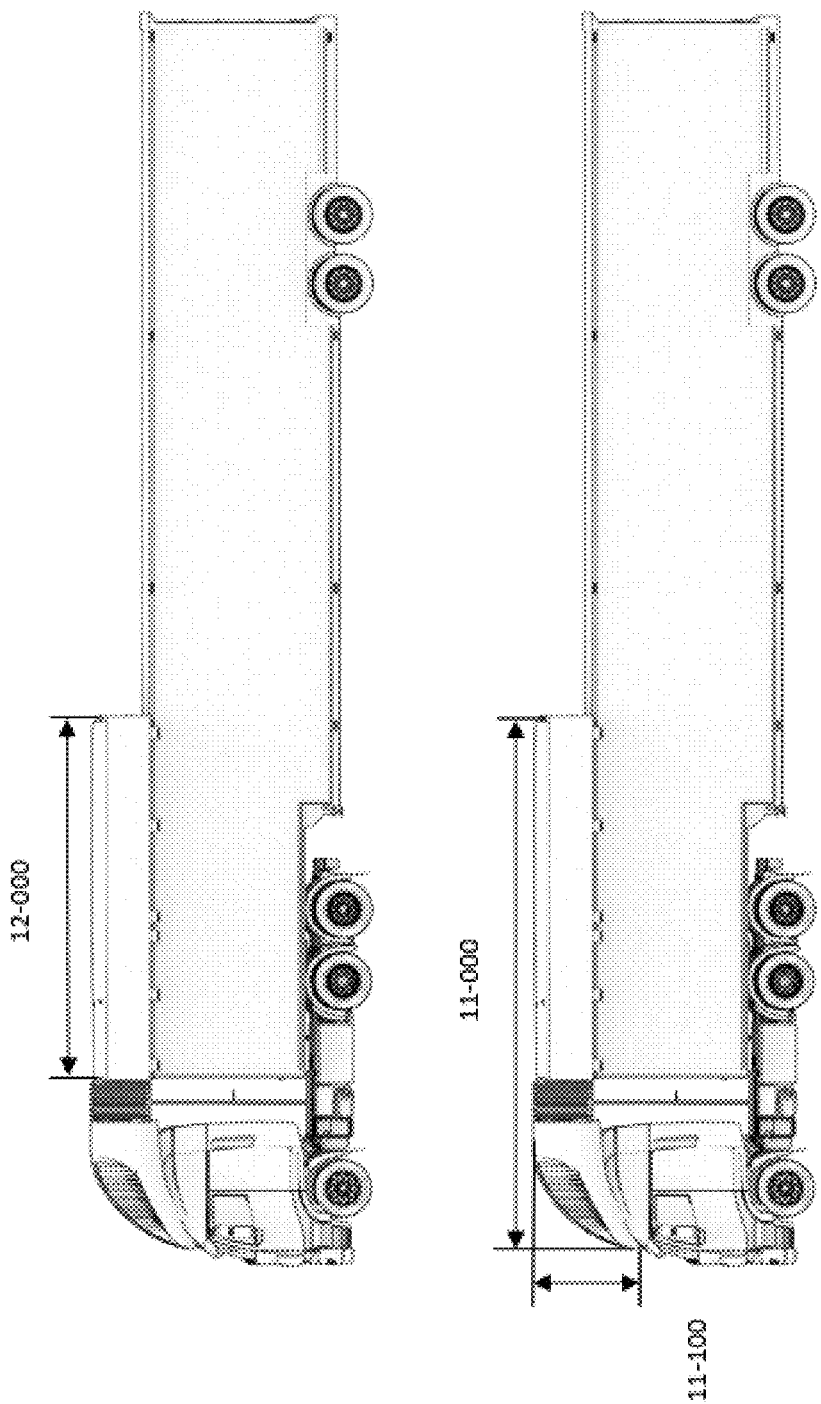
FIG. 57 shows the side view of an articulated truck with the device 11-000 and the first subsystem 12-000.

The ecological system (100) of the invention can be adapted to an existing vehicle (400). For example, FIGS. 57 and 58 show that the ecological system of the invention adapts to different types of trucks.

In another embodiment of the invention the ecological system of the invention, it can be an integral part of a vehicle. For example, in FIGS. 54, 55 and 56 it is observed that the ecological system of the invention is an integral part of a truck by means of a head (14-000) containing the one or more devices (11-000) and (14-100) and grilles (11-100).

The devices (14-100) are located laterally in the head (14-25 000) of the vehicle (400). These devices or air inlets (14-100) are internally connected to the device (11-000) to increase the air flow. These air intakes may or may not have grilles.

Figure 54:
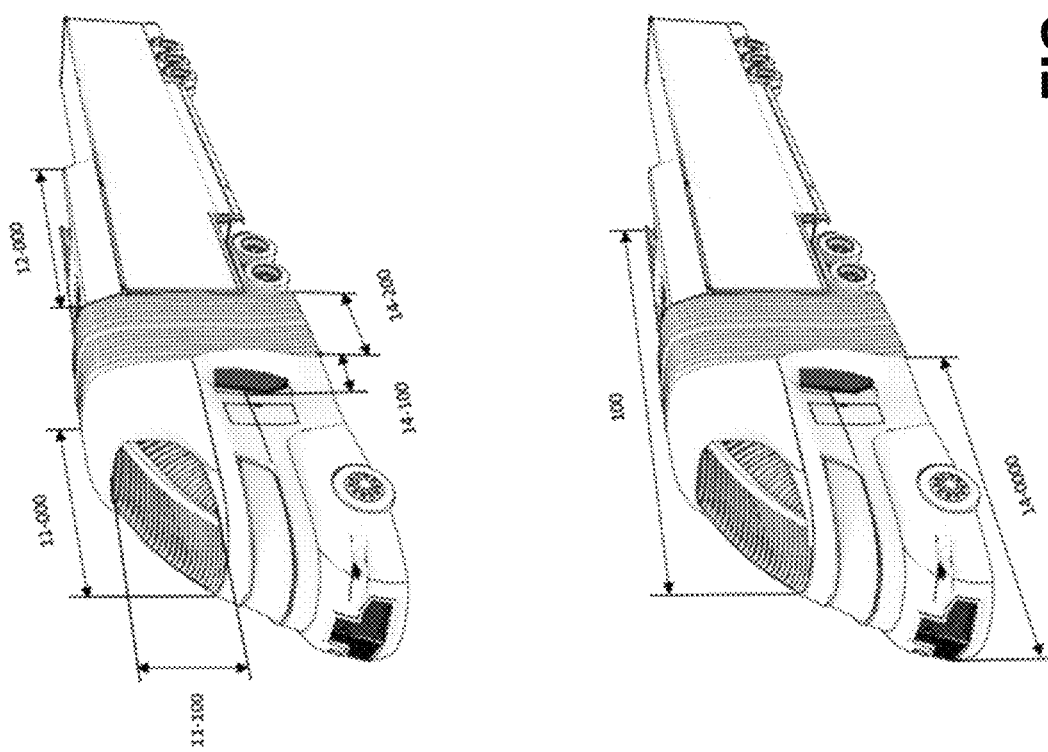
FIG. 54 shows the perspective view of the device 11-000 in a head 14-000 of a truck and the first subsystem 12-000 according to an example of an embodiment.
Figure 55:
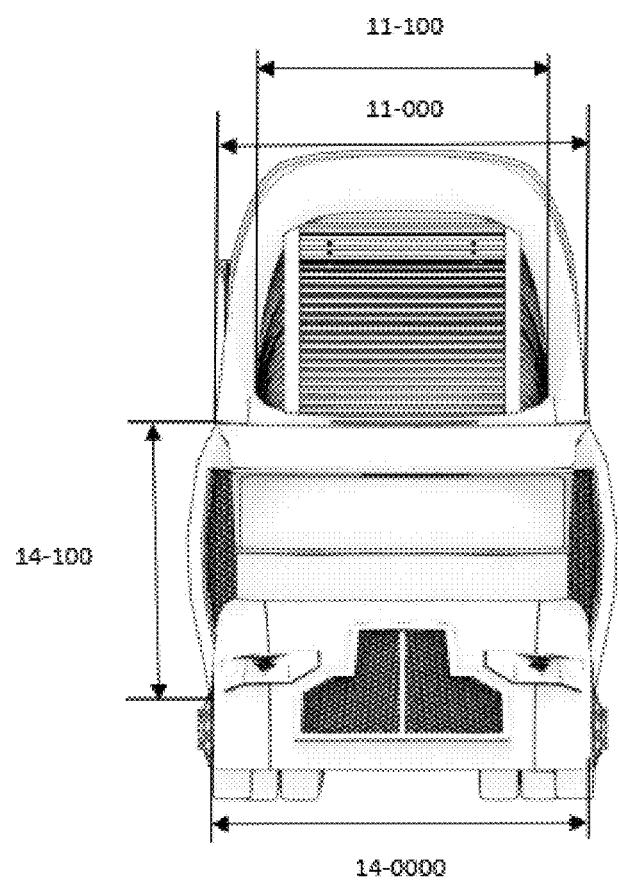
FIG. 55 shows the front view of a truck with head 14-000 and devices 14-100 according to an example of an embodiment.
Figure 56:
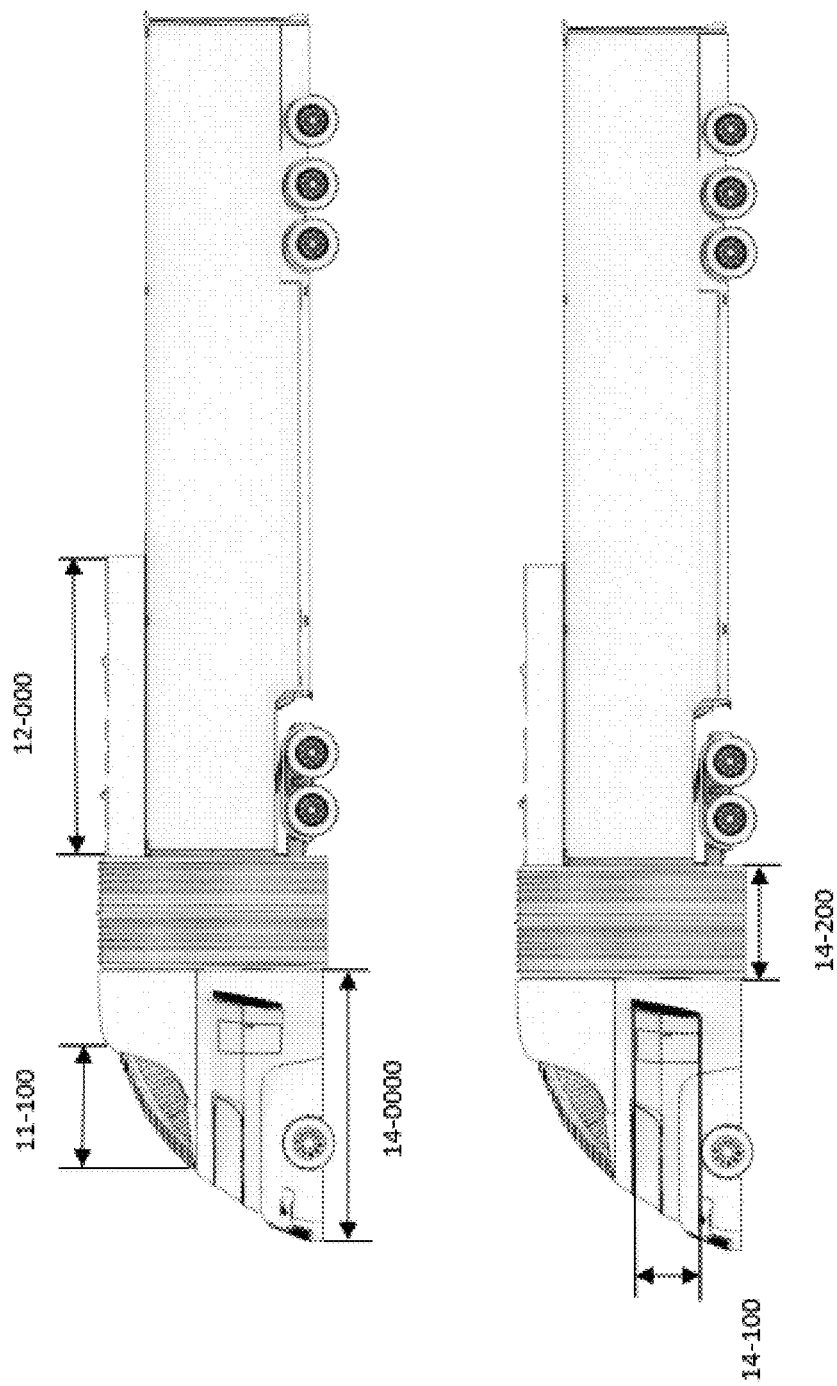
FIG. 56 shows the side view of a truck with the grilles 11-100 in the head 14-000 and flexible elements 14-200 according to an example of an embodiment.

FIGS. 54 and 56 show flexible elements (14-200) ranging from the top to the bottom of the vehicle (400) as an embodiment of the invention.

Next, we disclose some examples of the ecological system of the present invention, which in any way intend to be limitative but they intend to show the technical improvements and advantages of the invention.

In these examples, the system of the present invention is addressed to moving vehicles (400) running at speeds from around 80 to around 120 km/h, in which desired lifts are reached such as shown in table 1.

The ecological system of the present invention weighs around 550 kg, which can vary depending on the construction material and different embodiments and modifications that can be made and that are found within the scope of the invention.

Said subsystem (12-000) or aerodynamic profile has a weight between around 200 and around 250 kg, which can also vary depending its construction material and modifications made and found within the scope of the invention. The system measured around 40 cm height, which complies with one of the objectives of the present invention which is providing a commercially feasible system and that complies with the international standards for load vehicles.

EXAMPLES

Example 1 (Lightening of the Weight of the Vehicle Through Lifting)

Under international standard for load vehicles such as box trucks, articulated trucks, the maximum height of the vehicle is around 4 m, the maximum width is around 2.60 m and the minimum height of the gauge of the bridges is around 5 m, according to "AASHTO LRFD Bridge design Specifications" 6th ed. (2012) and "AASHTO LRFD" Bridge design Specifications 7th Ed. (2014).

With a view to offer, a commercially feasible system and complying with existing vial infrastructure standards and the above mentioned, in this example aerodynamic profile type E 61 $C_l$ (Eppler 61) was selected, which shows an effective behavior for the functioning of the system without substantially altering vehicle dimensions, namely, height and concomitantly comply with the above-mentioned standards.

Figure 52:
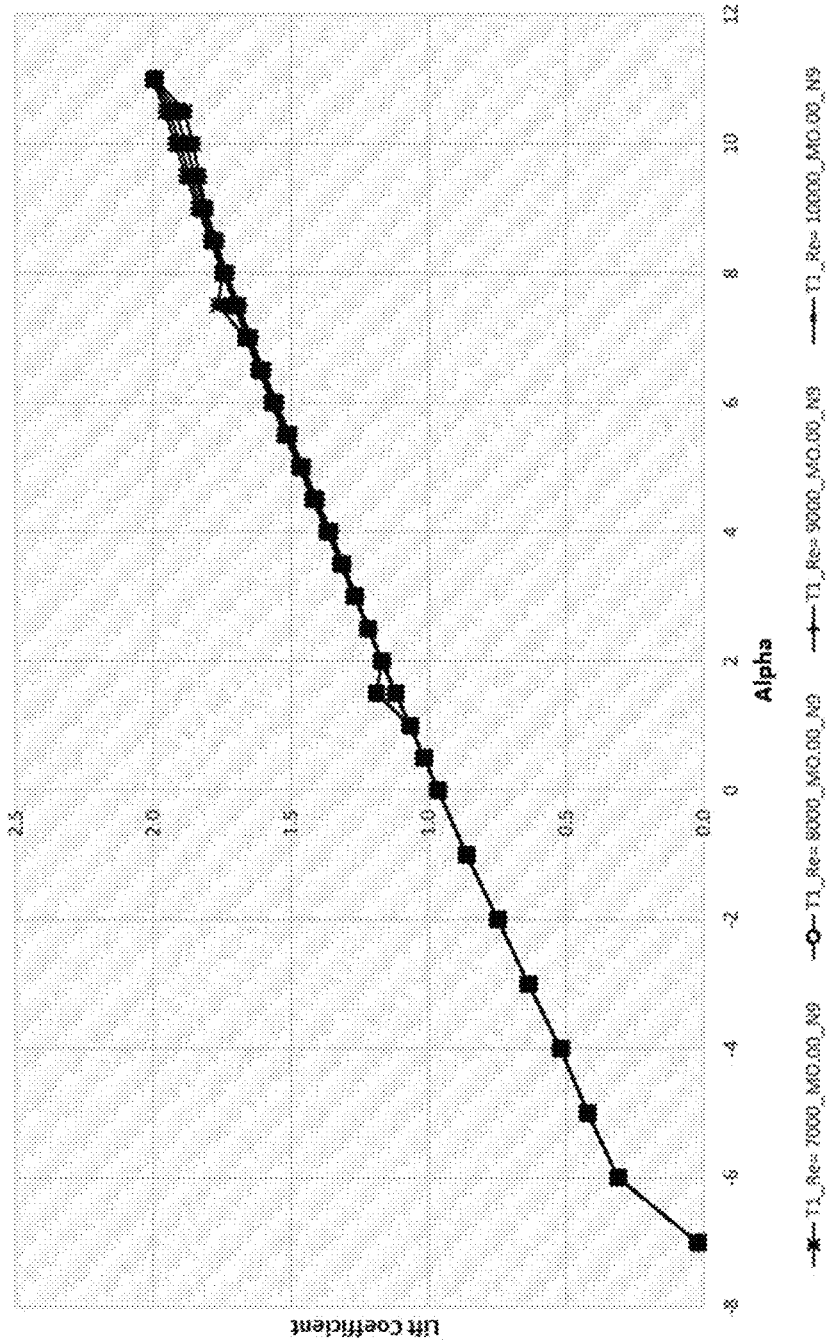
FIG. 52 show the different behaviors of the aerodynamic profile of the invention, type E 61 $C_l$(Eppler 61) in terms of the lifting coefficient ($C_l$) and the attack angles (Alpha).

FIG. 52 shows various behaviors of aerodynamic profile type E 61 $C_l$ (Eppler 61) in terms of lifting coefficient ($C_l$) and attack angles (Alpha), when subjected to conditions corresponding to different Reynolds (Re) and varying air density. In FIG. 52, T1 corresponds to the same time or period for different Reynolds numbers.

The aerodynamic profile type E 61 $C_l$ (Eppler 61) shows a lifting coefficient enough for generating a lift applicable to lighten the payload at achievable speeds for heavy load transportation. It is a profile that generates an ideal lifting with zero attack angle and therefore, this profile allowed significantly reduction the impact of using the system at the height of the vehicle.

A comparison between a system of the state of the art without device (11-000) and an embodiment of the ecological system of the present invention comprising device (11-000) and the first subsystem (12-000) which receives the air flow projected from the device (11-000) towards an aerodynamic profile (12-100) which generates lightening the payload through lifting the moving vehicle was carried out for example 1. Design parameters at sea level and at 4,000 mosl were used.

The desired lifting was obtained by decreasing the input area of device (11-000) from 4 to 1 so that the relation of output air velocity is four (4) times the impact air velocity against the subsystem (12-000) or aerodynamic profile.

Figure 53:
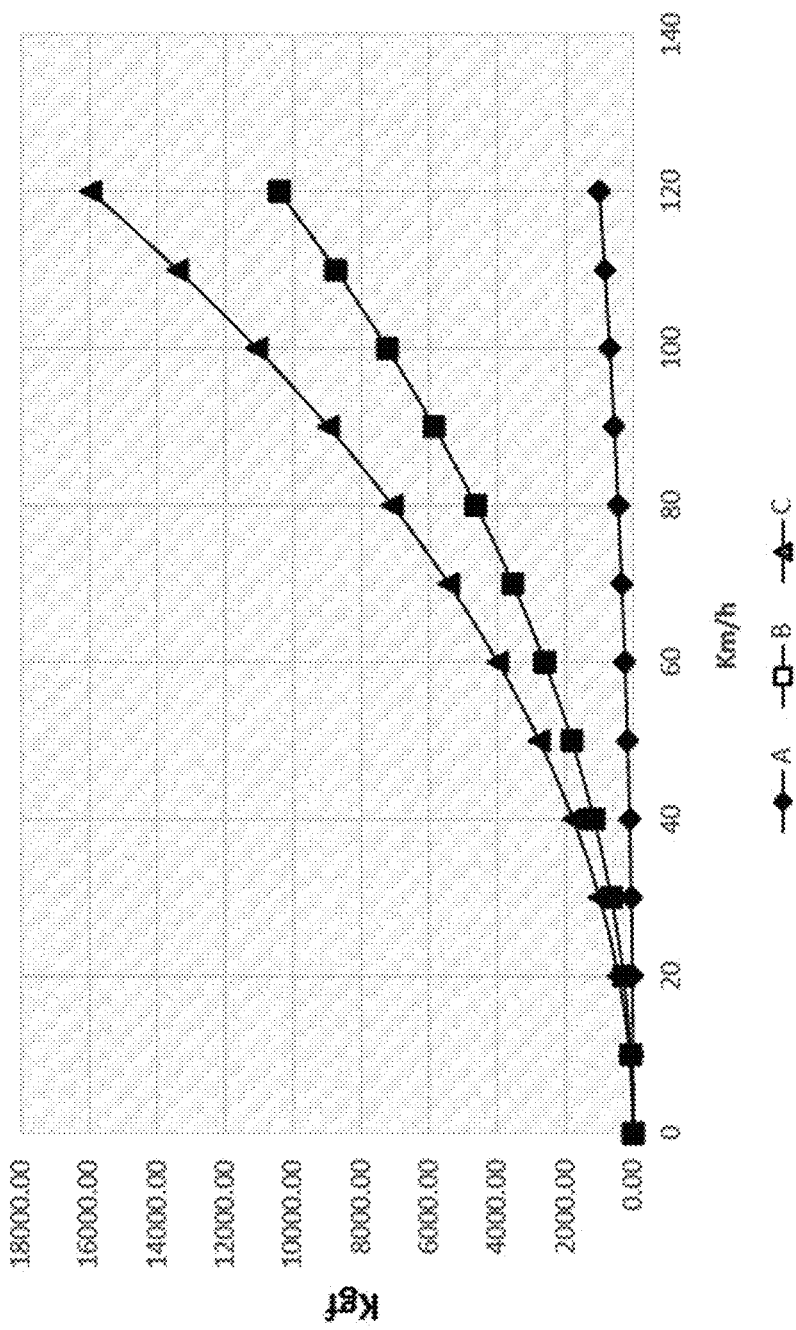
FIG. 53 shows different lifting results in kilograms-force against speed of the vehicle in km/h, from profile (A) and profile in minimum lifting values at 4000 msnm (B) and maximum lifting values at sea level (C).

The following Table 1 and FIG. 53 show different results in terms of kilogram force of lift reached from independent use of profile (A), that is, without incorporating the characteristics of the present system, against results in terms of kilogram force (kgf) of lift reached from the use of the profile by incorporating device (11-000) and the first subsystem (12-000) of the present invention in values of minimum lift at 4,000 mosl (B) and values of maximum lift at sea level (C).

TABLE NO. 1

| Vehicle speed in km/hora | A (kgf) | B (kgf) | C (kgf) |
|---|---|---|---|
| 0 | 0.00 | 0.00 | .0 |
| 10 | 6.92 | 72.32 | 110.740 |
| 20 | 27.68 | 289.28 | 442.960 |
| 30 | 62.29 | 650.88 | 996.660 |
| 40 | 110.74 | 1157.12 | 1771.840 |
| 50 | 173.03 | 1808.00 | 2768.50 |
| 60 | 249.16 | 2603.52 | 3986.630 |
| 70 | 339.14 | 3543.68 | 5426.250 |
| 80 | 442.96 | 4628.47 | 7087.351 |
| 90 | 560.62 | 5857.91 | 8969.928 |
| 100 | 692.12 | 7231.99 | 11073.985 |
| 110 | 837.47 | 8750.71 | 13399.522 |
| 120 | 996.66 | 10414.07 | 15946.539 |

According to the previous example, it was found that lifting generated by only using an aerodynamic profile at sea level and at a speed of 120 km/h reaches a maximum lift of 996.66 kgf, proving that the use of an aerodynamic profile with the system of the present invention comprising device (11-000) and subsystem (12-000) at a speed of 120 km/h under the same above mentioned conditions reaches a minimum lift of 10414.07 kgf and maximum 15946.54 kgf.

With the system of the present invention a weight reduction of the transported load is obtained as was proven in Example 1 wherein lifts between 10414.07 kgf and up to 15946.54 kgf are obtained.

The effect generated by the system at a speed of around 120 km/h at a height of 4000 m over sea level is therefore around 10000 Kg.

Example 2 shows an impact analysis of such effect in view of economic and ecological conditions of load transportation.

Example 2 (Economy and Ecology of the System)

This example 2 uses as reference was a truck tractor vehicle trademark Freightliner Cascadia with an engine Detroit DD15, and euro IV emissions were considered.

The analysis was carried out for the same vehicle on 3 different routes in Europe:
Route 1: Madrid—Paris, distance 1270 km
Route 2: Frankfurt—Hamburg, distance 489 km
Route 3: Marseille—Lavre, distance 1649 km Route 1 (Madrid—Paris) distance 1270 km and an average speed of 100 km/h:

It was found that with one of the embodiments of the invention showing the system (device (11-000) and first subsystem (12-000) economy and ecology in fuel, general maintenance and tires was obtained, as shown in the following tables 2A and 2B.

TABLE NO. 2 A (ROUTE 1 MADRID-PARIS)

| Vehicle | Route 1 Madrid-Paris Weight (Ton) | | Fuel* | | | Maintenance | | |
|---|---|---|---|---|---|---|---|---|
| | | Liters | Efficiency | Value liters | Fuel (Euro) | Maintenance/ Km | Cost | Index |
| A | 20 | 893 | 0.703149 | 1.43 | 127.99 | 0.393 | 500 | 0.014 |
| AD | 10 | 727 | 0.572440 | 1.43 | 1039.61 | 0.354 | 450 | 0.012 |
| | Economy | −166 | −013070 | 0 | −237.38 | −0.039 | −50 | −0.001 |
| | % | −19% | −19% | 0% | −19% | −10% | −10% | −9% |

TABLE NO. 2 B (RUTA 1 MADRID-PARIS)

| Vehicle | Route 1 MADRID-PARIS Weight (Ton) | | TIRES | | | |
|---|---|---|---|---|---|---|
| | | | Directional | Traction | Drag | Cost (Euro) |
| A | 20 | | 0.0101 | 0.0141 | 0.0181 | 17.95 |
| AD | 10 | | 0.0101 | 0.0127 | 0.0158 | 16.39 |
| | | Economy | 0 | −0.0014 | −0.0022 | −1.55 |
| | | % | 0% | −10% | −13% | −9% |

A=vehicle without the system
AD=vehicle with the system of the invention
T=Ton
* Based in the fuel history of European Community for the day 27, August 2018.

The results of Tables 2A and 2B provided the following conclusions:
- A decrease of 19% in fuel was obtained, computed in the total distance of 1270 km between the cities of Madrid (Spain) and Paris (France) which generates an economy of 237 euro/run.
- The use of the system of the invention would increase in the same percentage of 19% the autonomy of the self-moving in a route equal to route 1.

Route 2 (Frankfurt—Hamburg) distance 489 km at an average speed of 100 km/h:

It was found that with one of the embodiments of the invention showing the system (device (11-000) and subsystem (12-000)) economy and ecology in fuel, general maintenance and tires was obtained, as shown in the following tables 3A and table 3B.

TABLE NO. 3A (Route 2 FRANKFURT-HAMBURGO)

| Vehicle | Route 2 FRANKFURT-HAMBURG Weight (Ton) | | Fuel* | | | Maintenance | | |
|---|---|---|---|---|---|---|---|---|
| | | Liters | Effciency | Value liters/ (Euro) | Fuel | Maintenance/ Km | Cost (Euro) | Index |
| A | 20 | 342 | 0.6993865 | 1.5 | 513 | 1.0224 | 500 | 0.0054 |
| AD | 10 | 280 | 0.572597 | 1.5 | 420 | 0.9202 | 450 | 0.0049 |
| | Economy | −62 | −0.12678 | 0 | −93 | −0.1022 | −50 | −0.004 |
| | % | −18% | −18% | 0% | −18% | −10% | −10% | −9% |

TABLE NO. 3B (Route 2 FRANKFURT-HAMBURG)

| Route 2 FRANKFURT-HAMBURG | | TIRES | | | |
|---|---|---|---|---|---|
| Vehicle | Weight (Ton) | Directional | Traction | Drag | Cost (Euro) |
| A | 20 | 0.0039 | 0.0543 | 0.0698 | 2.66 |
| AD | 10 | 0.0039 | 0.00489 | 0.0061 | 2.431 |
| | Economy | 0 | −0.00054 | −0.0087 | −0.23 |
| | % | 0% | −10% | −13% | −9% |

A=vehicle without the system

AD=vehicle with the system of the invention

T=Ton

\* Based in the fuel history of European Community for the day 27, August 2018.

The results of Tables 3A and 3B provided the following conclusions:

A decrease of 18% in fuel was obtained, computed in the total distance of 489 km between the cities of Frankfurt (Germany) and Hamburg (France) which generates an economy of 93 euro/run.

The use of the system of the invention would increase in the same percentage of 18% the autonomy of the self-moving in a route equal to route 2.

Route 3 (Marseille—Lavre) distance 1649 km at an average speed of 100 km/h:

It was found that with one of the embodiments of the invention showing the system (device (11-000) and subsystem (12-000)) economy and ecology in fuel, general maintenance and tires was obtained, as shown in the following tables 4A and 4B.

TABLE NO. 4A (Ruta 3 MARSEILLE-LAVRE)

| Route 3 MARSEILLE-LAVRE | | Fuel* | | | | Maintenance | | |
|---|---|---|---|---|---|---|---|---|
| Vehicle | Weight (Ton) | Liters | Efficiency | Value liters | Fuel | Maintenance/Km | Cost | Índex |
| A | 20 | 1155 | 0.700042 | 1.71 | 1975.05 | 0.30321 | 500 | 0.0054 |
| AD | 10 | 946 | 0.573681 | 1.71 | 1617.66 | 0.27728 | 450 | 0.0049 |
| | Economy | −209 | −0.12674 | 0 | −357.39 | −0.0303 | −50 | −0.00159 |
| | % | −18% | −18% | 0% | −18% | −10% | −10% | −9% |

TABLE NO. 4B (Route 3 MARSELLA-LAVRE)

| ROUTE 3 MARSEILLE-LAVRE | | TIRES | | | |
|---|---|---|---|---|---|
| Vehicle | Weight (Ton) | Directional | Traction | Drag | Cost |
| A | 20 | 0.01832 | 0.01832 | 0.0235 | 30.27 |
| AD | 10 | 0.01649 | 0.0164 | 0.0206 | 27.64 |
| | Economy | 0 | −0.00183 | −0.0294 | −2.625 |
| | % | 0% | −10% | −13% | −9% |

A=vehicle without the system

AD=vehicle with the system of the invention

T=Ton

\* Based in the fuel history of European Community for the day 27, August 2018.

The results of Tables 4A and 4B provided the following conclusions:

A decrease of 18% in fuel was obtained, computed in the total distance of 1649 km between the cities of Marseille and Lavre which generates an economy of 357 euro/run.

The use of the system of the invention would increase in the same percentage of 18% the autonomy of the self-moving in a route equal to route 3.

Example 3 (Energy Generation)

Example 3 uses as reference a Cummins Aeos vehicle, it is a truck tractor with 100% electric propulsion.

The maximum capacity of the vehicle is 8 tons in weight, and its autonomy is 160 km, with a battery of 140 kw/h.

In this example, it is shown that when the system of the present invention is installed using the embodiment (device (11-000) and subsystem (13-000)) in a medium range of 100 km/h, using the route Madrid—Valladolid having an average distance of 190 km, the following data were obtained and shown in table No. 5:

TABLE NO. 5

| Vehicle | Route From: Madrid To: Valladolid | | | ENERGY | | | |
|---|---|---|---|---|---|---|---|
| | Weight (tons) | Distance (km) | Time (hour) | kw/h | Speed (km/h) | Autonomy hours | Loading Time (hour) |
| AP | 8 | 160 | | 140 | 100 | 52.5 | 0 |
| A | 8 | 190 | 1.1875 | 140 | 100 | 71.25 | 60 |
| AE | 8 | 190 | | 150.3 | 100 | 76.49 | 30 |
| | | Additional autonomy % | | 10.3 7%/hour | | −23.99 7%/hour | |

AP: Refers to the articulated truck cummins (statistic data found).
A: Refers to the articulated truck without the system of the present invention.
AE: Refers to the articulated truck with the system of the present invention.

From the results obtained in this example and taking into account the autonomy of vehicle A (without the system), for route (Madrid-Valladolid) it was found that the vehicle would require an average recharge of one (1) hour in the route to arrive to its destination, thus this would increase the delivery timing, and the operative efficiency of the transport equipment.

With the ecological system of the invention (Device (11-000) and subsystem (13-000)) additional 10 kwh can be obtained, thus every hour vehicle AE operates, an average increase of around 7% in autonomy of the vehicle each hour the vehicle is moving can be obtained.

Example 3 A (Contaminant Emissions Reduction (gCO2/Km)

In this example the reference is an articulated truck tractor vehicle Freighliner Cascadia having an engine Detroit DD15 and contaminant emissions standard Euro IV was considered.

The emissions mean for Diesel was used as statistical data, as this is the type of fuel more used commercially for this type of vehicle, today.

Diesel: 2.61 kg of CO2/liter

It was found that with one of the embodiments of the invention showing the system (device (11-000) and subsystem (12-000)) a reduction in contaminant emissions of around 11 to 13% was obtained compared with vehicles without the system of the present invention such as shown in the following table 6.

Emissions as a function of traveled distance vary depending of multiple factors, such as for example the characteristics of the vehicle, allowed speed and road morphology. Table 6 shows emision factors (g CO2/km).

TABLE NO. 6

| Vehicle | Type | | Emissions against speed (gCO2/km) | | |
|---|---|---|---|---|---|
| | | | 12 km/h | 54 km/h | 84 km/h |
| A | Diesel | Rigid | 14 TON 788 | 397 | 410 |
| AD | truck | Rigid | 24 TON 1629 | 487 | 470 |
| B | Articulated | 24 TON | 1784 | 573 | 527 |
| BD | Articulated | 34 TON | 2147 | 666 | 590 |

Note:
All above data were obtained from Cataluña Office for the weather change, practical guide for greenhouse effect emission gases computing.
A: Refers to the vehicle with the system of the present invention.
AD: Refers to the vehicle without the system of the present invention.
B: Refers to the vehicle with the system of the present invention
BD: Refers to the vehicle without the system Table 6 shows vehicle A and vehicle B, which move in a route carrying different weights and traveling at a constant average speed in three different sceneries:

Urban speed (12 km/h)
Intermediate road speed (54 km/h)
Highway speed (84 km/h)
The results in Table 6 show the following conclusions:
For an average speed of 84 km/h, the system of the present invention allows 11% emission reduction (gCO2/km) of articulated vehicle B compared with vehicle BD which does not have the system of the present invention.
For an average speed of 84 km/hora, the system of the present invention allows 13% reduction of emissions (gCO2/km) of vehicle A compared with vehicle AD which do not have the system of the present invention.

Although above figures describe different embodiments of the invention, and examples are provided showing some of technical effects and advantages of the invention, the present invention is not limited by said figures and examples because other embodiments of the invention can lay within the scope of the invention such is defined in the following claims.

The invention claimed is:
1. An ecological system which uses kinetic energy of a moving vehicle, comprising:
one or more devices which catch, guide, compress, accelerate and project an air flow in the moving vehicle; and—a first subsystem comprising one or more aerodynamic profiles that receive the air flow projected from the one or more devices,
wherein the one or more aerodynamic profiles generate lifting on the vehicle, wherein the one or more devices are located at a front part of the system and comprise an input area and an output area, wherein the air flow penetrates the input area and is compressed, accelerated, and guided towards the output area, wherein the input area is greater than the output area such that air flow velocity is higher at the output area than at the input area, wherein said input area is arrangeable around the front part of the vehicle and wherein the one or more devices comprises additional articulation means which guide the air that enters through the front part of the system towards the output of the one or more devices and a laminar flow ejector of the one or more devices comprises rails on both sides and vertical walls, fastening means for assembly of the laminar flow ejector in the housing, a vertical support column for mounting and demounting the laminar flow ejector from the system, and a mechanical device for dragging the laminar flow ejector.

2. The ecological system according to claim 1, further comprising a second subsystem comprising one or more turbines that receive the air flow projected from the one or more devices, wherein the first and second subsystems can operate jointly or separately.

3. The ecological system according to claim 1, wherein said input area of the one or more devices is configurable as a function of the width of the vehicle in which the system operates.

4. The ecological system according to claim 1, wherein said input area of the one or more devices is configurable as a function of the height of the vehicle in which the system operates.

5. The ecological system according to claim 1, wherein the one or more devices further comprise one or more admission ports, a compression throttle and one or more exhaust ports.

6. The ecological system according to claim 5, wherein the one or more devices further comprise side walls extending from the one or more admission ports up to the one or more exhaust ports.

7. The ecological system according to claim 3, wherein the one or more devices further comprise upper compression walls and lower compression walls extending from said admission port to said exhaust port, with angle and length varying as a function of the morphology of the moving vehicle.

8. The ecological system according to claim 1, wherein the one or more devices further comprise one or more air intake control systems.

9. The ecological system according to claim 1, wherein the one or more air intake control systems comprise one or more grilles or a diaphragm.

10. The ecological system according to claim 1, wherein the one or more aerodynamic profiles comprise one or more wing tip devices.

11. The ecological system according to claim 10, wherein the one or more aerodynamic profiles further comprise one or more vortex generating devices.

12. The ecological system according to claim 10, wherein the one or more aerodynamic profiles further comprise one or more flow guides.

13. The ecological system according to claim 10, wherein the one or more aerodynamic profiles further comprise a lightened structure located within the one or more aerodynamic profiles.

14. The ecological system according to claim 10, wherein the one or more aerodynamic profiles are joined to the vehicle through fastening means.

15. The ecological system according to claim 14, wherein said fastening means are selected from side beams that penetrate as male in one or more dies of the vehicle, belts, cables, screws, bolts, nuts, fastening brooches and cords.

16. The ecological system according to claim 10, wherein the one or more aerodynamic profiles further comprise an external support structure which is supported over one or more wing tip devices which in turn transmit the force to side beams that penetrate as male in one or more dies of the vehicle.

17. The ecological system of claim 2, wherein the second subsystem comprises:
a housing that encompasses the one or more turbines;
one or more internal or external motors with respect to the one or more turbines;
one or more internal or external transmission systems;
one or more diffusor or noise cancelling elements; and
one or more exhaust elements,
wherein the one or more turbines are configurable to drive one or more electric energy generators through one or more transmission systems.

18. The ecological system according to claim 7, wherein one of the compression walls of said one or more devices is the vehicle's body.

19. The ecological system according to claim 18, wherein said compression wall is realizable as the lower wall.

20. The ecological system according to claim 1, wherein the laminar flow ejector having fix or variable areas.

21. The ecological system according to claim 1, wherein said articulation means comprise one or more flexible elements for air conduction.

22. The ecological system according to claim 21, wherein the laminar flow ejector of the one or more devices comprises a guide for the accelerated air to deliver a laminar flow towards the edge of the aerodynamic profile.

23. The ecological system according to claim 1, wherein the support column operates in a pneumatic, electric, mechanic, hydraulic or manually manner.

24. The ecological system according to claim 1, wherein the vehicle is selected among cars, buses, pickup trucks, box trucks, trains, boats, articulated and non-articulated trucks.

25. The ecological system according to claim 1, wherein the ecological system is adaptable to the vehicle.

26. The ecological system according to claim 1, wherein the ecological system is configurable as an integral part of the vehicle by means of a header containing the one or more devices.

27. The ecological system according to claim 26, wherein the one or more devices are configurable to be located laterally in the header of the vehicle.

28. The ecological system according to claim 26, further comprising flexible elements configurable for ranging from the top to the bottom of the vehicle.

* * * * *